United States Patent
Nagai et al.

(10) Patent No.: US 7,092,342 B2
(45) Date of Patent: Aug. 15, 2006

(54) OPTICAL DISC, RECORDING APPARATUS AND METHOD, AND REPRODUCTION APPARATUS AND METHOD

(75) Inventors: Takahiro Nagai, Osaka (JP); Hideshi Ishihara, Katano (JP); Takashi Yumiba, Kyotanabe (JP); Rie Takahashi, Hirakata (JP); Mamoru Shoji, Sakai (JP); Hiroyuki Yamaguchi, Nishinomiya (JP); Harumitsu Miyashita, Minoo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 482 days.

(21) Appl. No.: 10/381,419

(22) PCT Filed: Oct. 26, 2001

(86) PCT No.: PCT/JP01/09430

§ 371 (c)(1),
(2), (4) Date: Mar. 25, 2003

(87) PCT Pub. No.: WO02/35529

PCT Pub. Date: May 2, 2002

(65) Prior Publication Data

US 2005/0174915 A1 Aug. 11, 2005

(30) Foreign Application Priority Data

Oct. 27, 2000 (JP) ............................ 2000-328556
Oct. 31, 2000 (JP) ............................ 2000-331972

(51) Int. Cl.
G11B 20/12 (2006.01)
(52) U.S. Cl. .................. 369/59.25; 369/275.3

(58) Field of Classification Search ............ None
See application file for complete search history.

U.S. PATENT DOCUMENTS

| | | | |
|---|---|---|---|
| 4,849,836 A | | 7/1989 | Kachikian |
| 5,533,003 A | | 7/1996 | Kobayashi |
| 5,572,507 A | | 11/1996 | Ozaki et al. |
| 5,724,330 A | * | 3/1998 | Kobayashi et al. ........ 369/59.2 |
| 5,807,640 A | | 9/1998 | Ueno et al. |
| 5,867,475 A | * | 2/1999 | Moriya et al. ........... 369/275.3 |
| 6,219,322 B1 | | 4/2001 | Kobayashi |
| 6,260,146 B1 | * | 7/2001 | Mos et al. ................ 713/176 |
| 6,665,240 B1 | * | 12/2003 | Kobayashi et al. ...... 369/47.15 |
| 6,735,160 B1 | * | 5/2004 | Miyashita et al. ........ 369/59.12 |

FOREIGN PATENT DOCUMENTS

| | | |
|---|---|---|
| CN | 1142663 | 2/1997 |
| EP | 0 299 573 | 1/1989 |

(Continued)

Primary Examiner—Thang V. Tran
Assistant Examiner—Tawfik Goma
(74) Attorney, Agent, or Firm—Wenderoth, Lind & Ponack, L.L.P.

(57) ABSTRACT

An optical disc has a plurality of sectors, where each of the plurality of sectors includes a plurality of frames. A sub information bit value of "0" or "1" is assigned to the plurality of frames constituting a sector, excluding the first and last frames. Edge positions are displaced so that leading/lagging errors appear in accordance with a certain rule when data fields of the frames to which the sub information bit value "1" is assigned are read. Edge positions are displaced so that leading/lagging errors appear in accordance with a reversal of the certain rule when data fields of the frames to which the sub information bit value "0" is assigned are read.

17 Claims, 49 Drawing Sheets

FOREIGN PATENT DOCUMENTS

| | | |
|---|---|---|
| EP | 0 540 345 | 5/1993 |
| EP | 0 545 472 | 6/1993 |
| JP | 8-212560 | 8/1996 |
| JP | 11-126426 | 5/1999 |
| JP | 11-306675 | 11/1999 |

\* cited by examiner

FIG. 9

| frame | | | | |
|---|---|---|---|---|
| [0] | sy0 | ADDRESS | ... | |
| [1] | sy1 | | ... | Sd[i]b7 |
| [2] | sy2 | | ... | |
| [3] | sy3 | | ... | |
| [4] | sy4 | | ... | Sd[i]b6 |
| [5] | sy5 | | ... | |
| [6] | sy6 | | ... | |
| [7] | sy7 | | ... | Sd[i]b5 |
| [8] | sy8 | | ... | |
| [9] | sy9 | | ... | |
| [10] | sy10 | | ... | Sd[i]b4 |
| [11] | sy11 | | ... | |
| [12] | sy12 | | ... | |
| [13] | sy13 | | ... | Sd[i]b3 |
| [14] | sy14 | | ... | |
| [15] | sy15 | | ... | |
| [16] | sy16 | | ... | Sd[i]b2 |
| [17] | sy17 | | ... | |
| [18] | sy18 | | ... | |
| [19] | sy19 | | ... | Sd[i]b1 |
| [20] | sy20 | | ... | |
| [21] | sy21 | | ... | |
| [22] | sy22 | | ... | Sd[i]b0 |
| [23] | sy23 | | ... | |
| [24] | sy24 | | | |
| [25] | sy25 | | ... | |

FIG. 14A

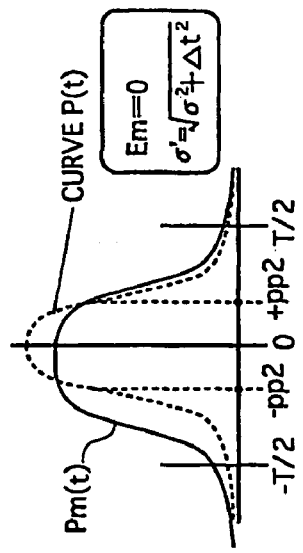

FORMULA 1:
$P(t) = \dfrac{1}{\sqrt{2\pi}\,\sigma} \exp\left(-\dfrac{(t)^2}{2\sigma^2}\right)$

FIG. 14B

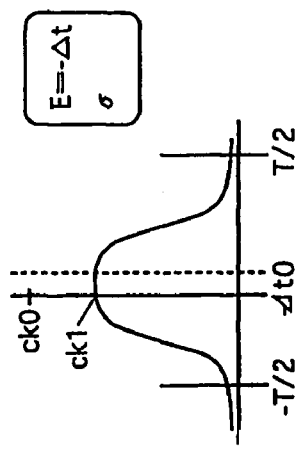

FORMULA 2:
$P1(t) = \dfrac{1}{2} \dfrac{1}{\sqrt{2\pi}\,\sigma} \exp\left(-\dfrac{(t+\Delta t)^2}{2\sigma^2}\right)$

FIG. 14C

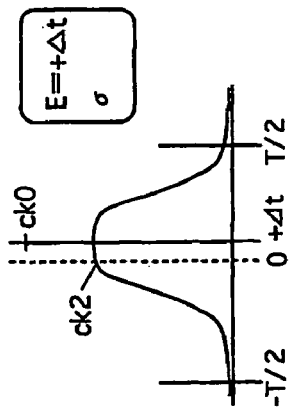

FORMULA 3:
$P2(t) = \dfrac{1}{2} \dfrac{1}{\sqrt{2\pi}\,\sigma} \exp\left(-\dfrac{(t-\Delta t)^2}{2\sigma^2}\right)$

FIG. 14D

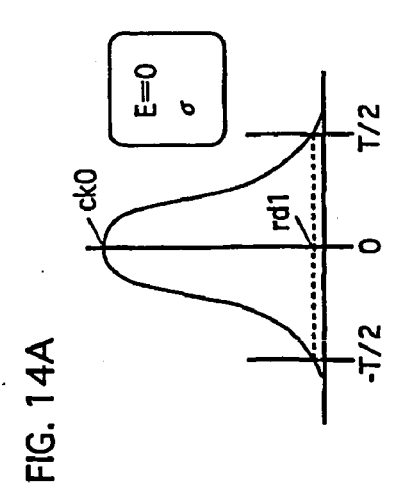

FORMULA 4:
$Pm(t) = \dfrac{1}{2} \dfrac{1}{\sqrt{2\pi}\,\sigma} \exp\left(-\dfrac{(t-\Delta t)^2}{2\sigma^2}\right) + \dfrac{1}{2} \dfrac{1}{\sqrt{2\pi}\,\sigma} \exp\left(-\dfrac{(t+\Delta t)^2}{2\sigma^2}\right)$

FIG. 15

FIG. 15A
EXPECTATION

$$Em = \int t \times Pm(t)\,dt$$

$$Pm(t) = \frac{1}{2}\frac{1}{\sqrt{2\pi}\sigma}\exp\left(-\frac{(t-\Delta t)^2}{2\sigma^2}\right) + \frac{1}{2}\frac{1}{\sqrt{2\pi}\sigma}\exp\left(-\frac{(t+\Delta t)^2}{2\sigma^2}\right)$$

$$= \int t \times \left\{ \frac{1}{2}\frac{1}{\sqrt{2\pi}\sigma}\exp\left(-\frac{(t-\Delta t)^2}{2\sigma^2}\right) + \frac{1}{2}\frac{1}{\sqrt{2\pi}\sigma}\exp\left(-\frac{(t+\Delta t)^2}{2\sigma^2}\right) \right\} dt$$

$$= \frac{1}{2}\int t \times \frac{1}{\sqrt{2\pi}\sigma}\exp\left(-\frac{(t-\Delta t)^2}{2\sigma^2}\right)dt + \frac{1}{2}\int t \times \frac{1}{\sqrt{2\pi}\sigma}\exp\left(-\frac{(t+\Delta t)^2}{2\sigma^2}\right)dt$$

$$= \frac{1}{2}\int (u+\Delta t)\times \frac{1}{\sqrt{2\pi}\sigma}\exp\left(-\frac{u^2}{2\sigma^2}\right)du + \frac{1}{2}\int (s-\Delta t)\times \frac{1}{\sqrt{2\pi}\sigma}\exp\left(-\frac{s^2}{2\sigma^2}\right)ds$$

$$= \frac{1}{2}\int u \times \frac{1}{\sqrt{2\pi}\sigma}\exp\left(-\frac{u^2}{2\sigma^2}\right)du + \frac{\Delta t}{2}\int \frac{1}{\sqrt{2\pi}\sigma}\exp\left(-\frac{u^2}{2\sigma^2}\right)du + \frac{1}{2}\int s \times \frac{1}{\sqrt{2\pi}\sigma}\exp\left(-\frac{s^2}{2\sigma^2}\right)ds - \frac{\Delta t}{2}\int \frac{1}{\sqrt{2\pi}\sigma}\exp\left(-\frac{s^2}{2\sigma^2}\right)ds$$

$$= 0 + \frac{\Delta t}{2} + 0 - \frac{\Delta t}{2}$$

$$= 0$$

FIG. 15B
DISTRIBUTION

$$(\sigma')^2 = \int (t-Em)^2 \times Pm(t)\,dt = \int t^2 \times Pm(t)\,dt$$

$$= \int t^2 \times \left\{ \frac{1}{2}\frac{1}{\sqrt{2\pi}\sigma}\exp\left(-\frac{(t-\Delta t)^2}{2\sigma^2}\right) + \frac{1}{2}\frac{1}{\sqrt{2\pi}\sigma}\exp\left(-\frac{(t+\Delta t)^2}{2\sigma^2}\right) \right\} dt$$

$$= \frac{1}{2}\int t^2 \times \frac{1}{\sqrt{2\pi}\sigma}\exp\left(-\frac{(t-\Delta t)^2}{2\sigma^2}\right)dt + \frac{1}{2}\int t^2 \times \frac{1}{\sqrt{2\pi}\sigma}\exp\left(-\frac{(t+\Delta t)^2}{2\sigma^2}\right)dt$$

$$= \frac{1}{2}\int (u+\Delta t)^2 \times \frac{1}{\sqrt{2\pi}\sigma}\exp\left(-\frac{u^2}{2\sigma^2}\right)du + \frac{1}{2}\int (s-\Delta t)^2 \times \frac{1}{\sqrt{2\pi}\sigma}\exp\left(-\frac{s^2}{2\sigma^2}\right)ds$$

$$= \frac{1}{2}\int (u^2 + 2\Delta t \times u + \Delta t^2) \times \frac{1}{\sqrt{2\pi}\sigma}\exp\left(-\frac{u^2}{2\sigma^2}\right)du + \frac{1}{2}\int (s^2 - 2\Delta t \times s + \Delta t^2) \times \frac{1}{\sqrt{2\pi}\sigma}\exp\left(-\frac{s^2}{2\sigma^2}\right)ds$$

$$= \frac{1}{2}\int u^2 \times \frac{1}{\sqrt{2\pi}\sigma}\exp\left(-\frac{u^2}{2\sigma^2}\right)du + \frac{2\Delta t}{2}\int u \times \frac{1}{\sqrt{2\pi}\sigma}\exp\left(-\frac{u^2}{2\sigma^2}\right)du + \frac{\Delta t^2}{2}\int \frac{1}{\sqrt{2\pi}\sigma}\exp\left(-\frac{u^2}{2\sigma^2}\right)du$$

$$+ \frac{1}{2}\int s^2 \times \frac{1}{\sqrt{2\pi}\sigma}\exp\left(-\frac{s^2}{2\sigma^2}\right)ds - \frac{2\Delta t}{2}\int s \times \frac{1}{\sqrt{2\pi}\sigma}\exp\left(-\frac{s^2}{2\sigma^2}\right)ds + \frac{\Delta t^2}{2}\int \frac{1}{\sqrt{2\pi}\sigma}\exp\left(-\frac{s^2}{2\sigma^2}\right)ds$$

$$= \frac{\sigma^2}{2} + \Delta t \times E' + \frac{\Delta t^2}{2} + \frac{\sigma^2}{2} - \Delta t \times E' + \frac{\Delta t^2}{2}$$

$$= \sigma^2 + \Delta t^2$$

FORMULA 5: $\sigma' = \sqrt{\sigma^2 + \Delta t^2}$

FIG. 16

| SIGNAL CYCLE T | 38.23 | ns |
| --- | --- | --- |
| T/2 | 19.11 | ns |

| MAIN SIGNAL JITTER (%) | | UPPER ROW: OPTICAL DISC BASE JITTER (%), LOWER ROW: STANDARD DEVIATION σ (ns) | | | | | | | | | |
| --- | --- | --- | --- | --- | --- | --- | --- | --- | --- | --- | --- |
| | | 7 | 8 | 9 | 10 | 11 | 12 | 13 | 14 | 15 | 16 |
| | | 2.675841 | 3.058104 | 3.440367 | 3.82263 | 4.204893 | 4.587156 | 4.969419 | 5.351682 | 5.733945 | 6.116208 |
| 0 | 0 | 7.0000 | 8.0000 | 9.0000 | 10.0000 | 11.0000 | 12.0000 | 13.0000 | 14.0000 | 15.0000 | 16.0000 |
| 0.382263 | 1 | 7.0711 | 8.0623 | 9.0554 | 10.0499 | 11.0454 | 12.0416 | 13.0384 | 14.0357 | 15.0333 | 16.0312 |
| 0.76452599 | 2 | 7.2801 | 8.2462 | 9.2195 | 10.1980 | 11.1803 | 12.1655 | 13.1529 | 14.1421 | 15.1327 | 16.1245 |
| 1.14678899 | 3 | 7.6158 | 8.5440 | 9.4868 | 10.4403 | 11.4018 | 12.3693 | 13.3417 | 14.3178 | 15.2971 | 16.2788 |
| 1.52905199 | 4 | 8.0623 | 8.9443 | 9.8489 | 10.7703 | 11.7047 | 12.6491 | 13.6015 | 14.5602 | 15.5242 | 16.4924 |
| 1.91131498 | 5 | 8.6023 | 9.4340 | 10.2956 | 11.1803 | 12.0830 | 13.0000 | 13.9284 | 14.8661 | 15.8114 | 16.7631 |

EDGE DISPLACEMENT AMOUNT Δt
LEFT COLUMN: (%)
RIGHT COLUMN: (ns)

| SIGNAL CYCLE T | 38.23 | ns |
| --- | --- | --- |
| T/2 | 19.11 | ns |

MAIN SIGNAL EDGE ERROR DETECTION PROBABILITY

UPPER ROW: OPTICAL DISC BASE JITTER (%), LOWER ROW: STANDARD DEVIATION σ (ns)

| EDGE DISPLACEMENT AMOUNT Δt | LEFT COLUMN: (%) / RIGHT COLUMN: (ns) | 7 | 8 | 9 | 10 | 11 | 12 | 13 | 14 | 15 | 16 |
| --- | --- | --- | --- | --- | --- | --- | --- | --- | --- | --- | --- |
| | 0 | 2.675841 | 3.058104 | 3.440367 | 3.82263 | 4.204893 | 4.587156 | 4.969419 | 5.351682 | 5.733945 | 6.116208 |
| 1 | 0.382263 | 9.21E-13 | 4.12E-10 | 2.77E-08 | 5.74E-07 | 5.49E-06 | 3.09E-05 | 1.20E-04 | 3.55E-04 | 8.58E-04 | 1.78E-03 |
| 2 | 0.76452599 | 1.45E-12 | 5.47E-10 | 3.33E-08 | 6.50E-07 | 5.98E-06 | 3.29E-05 | 1.26E-04 | 3.68E-04 | 8.81E-04 | 1.82E-03 |
| 3 | 1.14678899 | 3.59E-12 | 1.03E-09 | 5.21E-08 | 8.94E-07 | 7.54E-06 | 3.90E-05 | 1.43E-04 | 4.05E-04 | 9.51E-04 | 1.93E-03 |
| 4 | 1.52905199 | 9.52E-12 | 2.14E-09 | 9.05E-08 | 1.36E-06 | 1.04E-05 | 4.99E-05 | 1.73E-04 | 4.70E-04 | 1.07E-03 | 2.12E-03 |
| 5 | 1.91131498 | 2.51E-11 | 4.48E-09 | 1.61E-07 | 2.15E-06 | 1.49E-05 | 6.66E-05 | 2.18E-04 | 5.66E-04 | 1.24E-03 | 2.39E-03 |
| | | 6.47E-11 | 9.30E-09 | 2.88E-07 | 3.42E-06 | 2.18E-05 | 9.07E-05 | 2.80E-04 | 6.97E-04 | 1.47E-03 | 2.75E-03 | md1, wk2, md2

FIG. 18

| SIGNAL CYCLE T | 38.23 | ns |
| --- | --- | --- |
| T/2 | 19.11 | ns |

| EDGE PHASE DETECTION PROBABILITY | | 0 |
| --- | --- | --- |
| EDGE DISPLACEMENT AMOUNT Δt | 0 | 0 |
| LEFT COLUMN: (%) | 1 | 0.382263 |
| RIGHT COLUMN: (ns) | 2 | 0.76452599 |
| | 3 | 1.14678899 |
| | 4 | 1.52905199 |
| | 5 | 1.91131498 |

← md1

← wk3

| UPPER ROW: OPTICAL DISC BASE JITTER (%), LOWER ROW: STANDARD DEVIATION σ (ns) | | | | | | | | | | ↙ md2 |
| --- | --- | --- | --- | --- | --- | --- | --- | --- | --- | --- |
| 7 | 8 | 9 | 10 | 11 | 12 | 13 | 14 | 15 | 16 |
| 2.675841 | 3.058104 | 3.440367 | 3.82263 | 4.204893 | 4.587156 | 4.969419 | 5.351682 | 5.733945 | 6.116208 |
| 5.00E-01 | 5.00E-01 | 5.00E-01 | 5.00E-01 | 5.00E-01 | 5.00E-01 | 5.00E-01 | 5.00E-01 | 5.00E-01 | 4.99E-01 |
| 5.57E-01 | 5.50E-01 | 5.44E-01 | 5.40E-01 | 5.36E-01 | 5.33E-01 | 5.31E-01 | 5.28E-01 | 5.26E-01 | 5.24E-01 |
| 6.12E-01 | 5.99E-01 | 5.88E-01 | 5.79E-01 | 5.72E-01 | 5.66E-01 | 5.61E-01 | 5.56E-01 | 5.52E-01 | 5.48E-01 |
| 6.66E-01 | 6.46E-01 | 6.31E-01 | 6.18E-01 | 6.07E-01 | 5.99E-01 | 5.91E-01 | 5.84E-01 | 5.78E-01 | 5.73E-01 |
| 7.16E-01 | 6.91E-01 | 6.72E-01 | 6.55E-01 | 6.42E-01 | 6.30E-01 | 6.21E-01 | 6.12E-01 | 6.04E-01 | 5.97E-01 |
| 7.62E-01 | 7.34E-01 | 7.11E-01 | 6.91E-01 | 6.75E-01 | 6.61E-01 | 6.49E-01 | 6.39E-01 | 6.29E-01 | 6.20E-01 |

FIG. 34

| ADDRESS | USER DATA | | | | | | | | | | | PARITY (PO) |
|---|---|---|---|---|---|---|---|---|---|---|---|---|
| SY0 | SY1 | USER DATA | | | | | | | | | | PARITY (PI) |
| SY2 | SY3 | USER DATA | | | | | | | | | | PARITY (PI) |
| SY4 | SY5 | USER DATA | | | | | | | | | | PARITY (PI) |
| SY6 | SY7 | USER DATA | | | | | | | | | | PARITY (PI) |
| SY8 | SY9 | USER DATA | | | | | | | | | | PARITY (PI) |
| SY10 | SY11 | USER DATA | | | | | | | | | | PARITY (PI) |
| SY12 | SY13 | USER DATA | | | | | | | | | | PARITY (PI) |
| SY14 | SY15 | USER DATA | | | | | | | | | | PARITY (PI) |
| SY16 | SY17 | USER DATA | | | | | | | | | | PARITY (PI) |
| SY18 | SY19 | USER DATA | | | | | | | | | | PARITY (PI) |
| SY20 | SY21 | USER DATA | | | | | | | | | | PARITY (PI) |
| SY22 | SY23 | USER DATA | | | | | | | | | | PARITY (PI) |
| SY24 | SY25 | PARITY (PO) | | | | | | | | | | |

| DETECTION AREA SPECIFICATION INFORMATION | SUB INFORMATION EXISTENCE INFORMATION |
|---|---|
| START ADDRESS: i<br>END ADDRESS: i+15 | YES |
| START ADDRESS: j<br>END ADDRESS: j+15 | NO |

OPTICAL DISC, RECORDING APPARATUS AND METHOD, AND REPRODUCTION APPARATUS AND METHOD

TECHNICAL FIELD

The present invention relates to an optical disc such as a DVD, a recording apparatus, and a reproduction apparatus. More particularly, the present invention relates to an improvement in a technique for preventing copyright-protected data recorded on the optical disc from being used by an unauthorized party.

BACKGROUND ART

The traders of DVDs containing digital contents such as movies are on their guard against the distribution or sale of pirated discs produced by unauthorized parties. Such pirated discs are produced with the use of two driving apparatuses. More specifically, a DVD containing a digital content is inserted into one (first) driving apparatus, and an optical disc is inserted into the other (second) driving apparatus. While the first driving apparatus obtains a read signal by reading the digital content from the DVD and converts the read signal into digital data, the second driving apparatus generates a write signal in accordance with the digital data, and writes a copy of the digital content onto the optical disc in accordance with the write signal.

The above operation is performed for each track on the whole (entire) data recording area of the DVD while the two discs are rotated in synchronization with each other by the spindle motors of the two driving apparatuses. In this way, a pirated disc containing a complete copy of the digital content in the DVD is produced. Typically, digital contents are recorded on DVDs after being encrypted by a standardized technique called a contents encryption method. It is thought that decrypting such digital contents is difficult. This contents encryption method, however, is invalid for the above-introduced pirated-disc producing technique since the digital contents, together with the encryption key, are copied as they are encrypted. If pirated discs are produced in an organized manner to allow thousands of pirated discs to appear on the market, copyright owners of digital contents will be damaged heavily.

Another technique for preventing the production of pirated discs superposes an encryption key by using jitters that appear on the read signal obtained from DVDs. General driving apparatuses convert read signals into digital data after correcting jitters by using a Phase-Locked Loop (PLL). Accordingly, if digital contents are copied by the above-mentioned pirated-disc producing technique using two driving apparatuses, the copies cannot be reproduced since the copied discs lack encryption keys.

However, when a DVD containing a digital content recorded by the other technique is reproduced, natural jitters appear on the read signal, as well as the jitters superposed as the encryption key. Such jitters may cause erroneous bits or bit shifts to prevent proper reproduction of the optical disc. This is especially the case for conventional reproduction apparatuses that cannot recognize jitters as an encryption key.

It also possible that the natural jitters are recognized as part of the encryption key to cause erroneous bits of the encryption key. When the encryption key is recognized erroneously due to this, the digital contents recorded on the DVD cannot be decoded. This damages the reliability of DVD and the reproduction apparatus.

SUMMARY OF THE INVENTION

It is therefore a first object of the present invention to provide an optical disc on which sub information is recorded so that even if natural jitters appear, the sub information as the encryption key or the like is correctly recognized.

It is a second object of the present invention to provide an optical disc on which the sub information is superposed in a manner which does not cause garbled bits or erroneous bit recognition.

The above objects are achieved by an optical disc comprising a sector including a plurality of frames which are classified into a first type and a second type. The first-type frames include a plurality of recording marks whose edges are at standard positions, and the second-type frames include a plurality of recording marks whose edges are displaced from standard positions. The displaced edges in the second-type frames are classified into (a) leading edges that exist before standard positions and (b) lagging edges that exist after standard positions. The leading edges and the lagging edges are arranged in accordance with a predetermined rule.

When reading the above optical disc, the reproduction apparatus can recognize whether a bit value of "1" or "0" is superposed on the main information in the frames by performing a statistics process in which the reproduction apparatus checks whether leading/lagging errors appearing in the read signal conform to the predetermined rule.

Even if natural jitters appear due to dust or flaws on the surface of the disc when the data field area is read, such jitters can be ignored as errors in the statistics. As a result, each bit of the sub information can be set without receiving the influence of the natural jitters.

The above objects are also achieved by an optical disc in which the leading edges and the lagging edges cause jitters, and an edge displacement amount $\Delta t$ is determined from Formula 1: $\sigma' \geq \sqrt{\sigma^2 + \Delta t^2}$, where $\sigma$ denotes a standard deviation of base jitters that occur naturally, and $\sigma'$ denotes a permissible jitter amount for the optical disc.

With the above construction, it is possible to set a standard deviation for jitters that does not exceed the tolerance level for the case where the main information and the sub information are recorded on the optical disc, by taking an originally set standard deviation for jitters for the optical disc into consideration. This enables the sub information to be recorded on the optical disc conforming to the standard deviation for jitters at shipment even if the standard deviation is defined severely, as is the case with a DVD. Accordingly, even if the optical disc is inserted into a reproduction apparatus that does not recognize jitters as the sub information, the frequency of detection of garbled bits or erroneous bit recognition by the reproduction apparatus is restricted.

BRIEF DESCRIPTION OF THE DRAWINGS

FIG. 9 shows how sub information bits are assigned to frames constituting a sector.

FIG. 14A shows a distribution curve representing a probability P(t) of the position of an edge in a read signal, where "t" denotes a distance from the phase 0.

FIG. 14B shows a distribution curve P1($t$) for a case where half the total number of edges are leading edges.

FIG. 14C shows a distribution curve P2($t$) for a case where half the total number of edges are lagging edges.

FIG. 14D shows a distribution curve Pm(t).

FIG. 15A shows how the expectation E is obtained from the distribution curve Pm(t).

FIG. 15B shows how the standard deviation σ' is obtained from the distribution curve Pm(t).

FIG. 16 is a table showing a correspondence between (a) a plurality of values the base jitter may have, (b) a plurality of values the displacement amount Δt may have, and (c) a plurality of values the standard deviation σ' for the distribution curve Pm(t) may have.

FIG. 17 is a table showing a correspondence between (a) a plurality of values the base jitter may have, (b) a plurality of values the displacement amount Δt may have, and (c) the probability of a detection error occurring in the main information.

FIG. 18 is a table showing a correspondence between (a) a plurality of values the base jitter may have, (b) a plurality of values the displacement amount Δt may have, and (c) a plurality of values the edge phase detection probability may have.

FIG. 34 shows the frames differently arranged from FIG. 33.

DETAILED DESCRIPTION OF THE INVENTION

The following describes eight embodiments of the present invention with reference to the attached drawings.

FIRST EMBODIMENT

The first Embodiment of the present invention describes the structure of an optical disc.

Figure 1:
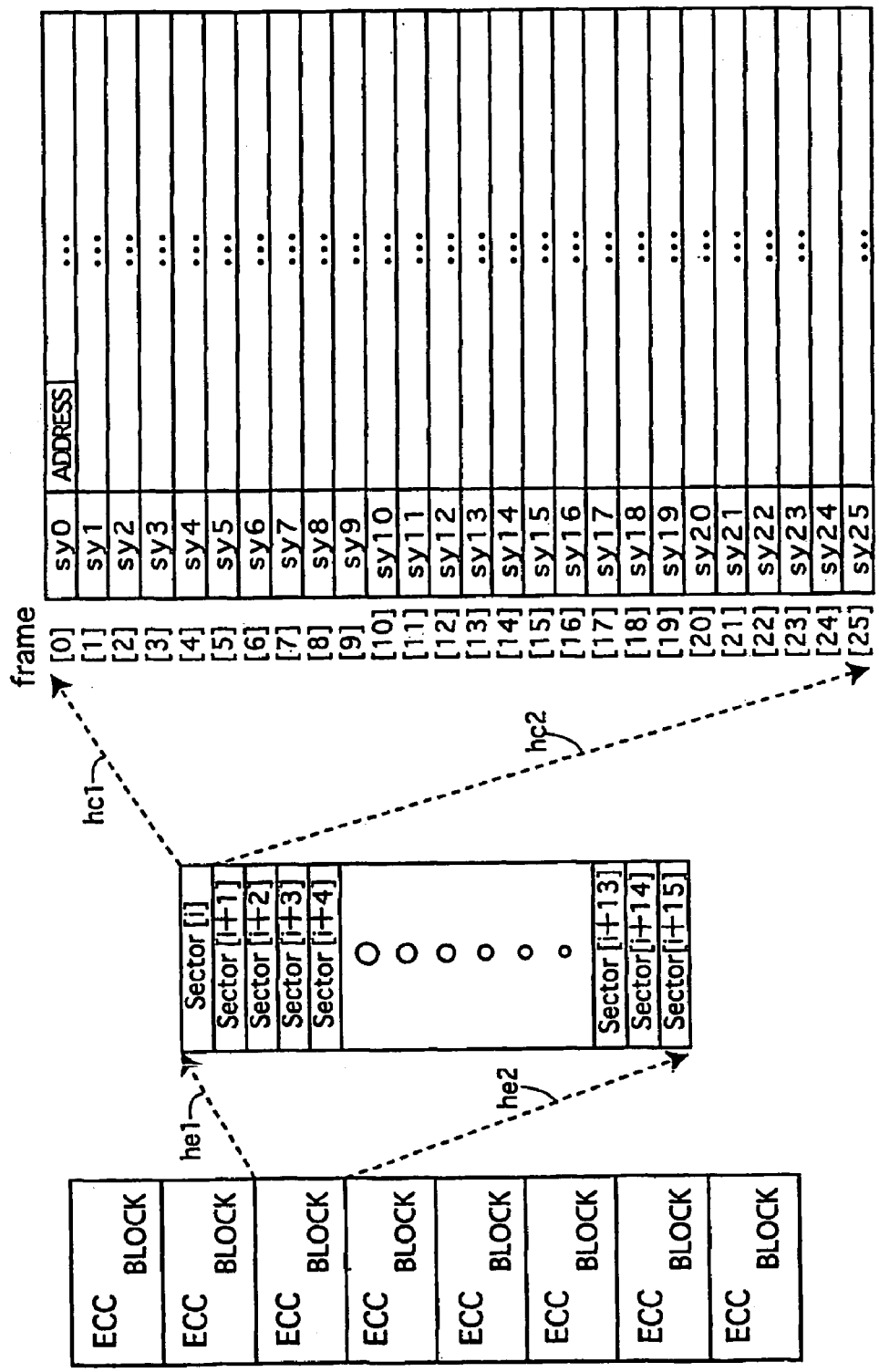
FIG. 1 shows a hierarchical structure of the optical disc according to the first embodiment of the present invention.

The optical disc has a hierarchical structure composed of ECC blocks, sectors, and the like. FIG. 1 shows the hierarchical structure. As indicated by the dotted leader lines he1 and he2 shown in FIG. 1, one ECC block is composed of 16 sectors. As indicated by the dotted leader lines hc1 and hc2, one sector is composed of 26 frames, each of which is 2 kilobytes in capacity.

Frame Structure

Figure 2:
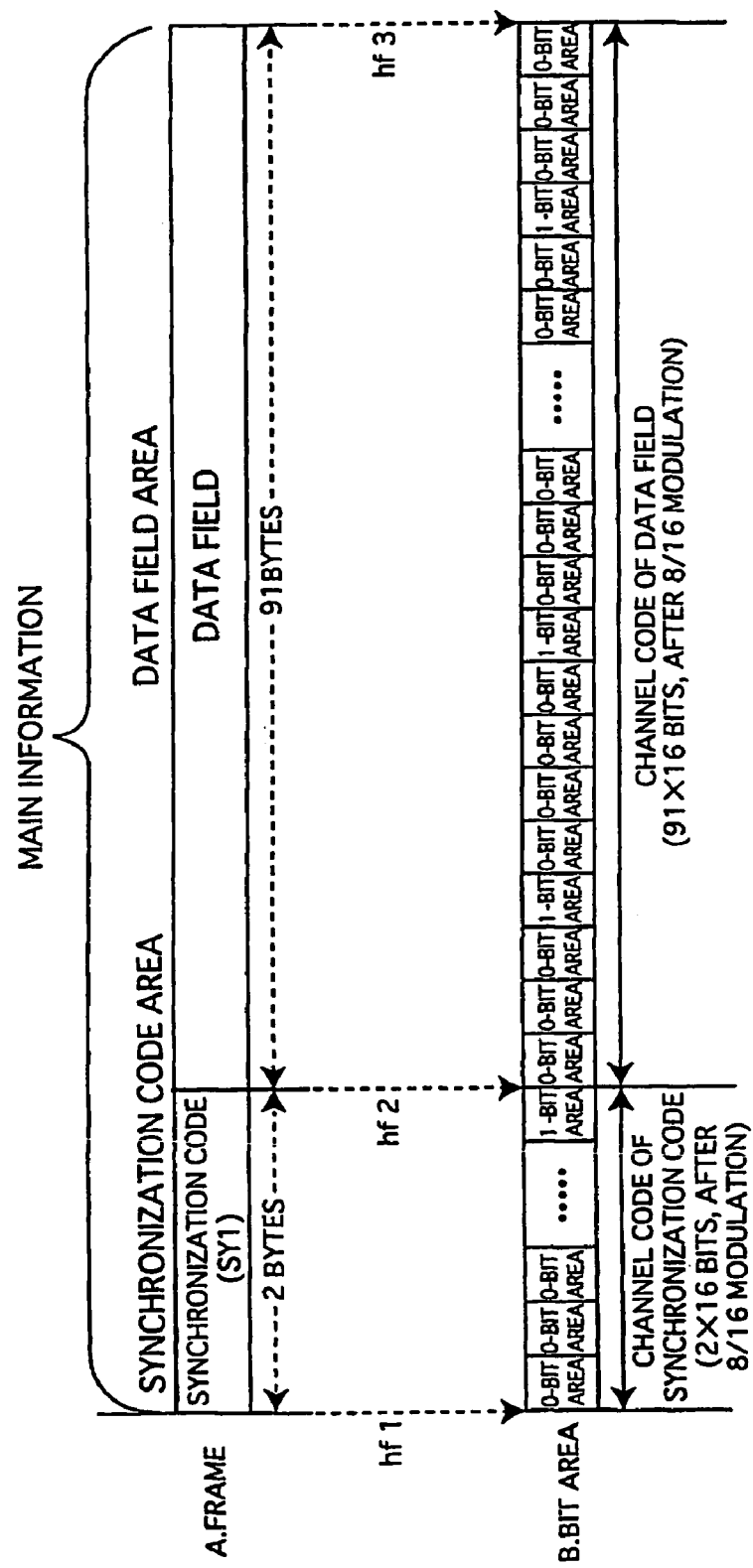
FIG. 2 shows the structure of frames constituting a sector.

FIG. 2 shows the frame structure. Each frame is an area on which a piece of main information is recorded. Each piece of main information contains a 2-byte synchronization code and a 91-byte data field. As indicated by the row "A" shown in FIG. 2, each frame is composed of a synchronization code area for storing the synchronization code and a data field area for storing the data field. In the actual recording, an 8/16 modulation is performed on the synchronization code and the data field, and the data after the 8/16 modulation is recorded onto the optical disc. Here, the 8/16 modulation is a coding method in which 8-bit data is converted into 16-bit data. It is well known that the 8/16 modulation is adopted for the DVD. With the 8/16 modulation, each piece of 8-bit data constituting the original data is converted into 16-bit data. More specifically, the conversion is performed by using a conversion table and through the conversion, 2 to 10 bit values "0" are inserted between a sequence of two bit values "1" in the original data. That is to say, "11" in the original data is converted into any of "1001" to "1 0000 0000 001". Bit sequences obtained by performing the 8/16 modulation on the synchronization codes and the data fields are referred to as channel codes. Bits constituting the channel codes are referred to as channel bits.

Figure 3:
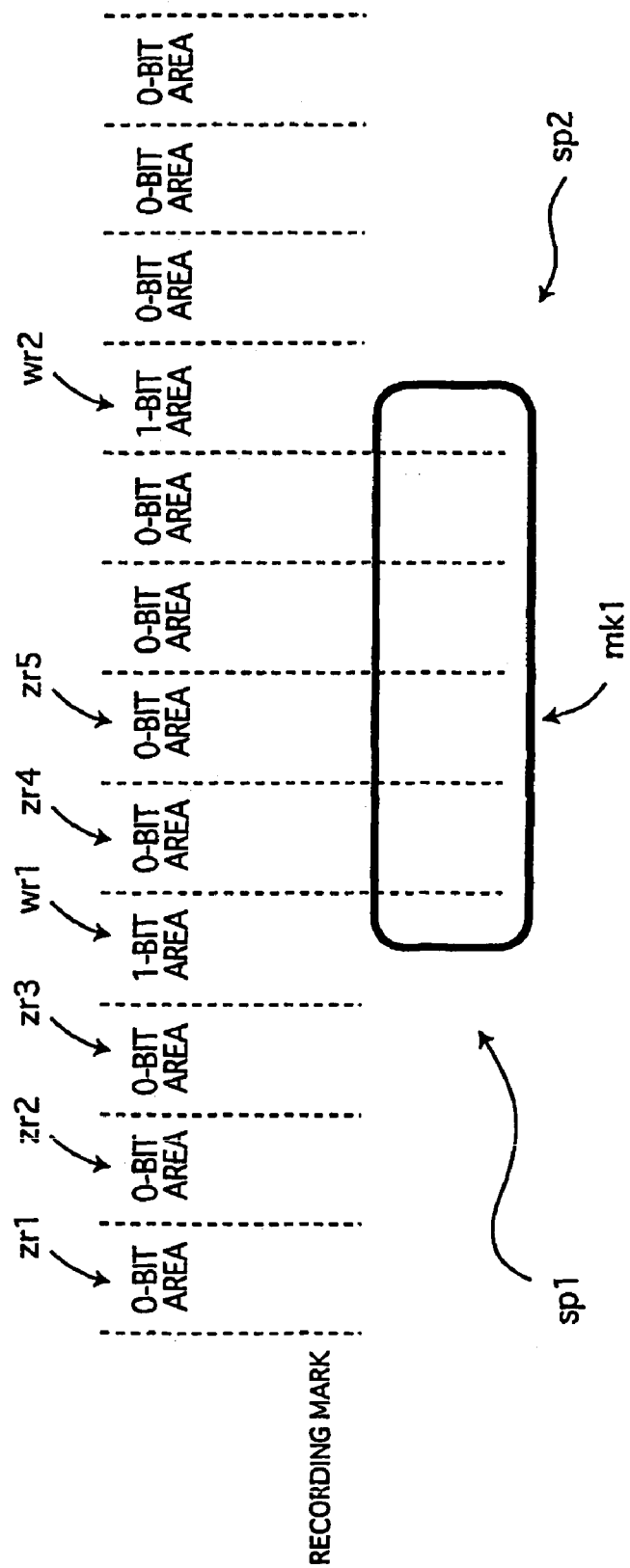
FIG. 3 shows an example of how the 0-bit areas and the 1-bit areas constituting the data field area correspond to recording marks.

The row "B" in FIG. 2 shows a detailed structure of the synchronization code area and the data field area. As indicated by the dotted arrows hf1, hf2, and hf3, the synchronization code area and the data field area stores channel codes of the synchronization code and the data field, respectively. Each of the synchronization code area and the data field area is composed of 0-bit areas storing channel bits "0" and 1-bit areas storing channel bits "1". The synchronization code area is 2×16 bits in size, and the data field area 91×16 bits. FIG. 3 shows an example of how the 0-bit areas and the 1-bit areas constituting the data field area correspond to recording marks. In FIG. 3, a plurality of 0-bit areas and 1-bit areas reside on a recording mark mk1.

Recording Mark

The recording marks correspond to pits in read-only optical discs such as a DVD-ROM. The recording marks also correspond to amorphous fields in recordable optical discs such as a DVD-RAM, where the amorphous fields being are formed when optical beams are applied to phase-change type metal thin films.

The 0-bit areas zr1, zr2, zr3, . . . are sequential areas on a track. Each 0-bit area is 0.133 μm in length, for example. There are two types of 0-bit areas: (1) 0-bit areas within the recording mark mk1; and (2) 0-bit areas in spaces sp1 and sp2 outside the recording mark.

The 1-bit areas wr1 and wr2 are also sequential areas on a track. Each 1-bit area is 0.133 μm in length, for example. Each 1-bit area has an edge of a recording mark at its center.

Now, how these 0-bit and 1-bit areas are read out will be described with reference to FIG. 4. The rows C and D in FIG. 4 indicate the 0-bit and 1-bit areas and the recording mark shown in FIG. 3. The row A in FIG. 4 indicates a clock signal that is used when the 0-bit and 1-bit areas are read out. The clock signal is composed of a plurality of clock pulses. The cycle of each clock pulse corresponds to the whole length of each of the 0-bit and 1-bit areas, as indicated by the dotted lines tx1, tx2, tx3, . . . . Each clock pulse has a time period of 38.23 nsec, for example.

Figure 4:
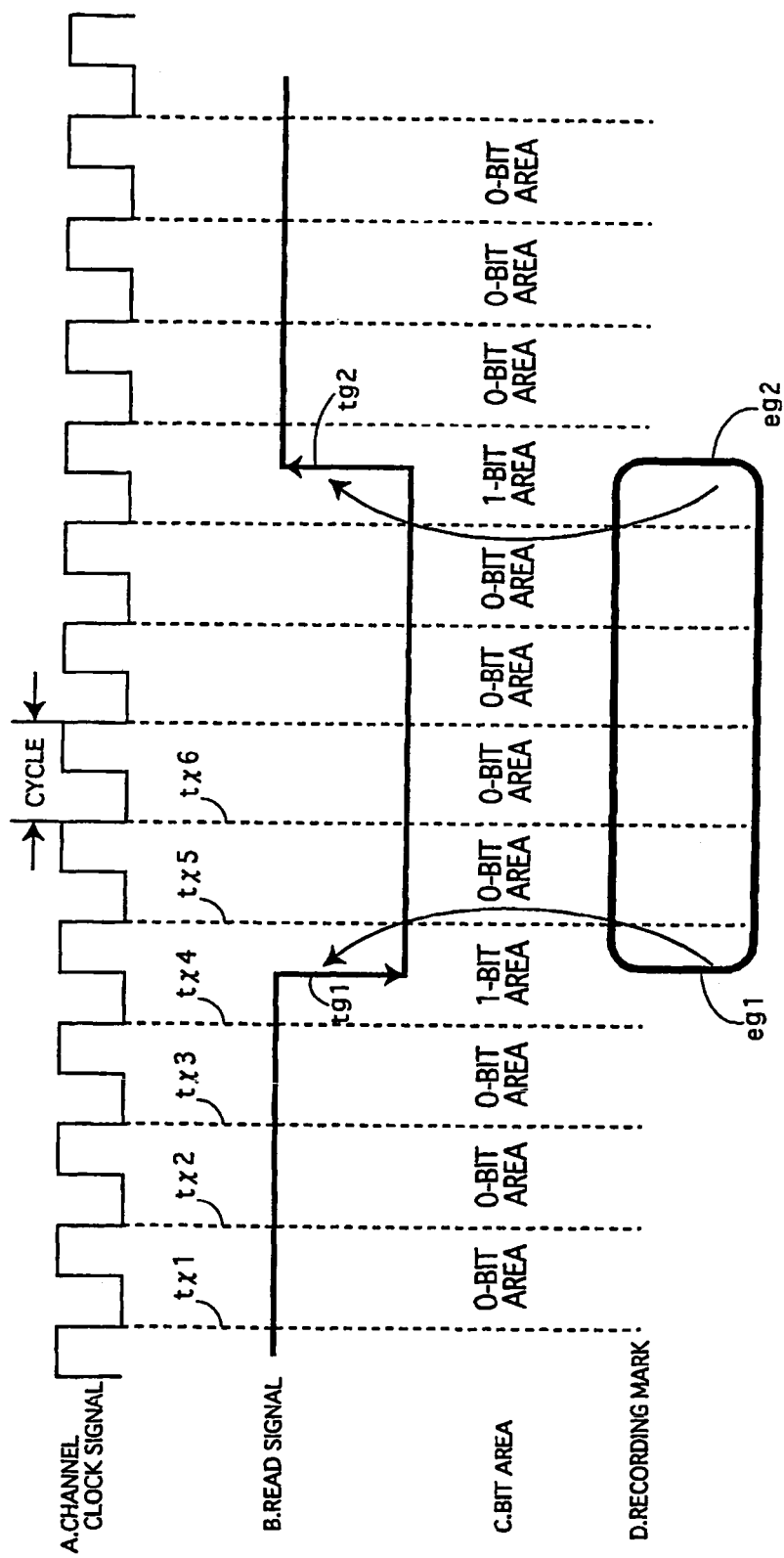
FIG. 4 shows how the 0-bit and 1-bit areas are read out.

The row B in FIG. 4 indicates a read signal that is obtained by reading out the 0-bit and 1-bit areas. The read signal is composed of (a) a High section corresponding to a space shown in the row D, and (b) a Low section corresponding to the recording mark. The change point between the High section and the Low section corresponds to an edge of the recording mark. That is to say, a falling edge tg1 in the read signal corresponds to an edge eg1 of the recording mark, and a rising edge tg2 corresponds to an edge eg2 of the recording mark. By calculating the number of clocks corresponding to the High and Low sections, the zero run length of the channel bits is obtained. As described earlier, an edge of a recording mark is at the center of a 1-bit area that corresponds to the phase "0" of a clock pulse. As a result, the rising and falling edges appear at the phase 0 of the clock pulse. However, if the optical disc has a flaw or a smear on the surface or a rotation wobbling, the position of the rising edge or falling edge in the read signal may deviate from the phase 0 of the clock pulse.

Jitter and Phase-Leading/Lagging Error

Figure 5:
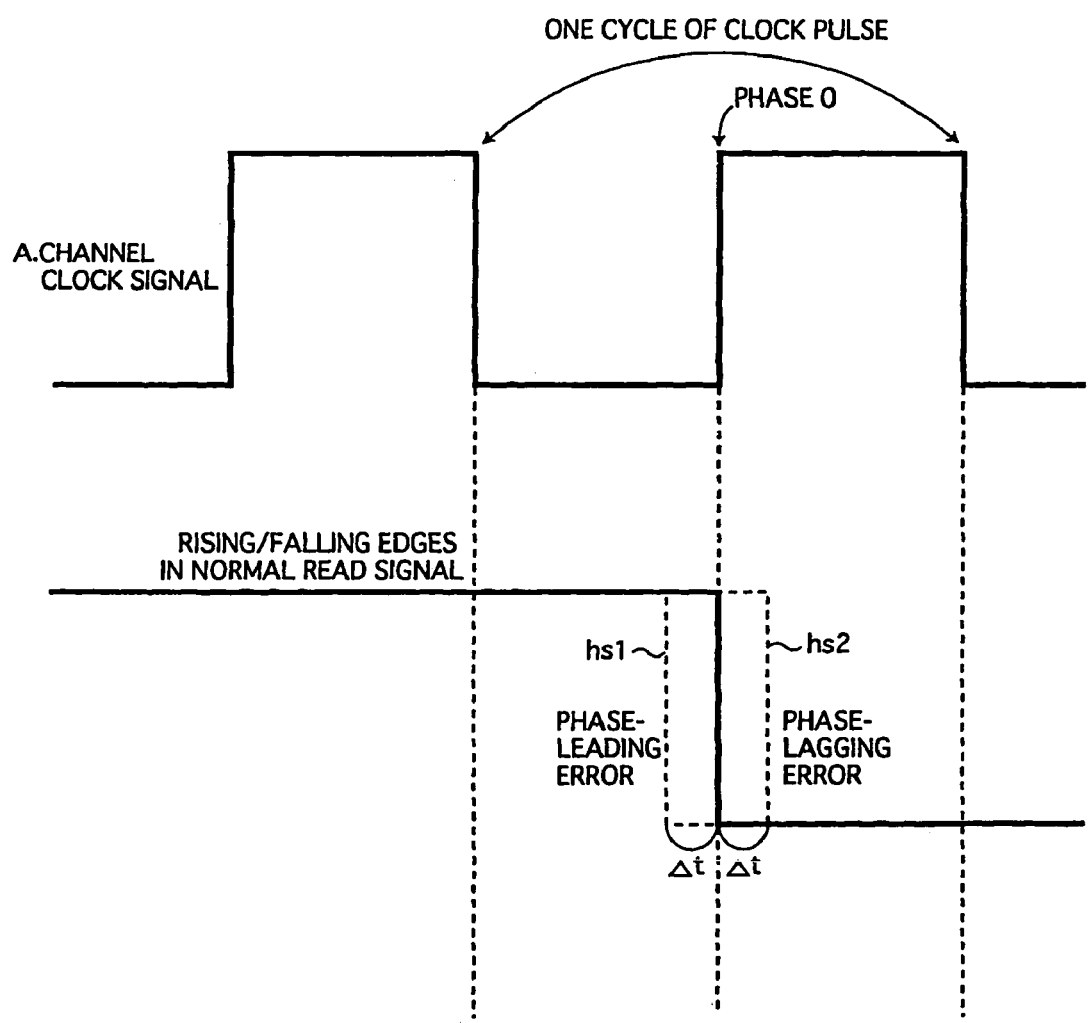
FIG. 5 shows a read signal in which a rising or falling edge is deviated.

FIG. 5 shows a read signal in which a rising (or falling) edge is deviated. There are two cases of deviations: a case where the rising/falling edge of the read signal leads the phase 0 of the clock pulse, as indicated by the dotted line hs1; and a case where the rising/falling edge lags behind the phase 0, as indicated by the dotted line hs2. The former case is referred to as "phase-leading error", and the latter case is referred to as "phase-lagging error". The phase-leading error and the phase-lagging error are generically referred to as jitters. The jitter is expressed as a percentage for one cycle of the clock pulse. It is said that a 7–8% jitter appears when data is read from a normal optical disc. A jitter has a serious effect when an error between the phase 0 of the clock pulse and the rising/falling edge of the read signal exceeds ±T/2 ("T" indicates one cycle of the clock pulse). This is because when the error exceeds ±T/2, the bit position in the read signal that should be recognized as bit value "1" is deviated forward or backward.

Phase-Leading/Lagging Edge

Figure 6:
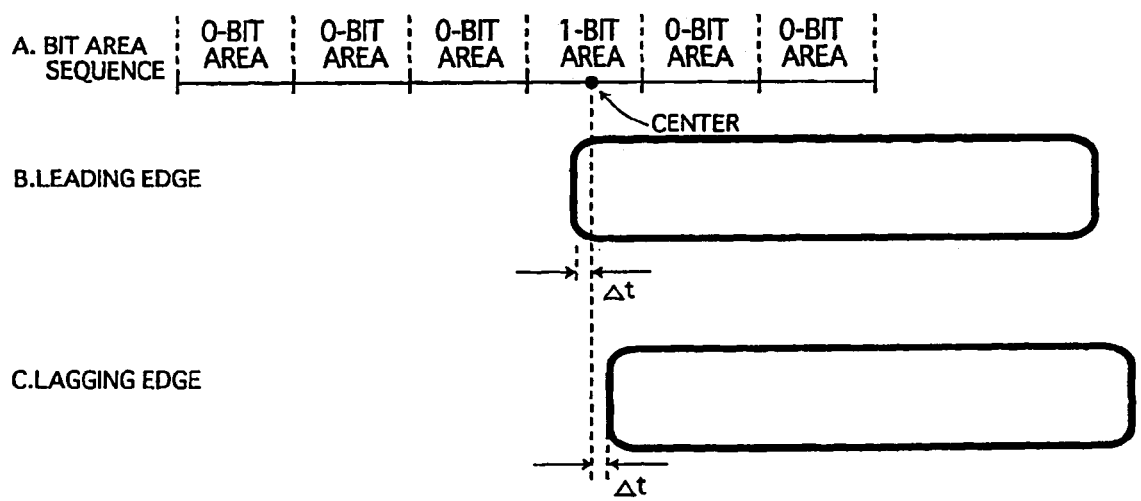
FIG. 6 shows an example of a recording mark in which an edge position is displaced so that a phase-leading error or a phase-lagging error is created.

Such jitters can be created deliberately by displacing the edge position of the recording mark. FIG. 6 shows an example of a recording mark in which an edge position is displaced so that a phase-leading error or a phase-lagging error is created. In FIG. 6, it is supposed that the disc rotates toward the left-hand side (counter-clockwise). Accordingly, it can be said that this rotational direction is also a direction in which the phase of the read signal leads, and the reversed rotational direction is also a direction in which the phase of the read signal lags. The recording mark edge shown in the row B in FIG. 6 leads the center of the 1-bit area by Δ t. Hereinafter, such an edge formed before the center is referred to as a "phase-leading edge". In a data reading, the phase-leading edge generates a phase-leading error.

The recording mark edge shown in the row C in FIG. 6 lags behind the center of the 1-bit area by Δ t. Hereinafter, such an edge formed after the center is referred to as a "phase-lagging edge". In a data reading, the phase-lagging edge generates a phase-lagging error. The first embodiment is characterized by sub information being represented by the phase-leading edges and the phase-lagging edges, where the sub information is created separately from the main information. However, a simple representation method where, for example, each phase-leading edge represents "0" and each phase-lagging edge represents "1" will not allow a deliberately created jitter constituting the sub information to be distinguished from a naturally created jitter. This will cause frequent reading errors. Taking this problem into consideration, in the first embodiment, each bit of the sub information is assigned to a set of three frames in the data field.

Assignment of Sub Information Bit

Figure 7:
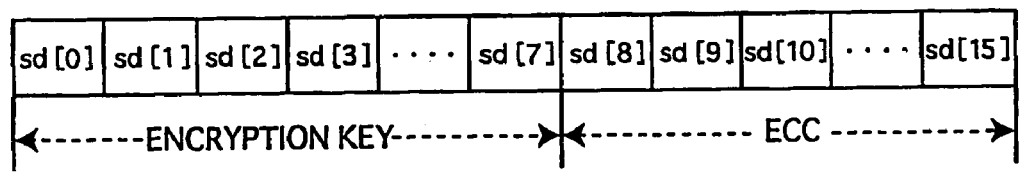
FIG. 7 shows the construction of the sub information.
Figure 8:
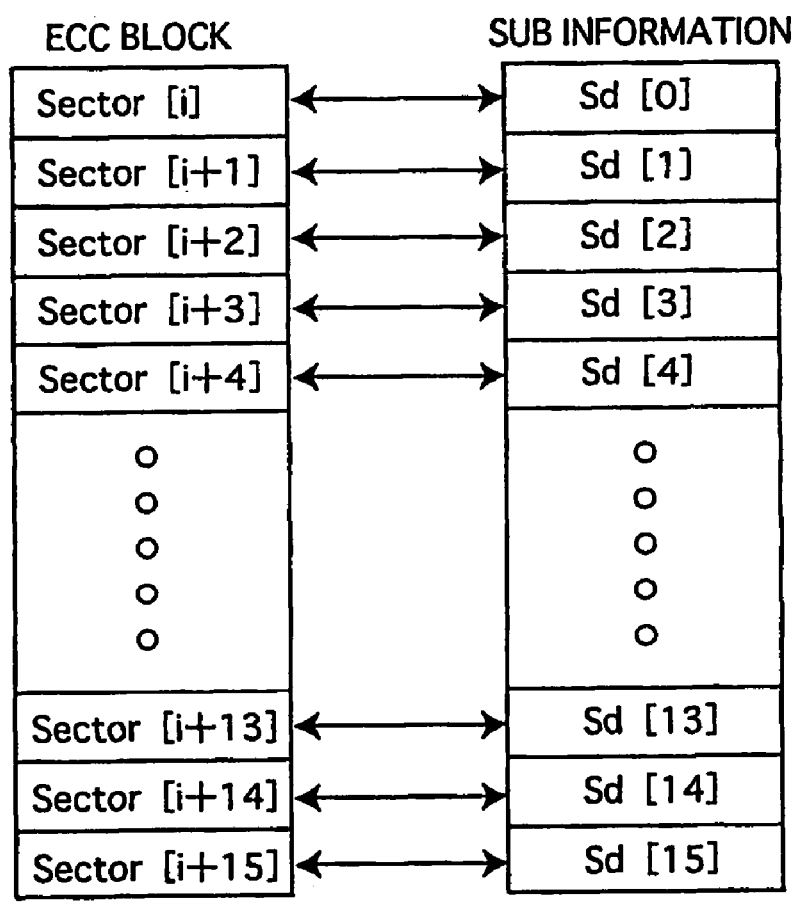
FIG. 8 shows the assignment of the bytes of the sub information to sectors of an ECC block.

FIG. 7 shows the construction of the sub information. The sub information to be recorded onto an optical disc has 16 bytes in length. Of these 16 bytes, 8 bytes consisting of sd[0] to sd[7] constitute an encryption key, and the other 8 bytes consisting of sd[8] to sd[15] constitute an error correction code (ECC). FIG. 8 shows the assignment of the bytes of the sub information to sectors of an ECC block. As shown in FIG. 8, the first byte sd[0] of the 16-byte sub information is assigned to the first sector Sector[0] of the ECC block, the second byte sd[1] is assigned to the second sector Sector[1], and so on. Also, each bit constituting a byte of the sub information is assigned to a corresponding set of three frames out of 24 frames [1] to [24] among 26 frames [0] to [25] constituting a sector. That is to say, the 24 frames [1] to [24] do not include the first and the last sectors of the 26 frames. FIG. 9 shows how sub information bits are assigned to frames constituting a sector. As shown in FIG. 9, "sd[i]b7" representing the $7^{th}$ bit of the $i^{th}$ byte in the sub information is assigned to the data field areas in the frames [1] to [3], excluding the frame [0]. The "sd[i]b6" representing the $6^{th}$ bit of the $i^{th}$ byte in the sub information is assigned to the data field areas in the frames [4] to [6]. The "sd[i]b5" representing the $5^{th}$ bit of the $i^{th}$ byte in the sub information is assigned to the data field areas in the frames [7] to [9]. Here, the data field areas in the assigned three frames have a data length of 3×91 bytes (=91×3×8 bits=2, 184 bits). Accordingly, it can be said that a sub information bit value "1" is assigned to a set of 3×91 bytes.

Superposing of Sub Information

Figure 10:
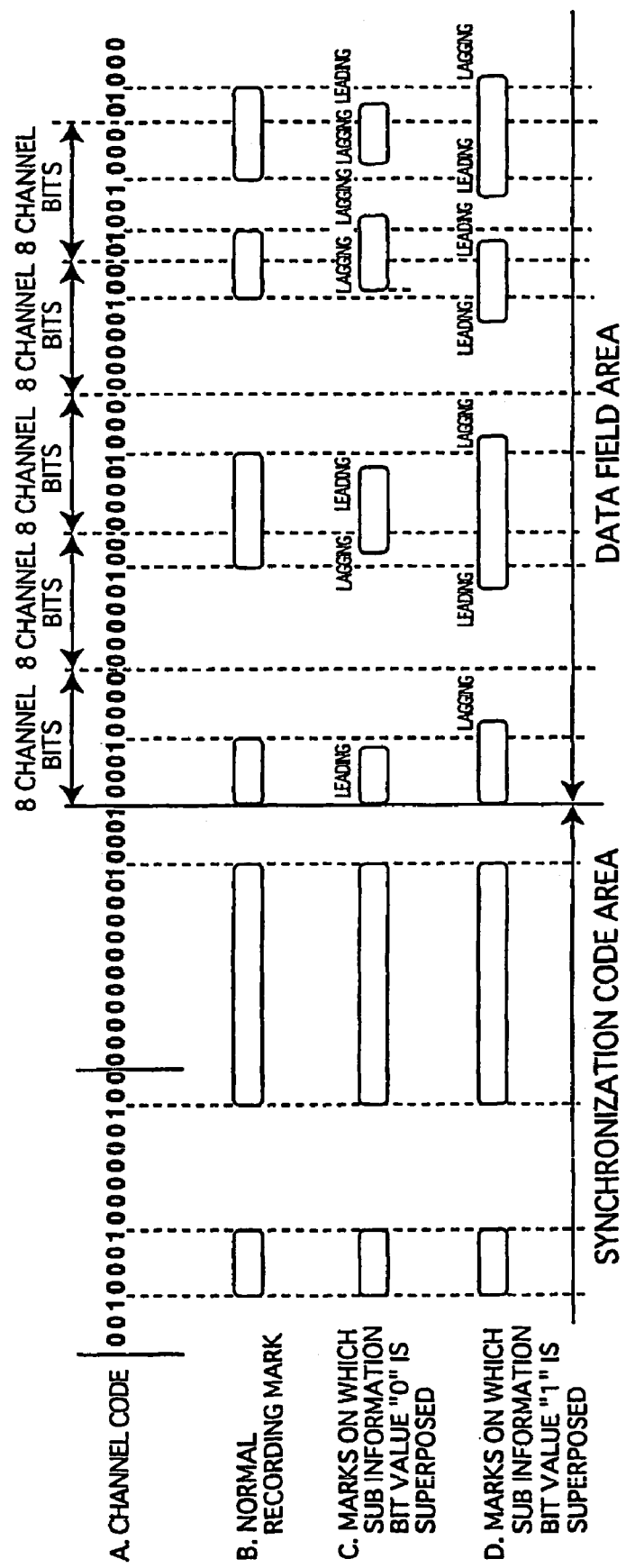
FIG. 10 shows for comparison (a) a case where a sub information bit value "1" is assigned to data field are as storing data fields and (b) another case where a sub information bit value "0" is assigned to the same data field areas storing the same data fields.

Now, how the sub information is superposed on the data field areas in the frames will be described. FIG. 10 shows for comparison (a) a case where a sub information bit value "1" is assigned to data field areas storing data fields and (b) another case where a sub information bit value "0" is assigned to the same data field areas storing the same data fields. The row B in FIG. 10 indicates recording marks corresponding to a channel code indicated in the row A. These recording marks are standard recording marks, that is to say, no sub information bit value is assigned to the recording marks. The row C indicates recording marks to which the sub information bit value "0" is assigned. The row D indicates recording marks to which the sub information bit value "1" is assigned. As shown in FIG. 10, the edges of the recording marks to which the sub information bit value "0" is assigned are, in the order, "leading", "lagging", "leading", "lagging", "lagging", "lagging", "leading". On the other hand, the edges of the recording marks to which the sub information bit value "1" is assigned are "lagging", "leading", "lagging", "leading", "leading", "leading", "lagging", which is just the reverse of the edges with bit value "0". As understood from this, the first embodiment superposes the sub information by displacing the edge positions in the data field areas, with certain regularity and the reverse of this regularity.

Regularity of Leading/Lagging Edges

The following is a description of the above-mentioned regularity. FIG. 11A shows, in the row A, a random number bit sequence that will be detailed later. Each random number bit value of the random number bit sequence is obtained through a certain calculation as will be described later, based on the channel bit sequence of the data field area. Each random number bit corresponds to a different set of 8 bits of the channel bit sequence, in the order. The regularity in the displacement of the recording mark edges corresponds to the random number bit sequence. The row B of FIG. 11A shows the same recording marks shown in FIG. 10 to which the sub information bit value "0" is assigned based on the following regularity. Each edge of recording marks is made to be "leading" or "lagging" in accordance with a corresponding random number bit value. More specifically, when a random number bit value is "1", corresponding recording mark edges are "leading" and when a random number bit value is "0", corresponding recording mark edges are "lagging". This regularity can be confirmed by the following examples: a leading edge eg1 of a recording mark rk1 in the row B corresponds to the first random number bit bt1 "1" in the row A; a lagging edge eg2 of a recording mark rk2 corresponds to the second random number bit bt2 "0"; and a leading edge eg3 of the recording mark rk2 corresponds to the third random number bit bt3 "1".

Reversed Regularity of Leading/Lagging Edges

The following is a description of a reversed regularity. FIG. 11B shows, a reversed random number bit sequence in the row A. Each reversed random number bit value of the random number bit sequence is obtained by reversing the random number bit sequence. Each reversed random number bit corresponds to a different set of 8 bits of the channel bit sequence, in the order. The regularity in the displacement of the recording mark edges corresponds to the random number bit sequence. The row B of FIG. 11B shows the same recording marks shown in FIG. 10 to which the sub information bit value "1" is assigned based on the following regularity. Each edge of recording marks is made to be "leading" or "lagging" in accordance with a corresponding reversed random number bit value. More specifically, when a reversed random number bit value is "1", corresponding recording mark edges are "leading", and when a reversed random number bit value is "0", corresponding recording mark edges are "lagging". This regularity can be confirmed by the following examples: a lagging edge eg5 of the recording mark rk1 in the row B corresponds to the first reversed random number bit ht0 "0" in the row A; a leading edge eg6 of the recording mark rk2 corresponds to the second reversed random number bit ht1 "1"; and a lagging edge eg7 of the recording mark rk2 corresponds to the third reversed random number bit ht2 "0".

Since the regularity of the displacement of recording mark edges corresponds to the random number bit sequence or the reversed random number bit sequence, the reproduction apparatus can obtain each bit value of the sub information by performing the following statistics process, without fail.

Statistics Process for Detecting Sub Information

Figure 11:
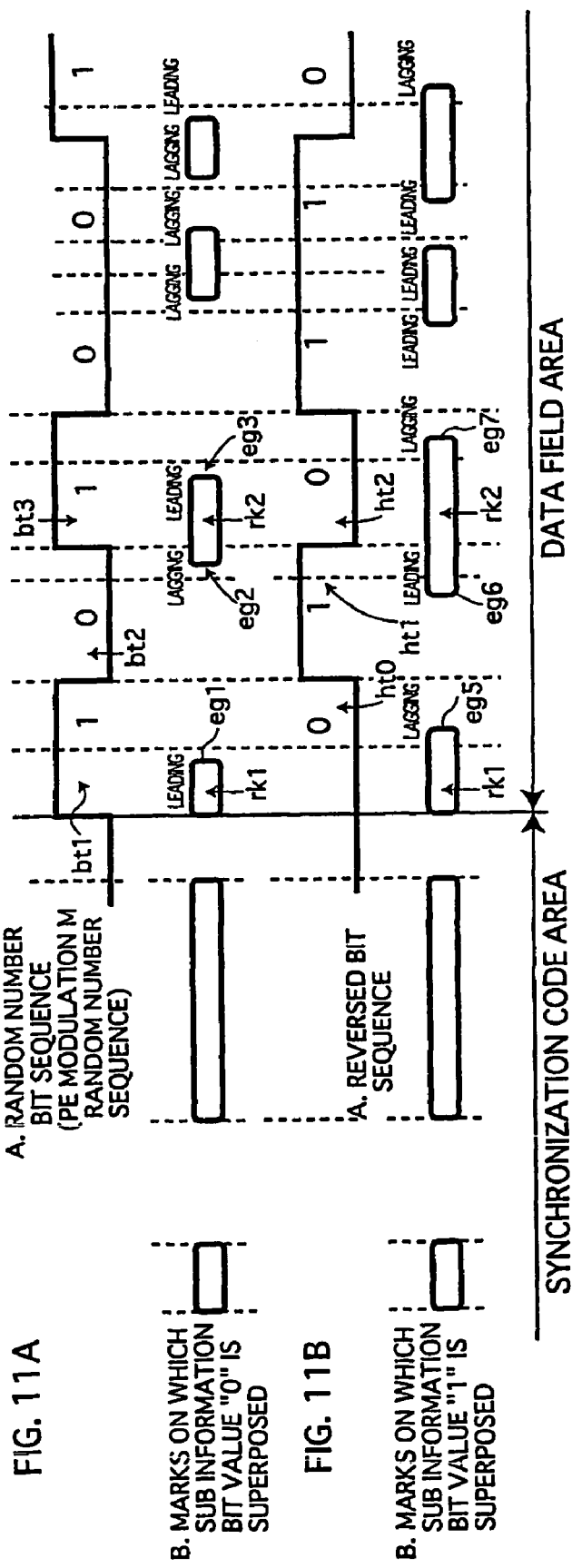
FIG. 11A shows a correspondence between a random bit sequence and recording marks corresponding to the sub information bit value "0" shown in FIG. 10.
FIG. 11B shows a correspondence between a reversed random bit sequence and recording marks corresponding to the sub information bit value "1" shown in FIG. 10.
Figure 12:
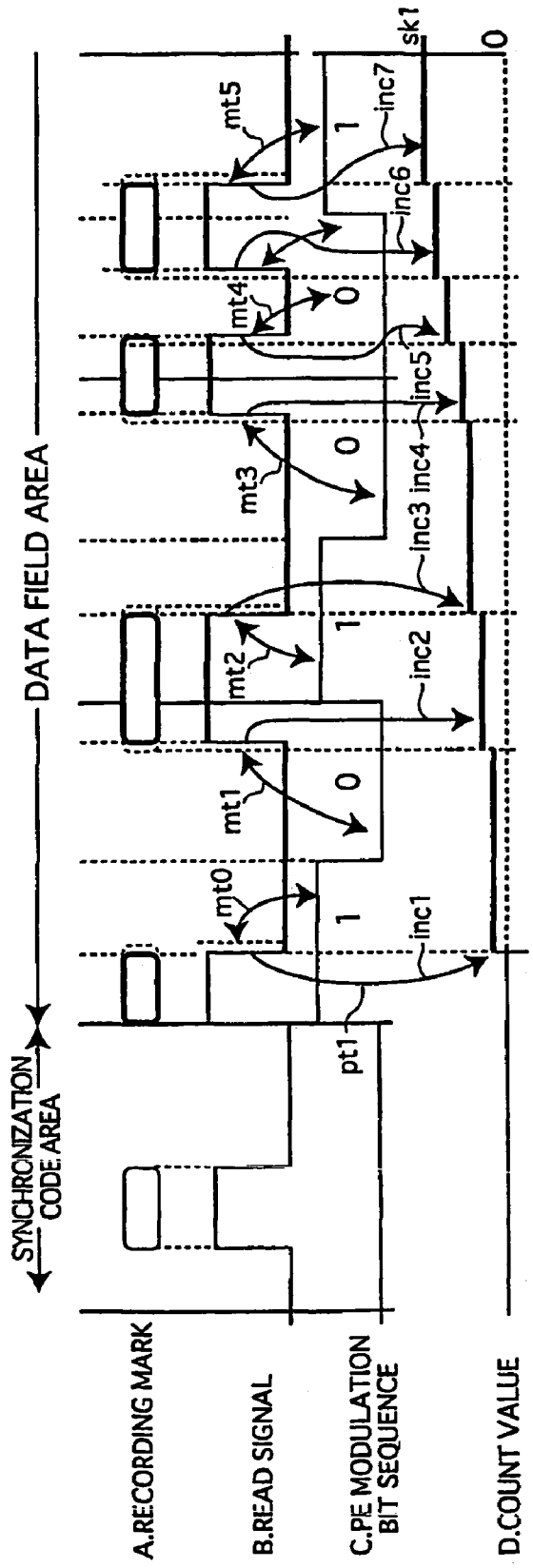
FIG. 12 shows how the statistics process is performed for the data field areas to which the sub information bit value "0" is assigned.

When data recorded in accordance with the present invention is read from an optical disc by a reproduction apparatus, the leading errors and lagging errors are detected when frames are read. To read the sub information superposed on the data, the reproduction apparatus generates the random number bit sequence from a read sequence of channel bits of the data field area. While generating each bit of the random number bit sequence, the reproduction apparatus monitors whether the read signal for the data field area has a leading error when random number bit value "1" is generated, and whether the read signal has a lagging error when random number bit value "0" is generated. Every time the judgment is made positively in the monitoring, a count value is incremented. FIG. 12 shows how the statistics process is performed for the data field areas to which the sub information bit value "0" is assigned. The row A in FIG. 12 indicates the recording marks shown in FIG. 11A, including leading edges and lagging edges. The row B shows a read signal that is obtained when the recording marks are read out. The row C indicates a PE modulation bit sequence generated in the reproduction apparatus, which is the same as the random number bit sequence shown in FIG. 11A. The row D shows how the count value is incremented. As shown in FIG. 12, each time a match between a bit value and a corresponding leading or lagging error is observed, the count value is incremented as indicated by the arrows "inc1", "inc2", "inc3", "inc4", . . . , where "mt0" and "mt2" indicate a match between a leading error and bit value "1", and "mt1", "mt3", and "mt4" indicate a match between a lagging error and bit value "0". The count value incremented in this manner reaches a positive value "sk1".

Figure 13:
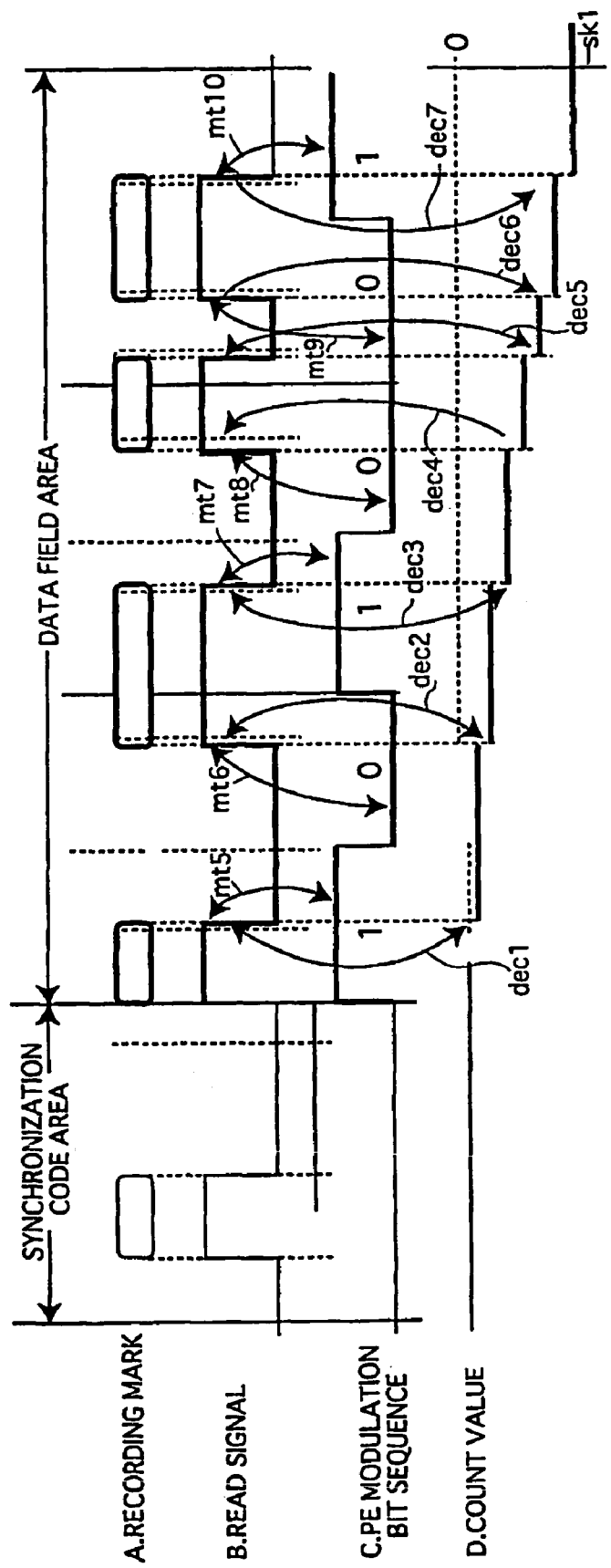
FIG. 13 shows how the statistics process is performed for the data field areas to which the sub information bit value "1" is assigned.

On the other hand, each time a reversed match between a bit value and a corresponding leading or lagging error is observed, the count value is decremented. FIG. 13 shows how the statistics process is performed for the data field areas to which the sub information bit value "1" is assigned. The row A in FIG. 13 indicates the recording marks shown in FIG. 1B, including leading edges and lagging edges. The row B shows a read signal, and the row C indicates a PE conversion bit sequence generated in the reproduction apparatus, which is the same as the random number bit sequence shown in FIG. 11B. The row D shows how the count value is decremented. As shown in FIG. 13, each time a reversed match between a bit value and a corresponding leading or lagging error is observed, the count value is decremented as indicated by the arrows "dec1", "dec2", "dec3", "dec4", . . . , where "mt5", "mt7", and "mt10" indicate a reversed match between a lagging error and bit value "1", and "mt6", "mt8", and "mt9" indicate a reversed match between a leading error and bit value "0". The count value decremented in this manner reaches a negative value "−sk1". It is expected that a read signal of an area on which the sub information is not superposed shows a value that is closer to 0 than the positive value "sk1" or negative value "−sk1". This is because, there is no leading or lagging error in this area. Even if there are some errors, the errors do not have the regularity. It is expected that the distribution curve of the jitters detected from recording marks whose edges have not been displaced deliberately shows a normal distribution. It is expected that if the above statistics process is applied to such natural errors, an average of the count values becomes 0.

After the above matching process is completed for one frame, the positive and negative count values are compared with a positive and negative threshold values, respectively. When the positive count value exceeds the positive threshold value, it is recognized that the sub information bit value "0" is assigned to the data field area. When the negative count value exceeds the negative threshold value, it is recognized that the sub information bit value "1" is assigned to the data field area.

A sub information recognition error does not occur to the areas on which the sub information has not been superposed, since, as stated above, even if the areas include natural errors, the count value for the errors becomes close to 0. Also, even if natural errors are detected in the areas on which the sub information has been superposed, the natural jitters are recognized as a statistics error since the count values are compared with the positive and negative threshold values, for each frame.

PE Modulation Bit Sequence

The PE modulation bit sequence is a bit sequence that is obtained by performing a PE (Phase Encode) modulation onto bits constituting an M random number sequence. Here, the M random number sequence is a pseudo-random number sequence whose one cycle is equal to the longest bit sequence among bit sequences that can be generated with a certain primitive polynomial. The M random number sequence has a low probability that values of either "0" or "1" appear in succession. In contrast, the PE modulation is a modulation in which each bit value "0" in the M random number sequence is replaced by two bit values "10", and each bit value "1" in the M random number sequence is replaced by two bit values "01". After the PE modulation is performed, each unit of 16 channel bits for the data field corresponds to one random number bit value "0" and one random number bit value "1". This provides a very low probability that leading or lagging jitters appear in succession since leading and lagging errors are assigned to the random number (or reversed random number) bit values "0" and "1", respectively. The reason why the leading or lagging jitters cannot appear in succession is as follows.

When reading a data field area, the reproduction apparatus allows an embedded PLL circuit to generate a clock signal. The PLL circuit always monitors a phase difference between the clock pulse and a falling/rising edge in the read signal. When jitters of the same type (leading or lagging) appear in succession for a plurality of clock pulses, the PLL circuit exercises a control so as to eliminate a phase difference, by increasing or decreasing the frequency of the clock pulse. That is to say, when jitters with a leading error or a lagging error appear in succession, the PLL circuit generates a clock signal having a clock pulse having such a frequency that eliminates the phase difference. This may inhibit the reproduction apparatus from detecting the succeeding jitters. Taking this control by the PLL circuit into consideration, the first embodiment prevents the leading errors or lagging errors from appearing in succession, by assigning the leading and lagging edges based on the random number bit sequence obtained by the PE modulation.

Synchronization Code Area

Synchronization codes are used to detect the starting positions of the frames. The read signals read from the synchronization code area have a unique pattern. By reading this unique pattern, the starting positions of the frames are detected. When this unique pattern is not detected by a misidentification or the like, the starting position of a frame is not detected correctly. As shown in FIGS. 10 and 11, no leading or lagging edge resides in the synchronization code area. That is to say, no jitter is detected when the synchronization code area is read, excluding natural jitters. This is because a special consideration is given so that the synchronization code area is more accurately recognized than the data field area. Since the synchronization code area does not contain a leading or lagging edge, the random number bit sequence shown in FIGS. 12 and 13 is generated immediately after the synchronization code area. As described earlier, each sub information bit is assigned to a different set of three frames. Each set of three frames has three synchronization code areas. Therefore, there are three occasions for resetting the random number bit sequence for each detection of a sub information bit. Even if an incorrect bit reading occurs due to a jitter occurring at the start of the first frame of a set of three frames, the incorrect bit reading does not occur in the second frame onwards since the random number bit sequence is reset to be immediately after the synchronization code area in the second frame. As a result, if a difference between a rising/falling edge of the read signal and the phase 0 of the clock pulse exceeds one cycle and half due to an occurrence of a jitter while leading and lagging edges are read, the incorrect bit reading only occurs in one frame.

Address

Addresses are used to detect reading positions. In reproducing an optical disc, a light beam is moved to a position on which a specified address is recorded, the address is confirmed, and the contents following the address are reproduced. A misidentification of an address causes a reproduction performance degradation such as a delay in reaching a specified address on the optical disc, or a reproduction of contents at an incorrect position. Also, when it takes a long time before identifying an address due to a delay in the error correction process, the reproduction delays since it takes a long time before detecting the light beam position. The first embodiment therefore prevents the reproduction performance from degrading by omitting the assignment of a sub information bit to the frame [0] (i.e. first channel signal) containing an address.

Also, a sub information bit is not assigned to the frame [25]. The reason for this is as follows. Frames are read in sequence by the reproduction apparatus. When a frame [25] is incorrectly read, a frame [0] that follows the frame [25] is also incorrectly read. A sub information bit is not assigned to the frame [25] to avoid such an ill effect. Note that it is preferable for the same reason that a sub information bit is not assigned to a frame [1] that succeeds a frame [0].

As described above, it is possible with the first embodiment to detect whether a sub information bit value "1" or "0" is assigned to sets of frames by performing the statistics process in which the detected leading and lagging errors have a certain regularity or a reversed regularity of this. Even if a natural jitter occurs due to dust or a flaw on the disc surface, it is possible to set sub information bit values without being affected by the natural jitter.

In the first embodiment, the random number bit sequence is reset to be immediately after the synchronization code. However, the random number bit sequence may be reset to be at a position a certain offset away from the end of the synchronization code. Preferably, the offset is a data length of an address contained in the frame [0]. Alternatively, the offset may be changed in accordance with the contents of the data field. Furthermore, the first bit of the random number bit sequence may be alternately changed, and the leading and lagging edges may be formed based on the alternately changing first bit. Also, the offset may correspond to a delay that occurs when the synchronization signal detection unit of the reproduction apparatus detects the synchronization code.

It is preferred that the sub information is superposed on two or more ECC blocks, rather than on only one ECC block. When the sub information is superposed on only one ECC block, there is a possibility that a disc having the same value as an original optical disc is produced by an imitation of the procedure described in the first embodiment. On the contrary, as the number of ECC blocks on which the sub information is superposed increases, the trouble and effort for the superposition increase. This makes it more difficult to produce a disc having the same value as an original optical disc. Furthermore, when the sub information is superposed on two or more ECC blocks, if the reproduction apparatus fails to read the sub information from one ECC block due to a flaw or dust on the disc surface, the reproduction apparatus can read the sub information from other ECC blocks. This increases the reliability of reading the sub information.

In the first embodiment, edges of recording marks corresponding to the synchronization code areas are not displaced. However, edges of recording marks corresponding to the synchronization code areas may be displaced.

SECOND EMBODIMENT

In the second embodiment of the present invention, a displacement amount $\Delta t$ for the leading/lagging edges described in the first embodiment will be described. In optical discs, natural jitters occur even if the leading/lagging edges are not formed. As a result, the natural jitters should be taken into account when the displacement amount $\Delta t$ is determined.

Distribution Curves

The distribution curve shown in FIG. 14A represents a probability P(t) of the position of an edge in a read signal, where "t" denotes a distance from the phase 0. A study of the distribution curve P(t) shown in FIG. 14A indicates that a probability that an edge of a read signal appears at the phase 0 is the highest, and that a probability that an edge of a read signal appears at a position further away from the phase 0 is lower. A probability of t>T/2 or t<−T/2, namely a probability that an edge of a read signal appears in the next clock pulse cycle is very low, that is below "rd1". The distribution curve P (t) is represented by Formula 1 shown in FIG. 14A, and is close to a Gaussian distribution curve. The expectation E in the distribution curve P(t) is 0, and the standard deviation is σ. In the DVD-ROM standard, it is required that the deviation is 8.5% or lower. Shipment of any optical discs with a standard deviation of higher than 8.5% is banned. For this reason, the standard deviation of the leading/lagging edges should be set to 8.5% or lower.

Now, distribution curves for the cases where the leading/lagging edges described in the first embodiment are formed will be described. FIG. 14B shows a distribution curve P1(t) for a case where half the total number of edges are leading edges. FIG. 14C shows a distribution curve P2(t) for a case where half the total number of edges are lagging edges. A probability that an edge appears at the phase 0 in the distribution curve P(t) shown in FIG. 14A is ck0. The probability is ck1 and ck2 in the distribution curves shown in FIGS. 14B and 14C, respectively, which are substantially lower than ck0. These distribution curves are represented by Formulas 2 and 3 that are shown in FIGS. 14B and 14C. Since both leading and lagging edges are used to assign sub information bits in the first embodiment, the case of the first embodiment is shown by the distribution curve Pm(t) shown in FIG. 14D that is a result of combining the distribution curves shown in FIGS. 14B and 14C. Compared with the distribution curve P(t), a probability that an edge of a read signal appears at the phase 0 is lower, but a probability that an edge of a read signal appears at a position +pp1 or further away or −pp2 or further away from the phase 0 is higher. These are effects of forming the leading/lagging edges. The distribution curve Pm(t) spreads wider horizontally than the distribution curve P(t) This indicates that the variations of jitters increase as the number of leading/lagging edges increase. The variations are represented by the standard deviation.

Standard Deviation

How the standard deviation for the distribution curve Pm(t) is obtained will now be described.

The distribution curve Pm(t) is represented by Formula 4 shown in FIG. 14D. FIG. 15A shows how the expectation E is obtained from the distribution curve Pm(t). FIG. 15B shows how the standard deviation σ' is obtained from the distribution curve Pm(t). As indicated by Formula 5 shown in FIG. 15B, the standard deviation σ' for the distribution curve Pm(t) is equal to a mean square of the standard deviation σ for the distribution curve P(t) (hereinafter referred to as a base jitter) and the displacement amount Δt.

As understood from Formula 5, the displacement amount Δt has a great effect on the standard deviation σ' for the distribution curve Pm(t). As described earlier, the DVD-ROM standard defines that the standard deviation of the leading/lagging edges should be set to 8.5% or lower at the time of shipment. Accordingly, when forming the leading/lagging edges, it is necessary to set the displacement amount Δt with great care so that the standard deviation σ' for the distribution curve Pm(t) does not exceed the above value defined in the DVD-ROM standard.

Displacement Amount Δt

How to set the displacement amount Δt will be now described by using specific values. FIG. 16 is a table showing a correspondence between (a) a plurality of values the base jitter may have, (b) a plurality of values the displacement amount Δt may have, and (c) a plurality of values the standard deviation σ' for the distribution curve Pm(t) may have. It is supposed that the displacement amount Δt may have values 0, 1, 2, 3, 4, and 5 (%), as shown in the column md1. These values are obtained by dividing the values on the right-hand side: "0", "0.382263", "0.76452599", . . . (ns) by the clock pulse cycle 38.23 ns.

The values the base jitter may have are provided in the row md2 as 7, 8, 9, . . . 15, 16(%). The values are obtained by dividing the values shown under these values: "2.675841", "3.058104", "3.440367", . . . (ns) by the clock pulse cycle 38.23 ns. The table of FIG. 16 provides a matrix of values for the standard deviation σ', so that a value for the standard deviation σ' is uniquely identified by a combination of a base jitter value and a displacement amount Δt value. For example, standard deviation a "8.5440%" corresponds to the combination of base jitter "8%" and displacement amount Δt "3%", and standard deviation σ' "8.9443%" corresponds to the combination of base jitter "8%" and displacement amount Δt "4%". In the table, an area encircled by the thick line wk1 contains the values for the standard deviation σ' that are lower than 8.5%.

It is understood from this area that for base jitter 7%, the displacement amount Δt may be set to up to 4%, and that for base jitter 8%, the displacement amount Δt may be set to up to 3%.

Probability of Detection Error Occurrence for Main Information

In determining the displacement amount Δt, the probability of detection error occurrence for the data field and the probability of correct detection performance for the sub information should be taken into consideration, as well as the determination of the standard deviation σ'.

It should be noted here that the probability of detection error occurrence is equal to a probability that an edge of a read signal appears at a position ±T/2 or further away from the phase 0 in the distribution curve Pm(t). Such a detection error may cause a bit reading error or the like. The probability of detection error occurrence is indicated by rd1 in the distribution curve P(t) shown in FIG. 14A. FIG. 17 shows specific values for rd1. As is the case with FIG. 16, the values the displacement amount Δt may have are provided in the column md1, and the values the base jitter may have are provided in the row md2. A difference is that a value for the probability of detection error occurrence is identified by a combination of a base jitter value and a displacement amount Δt value, where "E" in FIG. 17 denotes an exponentiation of 10 (e.g. 9.21E−13=9.21×10$^{-13}$). As FIG. 17 indicates, as the displacement amount Δt value increases, the probability of detection error occurrence increases. As a guide, the probability of detection error occurrence for the data field is 2.14×10$^{-9}$ or lower. In FIG. 17, an area encircled by the thick line wk2 contains the values for the probability of detection error occurrence for the data field that are 2.14×10$^{-9}$ or lower. That means that combinations of a base jitter value and a displacement amount Δt value corresponding to the values included in this range secure a stable detection of the data field. This indicates that the larger the displacement amount Δt value is, the higher the probability of detection error occurrence is, increasing the risk of having an error. On the contrary, when the displacement amount Δt value is small, it may have an ill effect on reading the sub information.

As understood from the above description, for the sub information superposed on the main information, the phase displacement amount of the leading/lagging edges is critical. With a very small value for the displacement amount Δt, even the probability that a phase variation of the leading or lagging edge is correctly detected (hereinafter referred to as "edge phase detection probability") becomes low.

Leading/Lagging Edge Phase Detection Probability

FIG. 18 is a table showing a correspondence between (a) a plurality of values the base jitter may have, (b) a plurality of values the displacement amount Δt may have, and (c) a plurality of values the edge phase detection probability may have. As is the case with FIG. 16, the values the displacement amount Δt may have are provided in the column md1, and the values the base jitter may have are provided in the row md2. A difference is that a value for the edge phase detection probability is identified by a combination of a base jitter value and a displacement amount Δt value, where "E" in FIG. 18 denotes an exponentiation of 10 (e.g. 9.21E−13=9.21×10$^{-13}$). As FIG. 18 indicates, as the displacement amount Δt value increases, the edge phase detection probability increases.

As described in the first embodiment, each bit of the sub information is assigned to a set of three frames in the data field, and the sub information is detected through the statistics process, which provides a high probability of detecting the sub information. Since the sub information itself contains an ECC, decoding with error correction is also possible. Taking these into consideration, it is expected that the sub information is correctly detected when the phase detection probability is in a range from 0.525 to 0.55.

In FIG. 18, an area encircled by the thick line wk3 contains the values for the edge phase detection probability that are 0.525 or higher. This means that combinations of a base jitter value and a displacement amount Δt value corresponding to the values included in this range secure a correct detection of the sub information.

As described above, the second embodiment provides an optical disc which enables both the data field and the sub information to be detected stably since the optical disc uses such a combination of a base jitter value and a displacement amount Δt value which satisfies that (i) the edge detection probability is 0.525 or higher, (ii) the standard deviation for the data field is 8.5% or higher, and (iii) the probability of detection error occurrence for the data field is $2.14 \times 10^{-9}$ or lower, as can be confirmed from FIGS. 16 to 18. Further, even when the edge detection probability is in a range of 0.5 to below 0.525, it is possible to secure a correct detection of the sub information by enlarging the data field that is subjected to the statistics process.

THIRD EMBODIMENT

Figure 19:
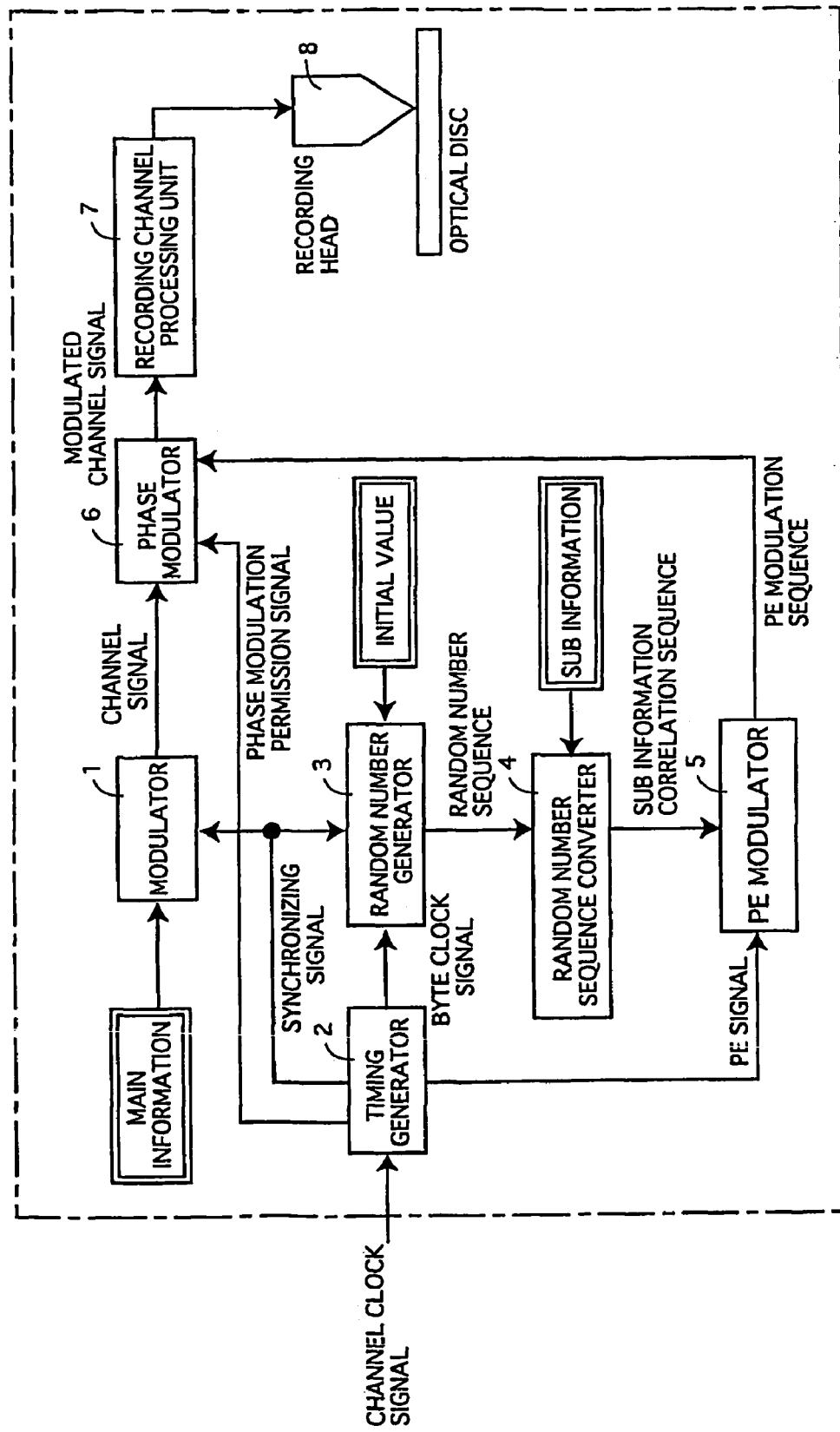
FIG. 19 shows the internal structure of the recording apparatus according to the third embodiment of the present invention.
Figure 20:
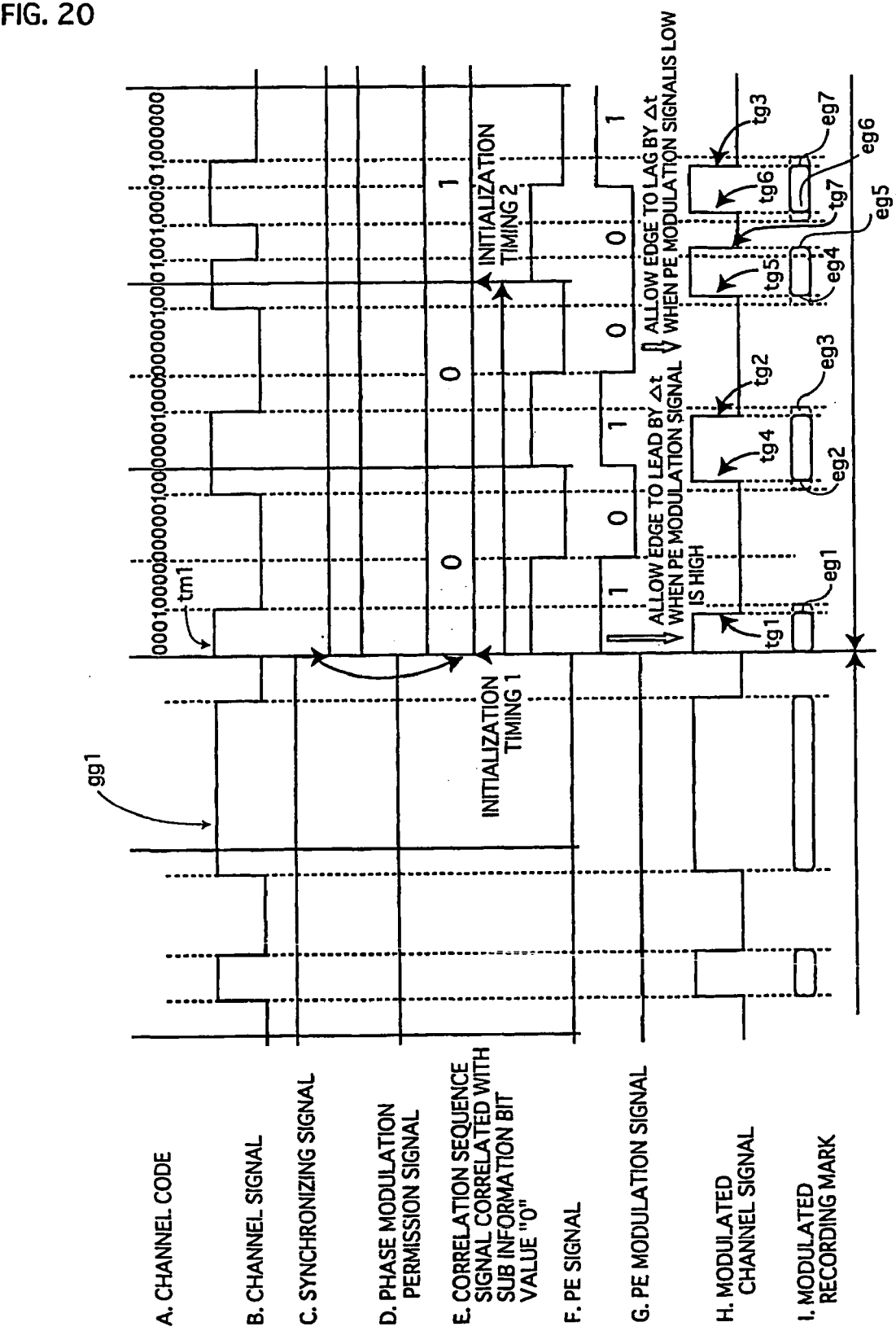
FIG. 20 is a timing chart for the recording apparatus.

In the third embodiment of the present invention, a recording apparatus for the optical disc explained in the first and second embodiments will be described. FIG. 19 shows the internal structure of the recording apparatus of the third embodiment. FIG. 20 is a timing chart for the recording apparatus. As shown in FIG. 19, the recording apparatus includes a modulator 1, a timing generator 2, a random number generator 3, a random number sequence converter 4, a PE modulator 5, a phase modulator 6, a recording channel processing unit 7, and a recording head 8.

Internal Structure of the Recording Apparatus

The modulator 1 receives the data field data in units of 8 bits, performs the 8/16 modulation onto the received data to obtain 16-bit code words, and performs the NRZI conversion to the 16-bit code words to generate channel codes. The modulator 1 generates a channel signal by corresponding each of the generated channel codes to the clock pulse, and then outputs the generated channel signal to the phase modulator. When generating the channel signal, the modulator 1 monitors a synchronizing signal output from the timing generator 2. For each Low section in the synchronizing signal, the modulator 1 continues the generation of the channel signal; for each High section in the synchronizing signal, the modulator 1 stops the generation of the channel signal and inserts a synchronization code into the channel signal. The rows A, B, and C in FIG. 20 indicate the channel code, channel signal, and synchronizing signal, respectively. As shown in FIG. 20, during the High section in the synchronizing signal, the generation of the channel code is stopped, and a signal portion gg1 being the synchronization code is inserted into the channel signal.

Figure 21:
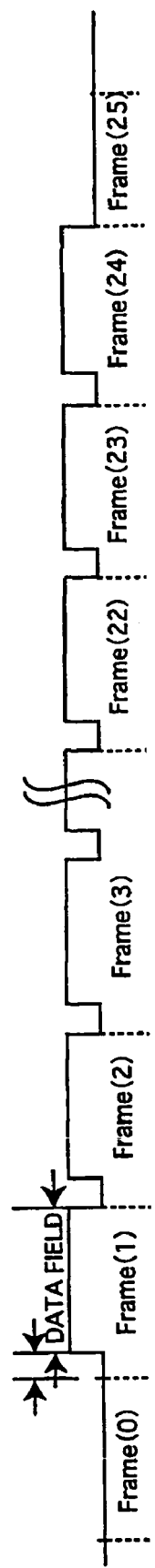
FIG. 21 shows an example of the phase modulation permission signal for one sector.

The timing generator 2 contains a frequency divider that generates a byte clock signal by performing a 16-frequency-division onto a clock pulse sequence, and generates a PE signal by performing an 8-frequency-division onto a clock pulse sequence. The timing generator 2 outputs the synchronizing signal and a phase modulation permission signal to the modulator 1 and the phase modulator 6. As described in the first embodiment, the synchronization code is 2×16 channel bits in size, and the data field is 91×16 channel bits, for each frame. Accordingly, a ratio of the High section to the Low section in the synchronizing signal is 2×16:91×16 (clocks). The phase modulation permission signal is low (in the Low section) during periods that correspond to the first and the last frames in a sector and to the synchronization code areas in the other frames in the sector, and otherwise the phase modulation permission signal is high (in the High section). FIG. 21 shows an example of the phase modulation permission signal for one sector. The phase modulation permission signal shown in FIG. 21 is composed of sections corresponding to the frames [0] to [25]. Of these, the sections corresponding to the frames [1] to [24] are the same as those shown in the row D in FIG. 20, and the sections corresponding to the frames [0] and [25] are in the Low section, which indicates that the phase modulation is set to "not permitted".

The random number generator 3 generates a random number sequence signal and outputs the generated random number sequence signal to the random number sequence converter 4, where in the random number sequence signal, a bit constituting an M random number sequence appears once every 16 clocks, and the random number sequence signal is reset to the initial value when the synchronizing signal from the timing generator 2 changes from the High section to the Low section. The rows C and E in FIG. 20 specifically show the timing when the random number generator 3 generates the random number sequence signal. The generation of the random number sequence signal starts at the time tm1 when the synchronizing signal in the row C changes from the High section to the Low section, and, as shown in FIG. 20, one bit (in FIG. 20, shown as "0", "0", "1") constituting an M random number sequence appears once every 16 clocks.

The random number sequence converter 4 generates a correlation sequence signal by allowing the random number sequence signal output from the random number generator 3 to correlate with each bit of the sub information, and outputs the generated correlation sequence signal to the PE modulator 5. In the third embodiment, the random number sequence converter 4 is achieved by an exclusive OR circuit, and reverses the random number sequences constituting the random number sequence signal, based on each bit of the sub information. More specifically, when a sub information bit is "0", the random number sequence converter 4 does not reverse the random number sequences and outputs the random number sequence signal as the correlation sequence signal; and when a sub information bit is "1", the random number sequence converter 4 reverses the random number sequences and outputs a reversed random number sequence signal as the correlation sequence signal. That is to say, the correlation sequence signal is either a random number sequence signal or a reversed random number sequence signal.

The PE modulator 5 performs an exclusive OR operation between the PE signal from the timing generator 2 and the correlation sequence signal from the random number sequence converter 4, and reverses the result of the exclusive OR operation. In this way, a phase modulation is performed and a PE modulation signal is generated. The PE modulator 5 then outputs the PE modulation signal to the phase modulator 6. During the phase modulation, each "0" section in the correlation sequence signal is replaced with a "10" section, and each "1" section is replaced with a "01" section. As a result, the PE modulation signal contains approximately equal numbers of "0"s and "1"s. Here, the phase modulation by the PE modulator will be described in detail with reference to the rows E, F, and G in FIG. 20. As indicated by the row E, the correlation sequence signal starts to be output with the timing of a falling edge tm1 in the synchronizing signal, and each bit of the signal appears once every 16 clocks (in FIG. 20, shown as "0", "0", "1"). On the other hand, as indicated by the row F, each bit of the PE signal appears once every 8 clocks (in FIG. 20, shown as "1", "0", "1", "0", "1", "0", ...), namely with a cycle being half the cycle of the correlation sequence signal. Here, a phase modulation is performed on the correlation sequence signal based on the PE signal. The PE modulation signal shown in the row G (in FIG. 20, appearing as "1", "0", "1", "0", "0", "1") is obtained with this phase modulation.

The phase modulator 6 performs a phase modulation on the channel signal output from the modulator 1. More specifically, when the phase modulation permission signal is in the High section, the phase modulator 6 performs the phase modulation on rising/falling edges in the channel signal so that the rising/falling edges lead or lag by a very short time Δt. As explained in the first embodiment, the very short time Δt should be set to 1–4% of the signal cycle. The phase modulator 6 performs the phase modulation based on the row G in FIG. 20. This phase modulation allows the falling edges tg1, tg2, and tg3 in the channel signal to lead the dotted line by Δt since these edges correspond to "1" in the PE modulation signal. Also, the phase modulation allows the rising edges tg4, tg5, and tg6 and the falling edge tg7 in the channel signal to lag behind the dotted line by Δt since these edges correspond to "0" in the PE modulation signal. The result of the phase modulation is shown in the row H.

The recording channel processing unit 7 controls the recording head 8 so that it changes the recording power of a laser beam being output onto an optical disc in synchronization with the values "1" and "0" in a modulated channel signal output from the phase modulator 6.

The recording head 8 forms optically readable modulated recording marks on the optical disc, changing the power of the laser beam under control of the recording channel processing unit 7. The recording channel processing unit 7 forms the recording marks based on the modulated channel signal shown in the row H in FIG. 20. As shown in the row I in FIG. 20, leading edges eg1, eg3, and eg7 are formed in correspondence with the leading, falling edges tg1, tg2, and tg3, and lagging edges eg2, eg4, eg5, and eg6 are formed in correspondence with the lagging, rising edges tg4, tg5, and tg6 and the lagging, falling edge tg7.

Figure 22:
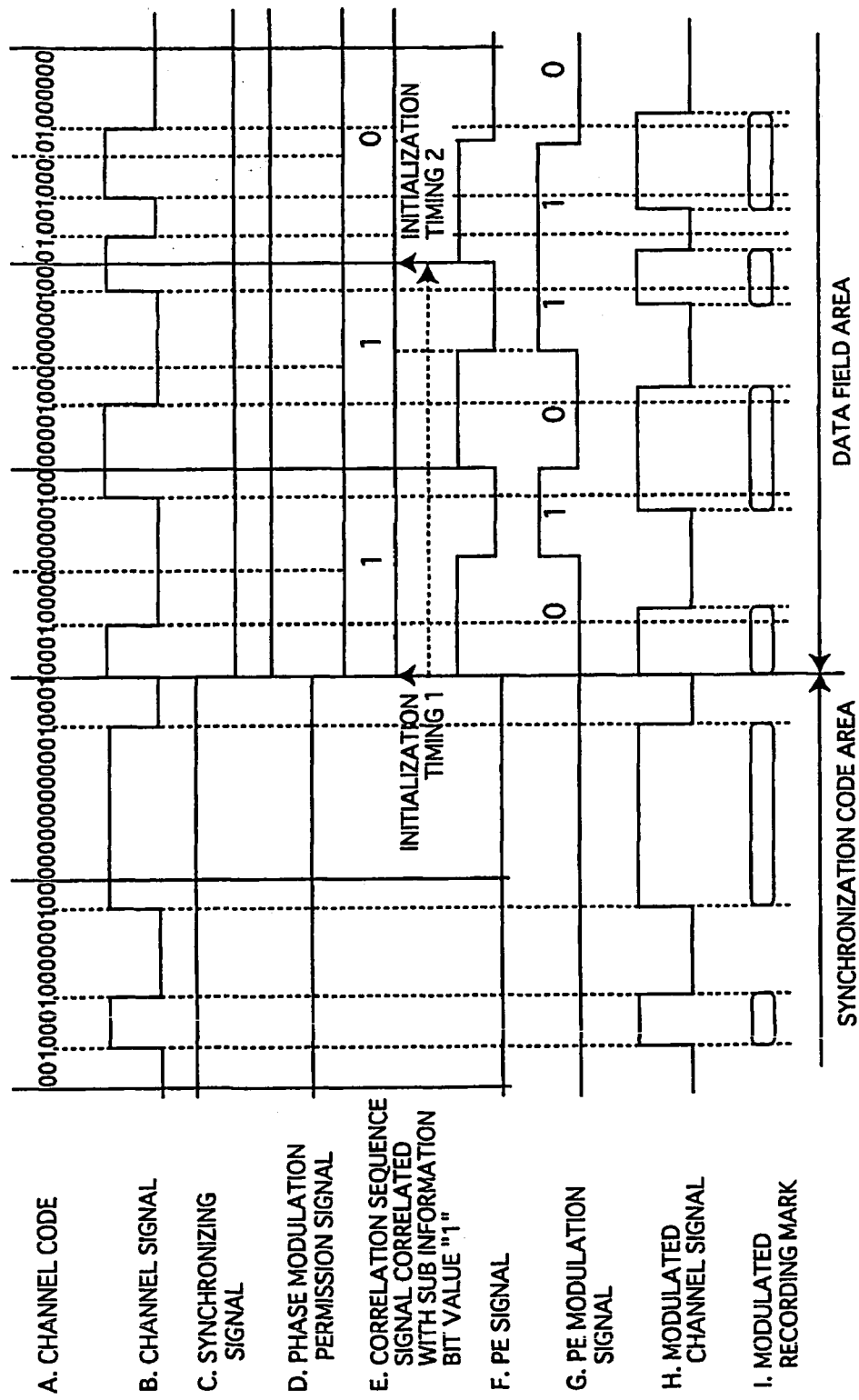
FIG. 22 is a timing chart for the case where a sub information bit value "1" is assigned to the main information in the frames.

FIG. 20 shows an example for the case where a sub information bit value "0" is assigned to the data fields in the frames. FIG. 22 shows an example for the case where a sub information bit value "1" is assigned to the data fields in the frames. In this case, the random number sequence converter 4 performs an exclusive OR operation on each bit of the random number sequence signal and the sub information bit value "1". The result of this calculation is the correlation sequence signal that has bits "1", "1", "0" as shown in the row E in FIG. 22. This is a reversed signal of the correlation sequence signal shown in FIG. 20. Accordingly, the PE modulation signal generated by performing a phase modulation on the reversed correlation sequence signal has a reversed bit sequence: "0", "1", "0", "1", "1", "0". A phase modulation is performed on the channel signal based on the above bit sequence to generate a modulated channel signal with reversed leading/lagging phases. The leading/lagging edges of the recording marks are formed based on the reversed leading/lagging phases.

Internal Structure of the Components

Figure 23:
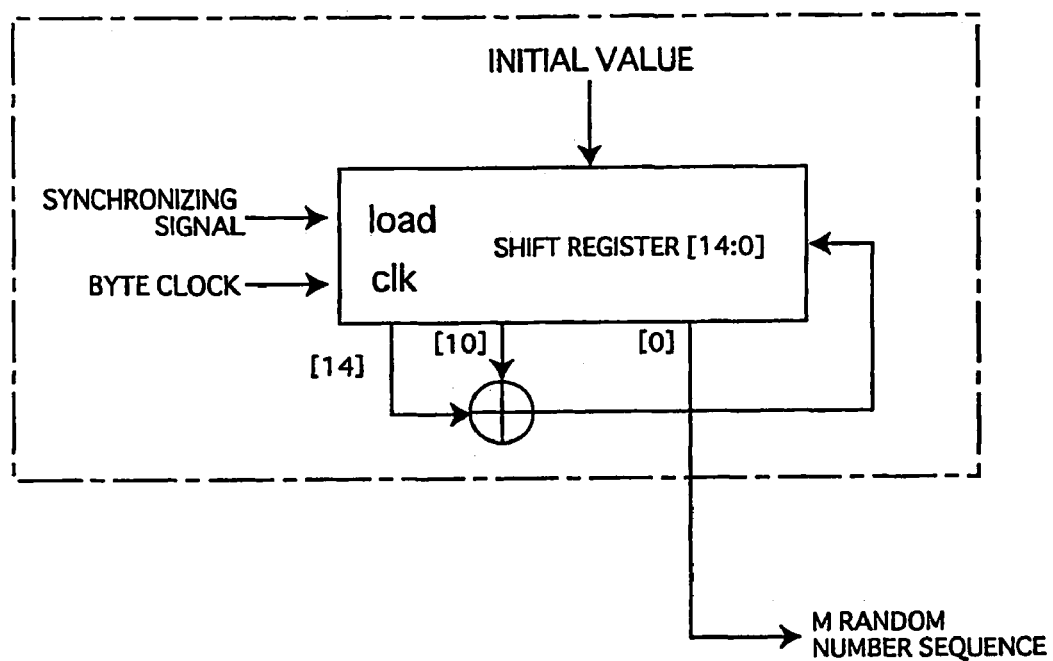
FIG. 23 is a block diagram showing a detailed construction of the random number generator 3.

The internal structure of the random number generator 3 will now be described. FIG. 23 is a block diagram showing a detailed construction of the random number generator 3. As shown in FIG. 23, the random number generator 3 is achieved by a 15-bit shift register. Once every 16 clocks, the shift register (a) shifts a 15-bit value held therein to the left by one bit, (b) performs an exclusive OR operation between the bit [14] (MSB) and the bit [10], (c) insert the result into the position of the bit [0] (LSB), and (d) outputs the bit [0] (LSB) to the random number sequence converter 4.

Figure 24:
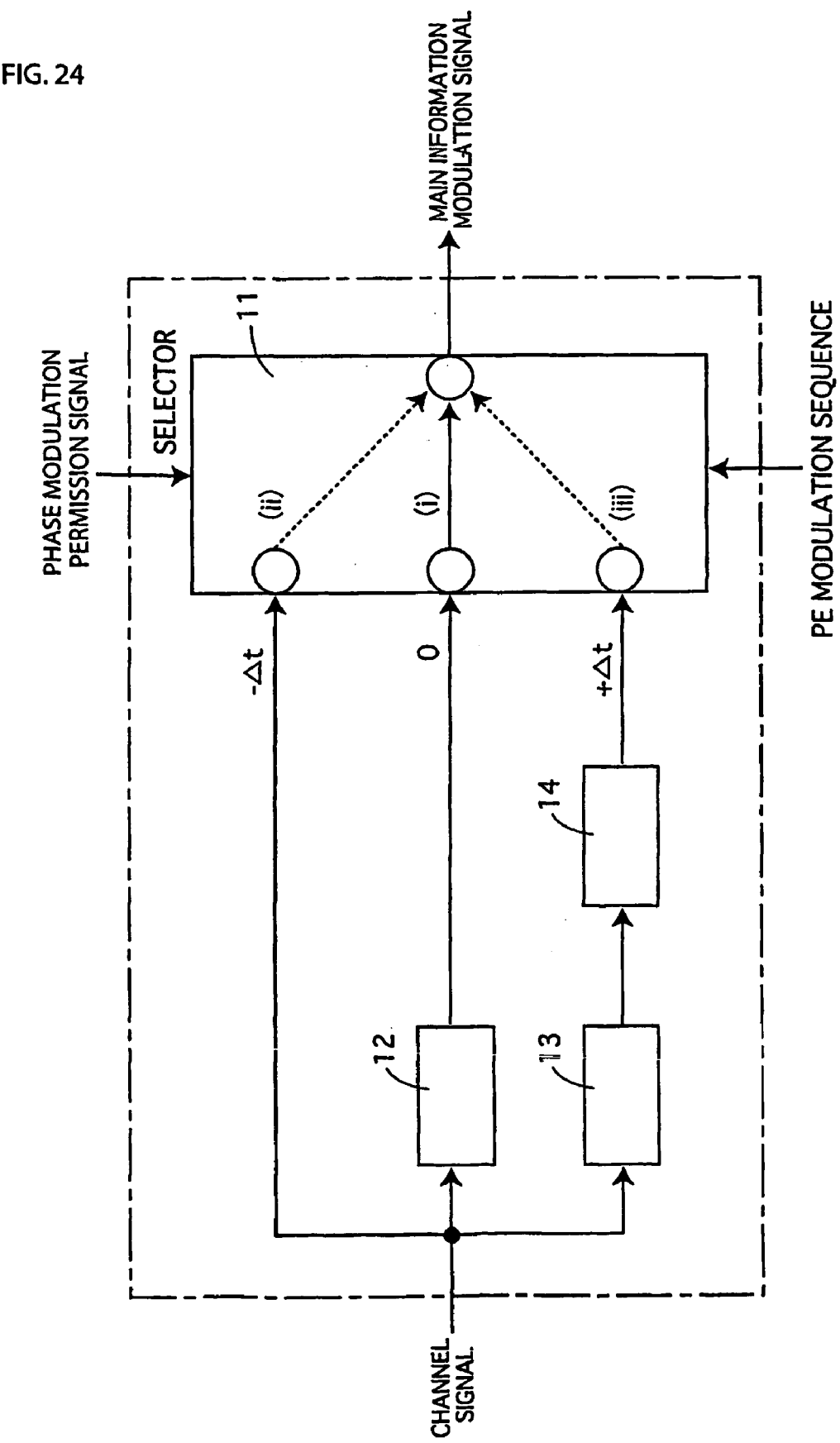
FIG. 24 is a block diagram showing a detailed construction of the phase modulator 6.

The internal structure of the phase modulator 6 will now be described. FIG. 24 is a block diagram showing a detailed construction of the phase modulator 6. The phase modulator 6 is composed of a 3-input 1-output selector 11 and delay units 12, 13, and 14 that delay a channel signal by the very short time Δt. The selector 11 selects a channel signal input from the modulator 1 (i) that is then delayed by the delay unit 12 when the phase modulation permission signal is in the Low section, (ii) that is not delayed when the phase modulation permission signal is in the High section and the PE modulation signal is in the High section, or (iii) that is delayed by the delay units 13 and 14 when the phase modulation permission signal is in the High section and the PE modulation signal is in the Low section. With the above performance of the phase modulator 6, the phase modulation is not performed on the first and the last frames in a sector and on the synchronization code areas in the other frames in the sector, and the phase modulation is performed on the data field areas in the other frames in the sector.

As described above, the third embodiment allows a conventional recording apparatus to produce the optical disc described in the first and second embodiments by allowing the conventional recording apparatus to perform a simple process of making the phase of a channel signal leading/lagging, where the channel signal is used for writing data on an optical disc. This enables the optical disc described in the first and second embodiments to be mass-produced.

FOURTH EMBODIMENT

Figure 25:
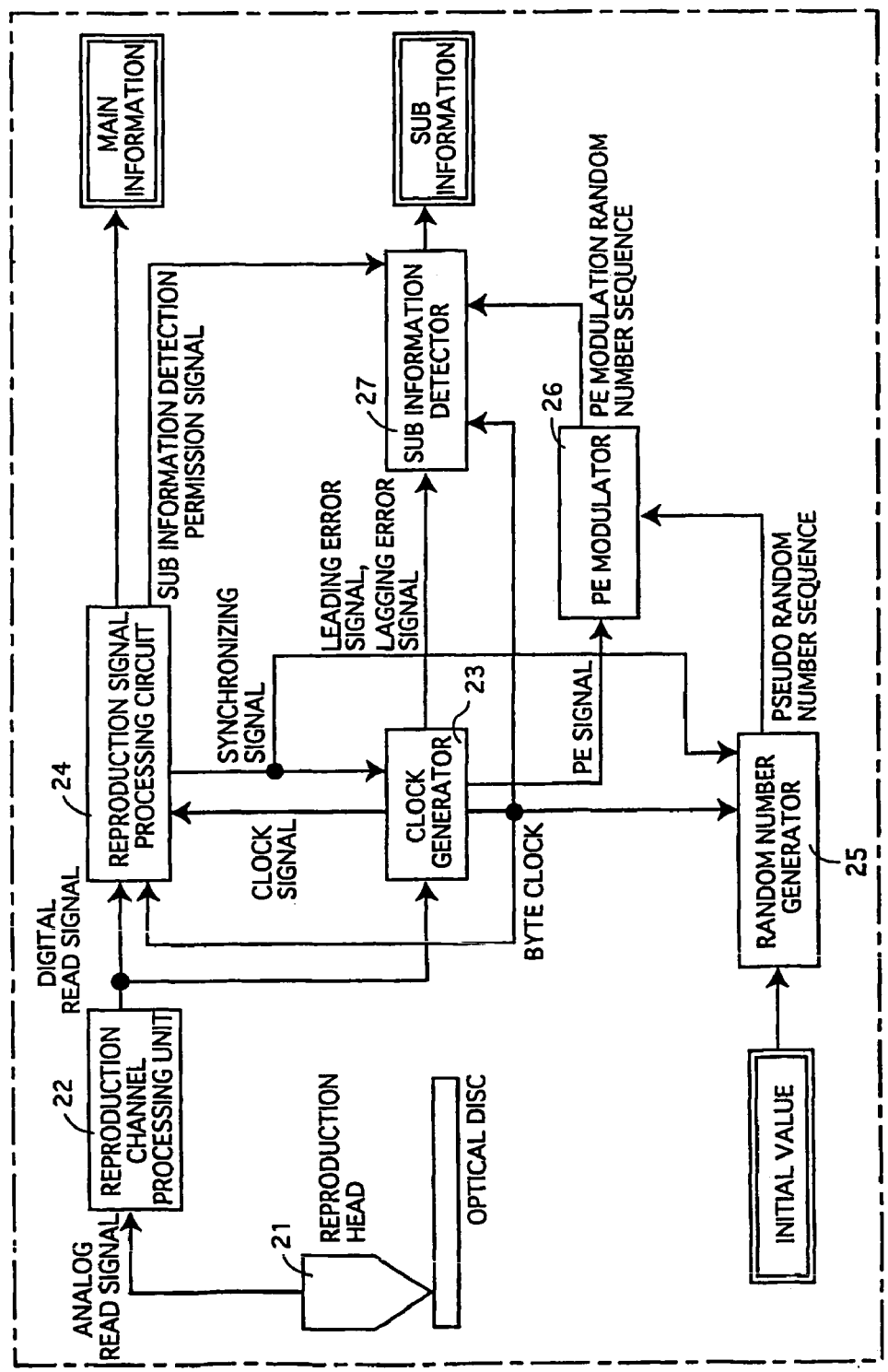
FIG. 25 shows the internal construction of the reproduction apparatus according to the fourth embodiment of the present invention.
Figure 26:
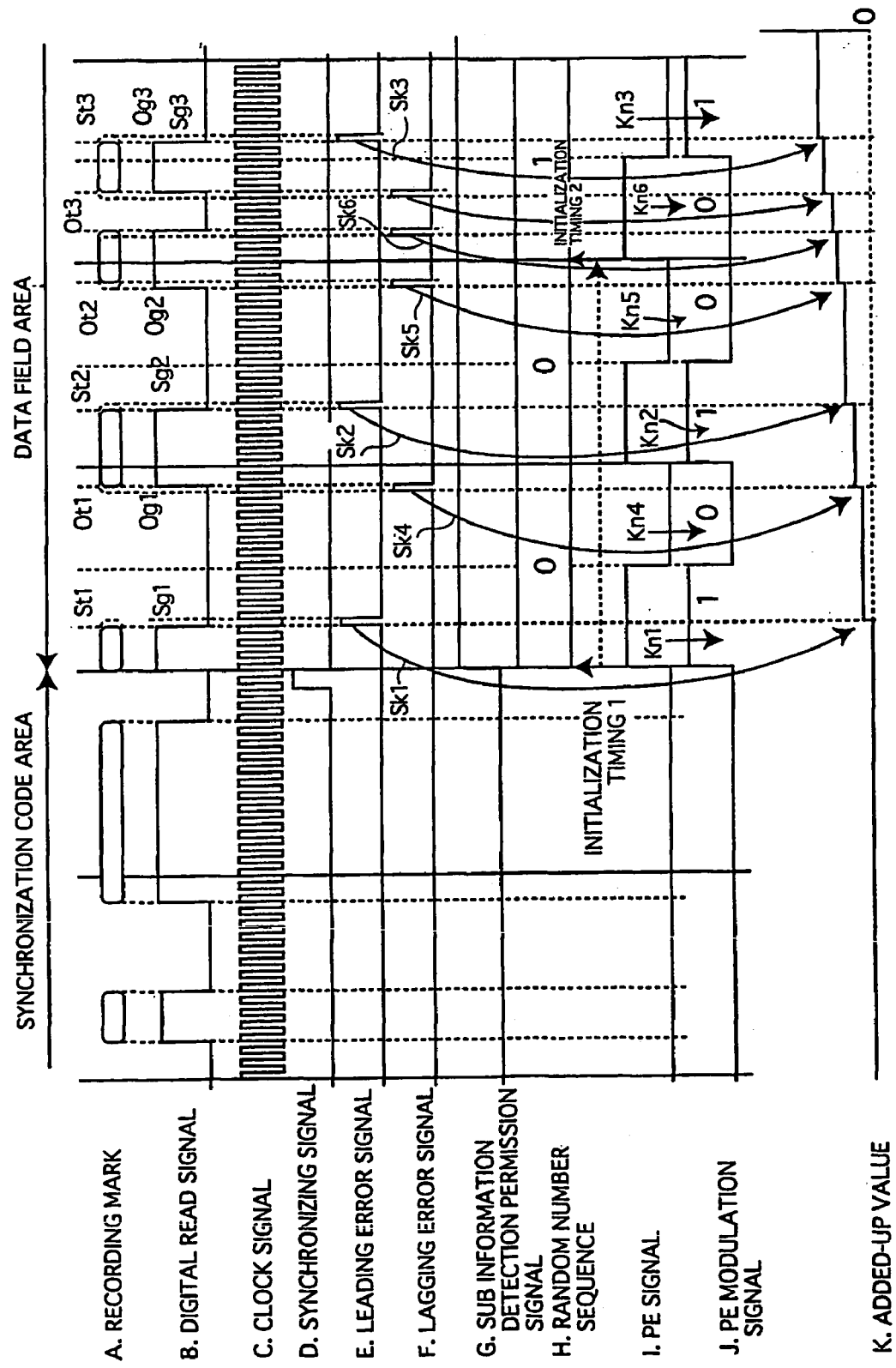
FIG. 26 is a timing chart for the case where a sub information bit value "0" is assigned to the main information in the frames.

In the fourth embodiment of the present invention, a reproduction apparatus for reproducing data on the optical disc described in the first and second embodiments will be described. FIG. 25 shows the internal construction of the reproduction apparatus. FIG. 26 is a timing chart for the reproduction apparatus. As shown in FIG. 25, the reproduction apparatus includes a reproduction head 21, a reproduction channel processing unit 22, a clock generator 23, a reproduction signal processing circuit 24, a random number generator 25, a PE modulator 26, and a sub information detector 27.

Internal Structure of the Reproduction Apparatus

The reproduction head 21 concentrates a light beam on a recording mark on a rotating optical disc, receives the reflected light with a photo diode, amplifies the reflected light to generate an analog read signal that indicates a position of an edge of a modulated recording mark, and outputs the generated analog read signal to the reproduction channel processing unit 22.

The reproduction channel processing unit 22 converts the analog read signal received from the reproduction head 21 into a digital read signal by equalizing and shaping the waveform, and outputs the digital read signal to the clock generator 23 and the reproduction signal processing circuit 24.

The clock generator 23 generates a clock signal, a byte clock signal and a PE signal based on the read signal received from the reproduction channel processing unit 22, and outputs the generated signals to the reproduction signal processing circuit 24, the random number generator 25, and the sub information detector 27. The clock signal is composed of clock pulses, each of which synchronizes with a different bit constituting the channel codes, and the byte clock signal synchronizes with a different byte constituting the channel codes. The clock generator 23 also detects a phase error in the read signal with reference to the clock signal. After detecting a leading phase, the clock generator 23 outputs a leading error signal to the sub information detector 27, and after detecting a lagging phase, outputs a lagging error signal. The rows E and F in FIG. 26 show the leading and lagging error signals, respectively. The leading error signal has (a) pulses that correspond to the leading edges st1, st2, and st3 shown in the row A and (b) pulses that correspond to the leading errors sg1, sg2, and sg3 shown in the row B. The size of the pulse in the leading error signal is equal to the size of the corresponding leading error. The lagging error signal has (a) pulses that correspond to the lagging edges ot1, ot2, and ot3 shown in the row A and (b) pulses that correspond to the lagging errors og1, og2, and og3 shown in the row B. The size of the pulse in the leading error signal is equal to the size of the corresponding lagging error.

Figure 27:
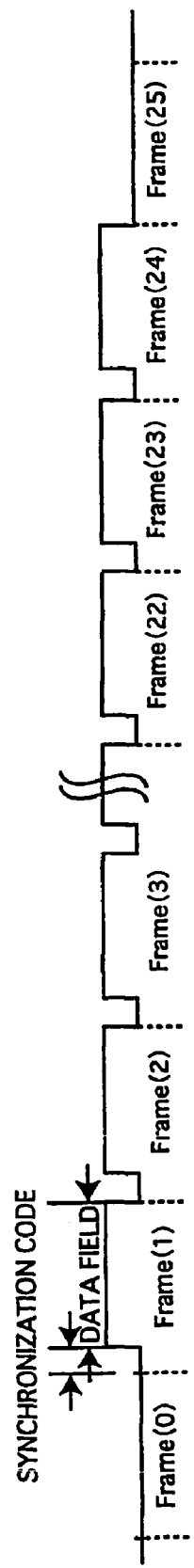
FIG. 27 shows an example of the sub information detection permission signal for one sector.

The reproduction signal processing circuit 24 detects a synchronization field from the read signal received from the reproduction channel processing unit 22, and decodes the read signal with reference to the detected synchronization field to obtain main data. The reproduction signal processing circuit 24 also generates a synchronizing signal, and outputs the generated synchronizing signal to the clock generator 23 and random number generator 25. The reproduction signal processing circuit 24 further generates a sub information detection permission signal, and outputs the generated signal to the sub information detector 27. The row D in FIG. 26 shows the synchronizing signal. Each pulse in the synchronizing signal corresponds to the last clock pulse in a period during which a synchronization code appears in the read signal. That is to say, each pulse in the synchronizing signal indicates the timing with which a reading of a synchronization code ends. The sub information detection permission signal is in the Low section during such periods that correspond to the first and last frames in a sector and synchronization fields in the other frames in the sector, and otherwise is in the High section. FIG. 27 shows an example of the sub information detection permission signal for one sector. The sub information detection permission signal is composed of sections that correspond to frames [0] to [25]. Of these, sections corresponding to frames [1] to [24] are the same as those shown in the row G in FIG. 26. The sections corresponding to frames [0] and [25] are always Low, which means that detection of the sub information is not permitted.

The random number generator 25 has the same construction as the random number generator 3 of the above-described optical disc recording apparatus, and generates a random number sequence signal. The row H in FIG. 26 shows a random number sequence signal generated by the random number generator 25. As is the case with FIG. 20, the random number sequence signal is reset immediately after a synchronization code, and a bit constituting the M random number sequence appears once every 16 clocks, as "0", "0", "1".

The PE modulator 26 has the same construction as the PE modulator 5 of the above-described optical disc recording apparatus, and performs, based on the PE signal output from the clock generator 23, a PE modulation on the random number sequence signal output from the random number generator 25 and generates a PE modulation signal. The PE modulator 26 outputs the PE modulation signal to the sub information detector 27. The row J in FIG. 26 shows a PE modulation signal generated by the PE modulator 26. As is the case with FIG. 20, the PE modulation signal is reset immediately after a synchronization code, and a bit appears once every 8 clocks, as "1", "0", "1".

Figure 28:
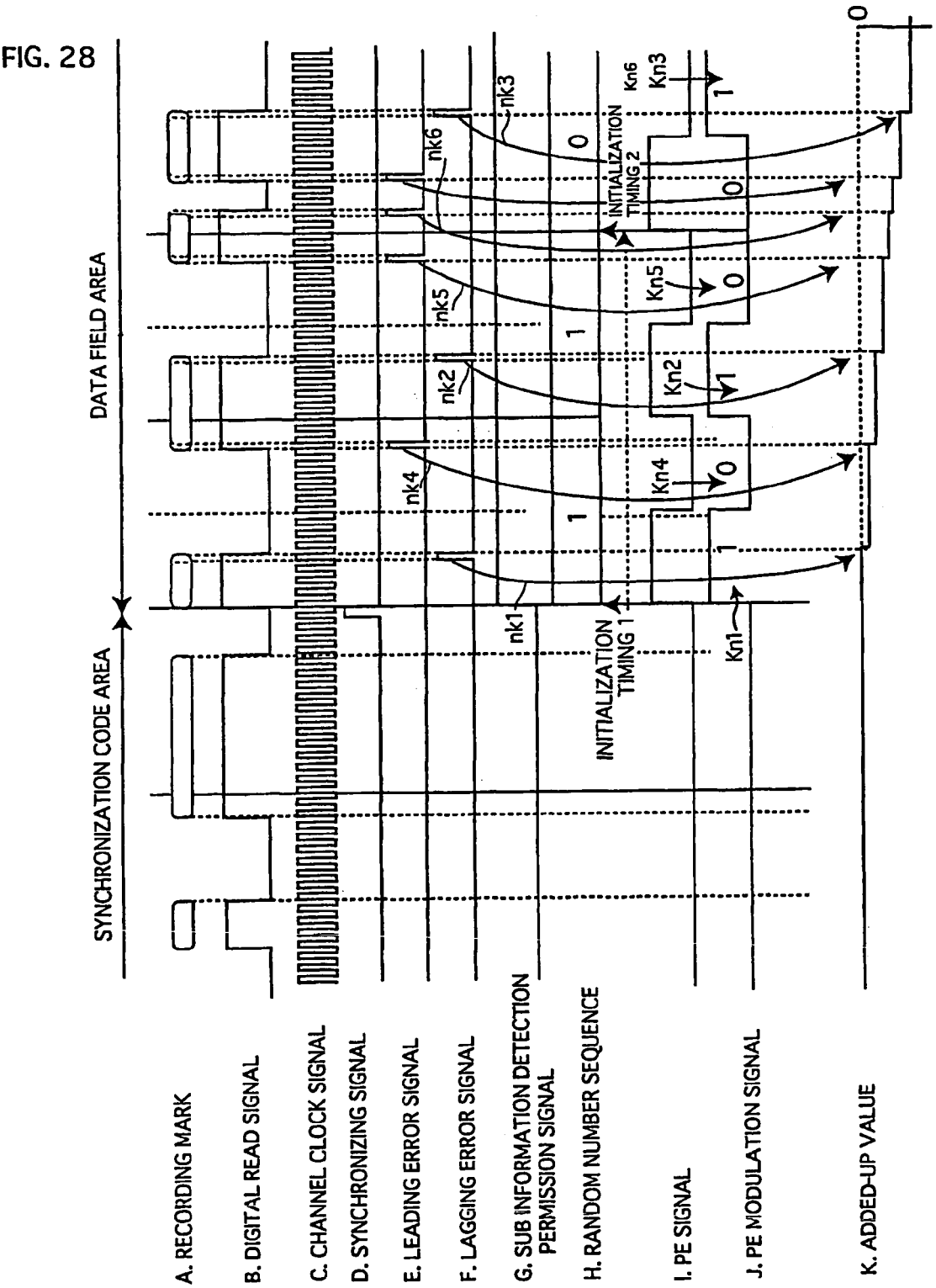
FIG. 28 is a timing chart for the case where a sub information bit value "1" is assigned to the main information in the frames.

The sub information detector 27 is a circuit that adds up the size of each pulse existing in the leading and lagging error signals while checking a "positive correlation" and a "negative correlation" between (a) the leading/lagging error signals output from the clock generator 23 and (b) the PE modulation signal output from the PE modulator 26, and sets each bit in the sub information in accordance with the added-up value. It should be noted here that the "positive correlation" indicates that a pulse appears only in the leading error signal when the PE modulation signal is "1" (in the High section), and a pulse appears only in the lagging error signal when the PE modulation signal is "0" (in the Low section); and the "negative correlation" indicates that a pulse appears only in the lagging error signal when the PE modulation signal is "1" (in the High section), and a pulse appears only in the leading error signal when the PE modulation signal is "0" (in the Low section). The row K in FIG. 26 shows how the pulse sizes are added up. As shown in the row K, the sizes of the pulses appearing in the leading error signal are added up as indicated by the arrows sk1, sk2, and sk3 when the PE modulation signal is "1" (in the High sections kn1, kn2, and kn3). Also, the sizes of the pulses appearing in the lagging error signal are added up as indicated by the arrows sk4, sk5, and sk6 when the PE modulation signal is "0" (in the Low sections kn4, kn5, and kn6). FIG. 26 shows a case where a sub information bit value "0" is assigned to data field areas. In contrast, FIG. 28 shows a case where a sub information bit value "1" is assigned to the data field areas. In this case, the leading and lagging errors and the leading and lagging error signals are a reverse of those shown in FIG. 26. Since the negative correlation is observed between the PE modulation signal and the lagging error signal, the sizes of the pulses appearing in the lagging error signal are added up as negative values as indicated by the arrows nk1, nk2, and nk3 when the PE modulation signal is "1" (in the High sections kn1, kn2, and kn3). Also, the sizes of the pulses appearing in the leading error signal are added up as negative values as indicated by the arrows nk4, nk5, and nk6 when the PE modulation signal is "0" (in the Low sections kn4, kn5, and kn6). A jitter appearing in a read signal corresponding to a frame to which neither a sub information bit value "1" nor "0" is assigned does not have a positive or negative correlation with the PE modulation signal. Therefore, a pulse corresponding to the jitter appears randomly in the leading or lagging error signal, not depending on the PE modulation signal. In this case, the frequency of pulse appearance in the leading error signal is substantially equal to that in the lagging error signal. The added-up value is therefore very close to zero. As described above, each sub information bit value is set in accordance with the added-up value, and as a result, the statistics process described in the first embodiment is achieved.

Details of the Components

Figure 29:
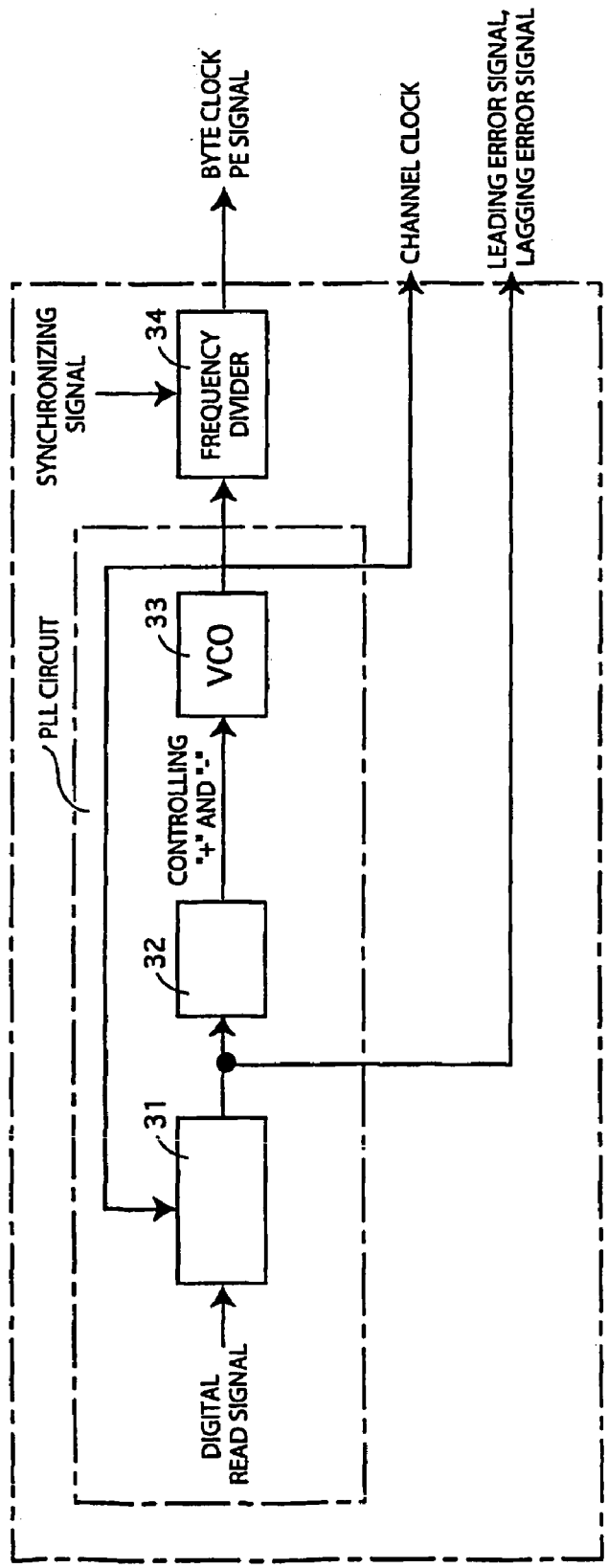
FIG. 29 is a block diagram showing a detailed construction of the clock generator.

The internal construction of the clock generator 23, the reproduction signal processing circuit 24, and the sub information detector 27 will now be described in detail. FIG. 29 is a block diagram showing a detailed construction of the clock generator 23. The clock generator 23 is composed of a PLL circuit and a frequency divider 34. The PLL circuit is composed of a phase comparator 31, a charge pump 32, and a VCO (Voltage Controlled Oscillator) 33.

The phase comparator 31 compares clock pulses input from the VCO 33 with rising and falling edges of a read signal. Here, when finding a phase error, the phase comparator 31 calculates the phase error relative to the closest rising or falling edge of the read signal, and determines whether the phase error is a leading error or a lagging error. When the phase error is a leading error, the phase comparator 31 outputs a leading error signal to the charge pump 32. When the phase error is a lagging error, the phase comparator 31 outputs a lagging error signal to the charge pump 32.

The charge pump 32 controls the output voltage according to the input leading/lagging error signals. When receiving a leading error signal, the charge pump 32 decreases the output voltage to decrease the clock pulse frequency. When receiving a lagging error signal, the charge pump 32 increases the output voltage to increase the clock pulse frequency.

The VCO 33 is a voltage control oscillator that generates a clock pulse so as to have a frequency in accordance with the output voltage from the charge pump 32.

The frequency divider 34 is a counter that divides the frequency of the clock signal generated by the PLL circuit into 16 pieces, and outputs a PE signal and a byte clock signal.

Figure 30:
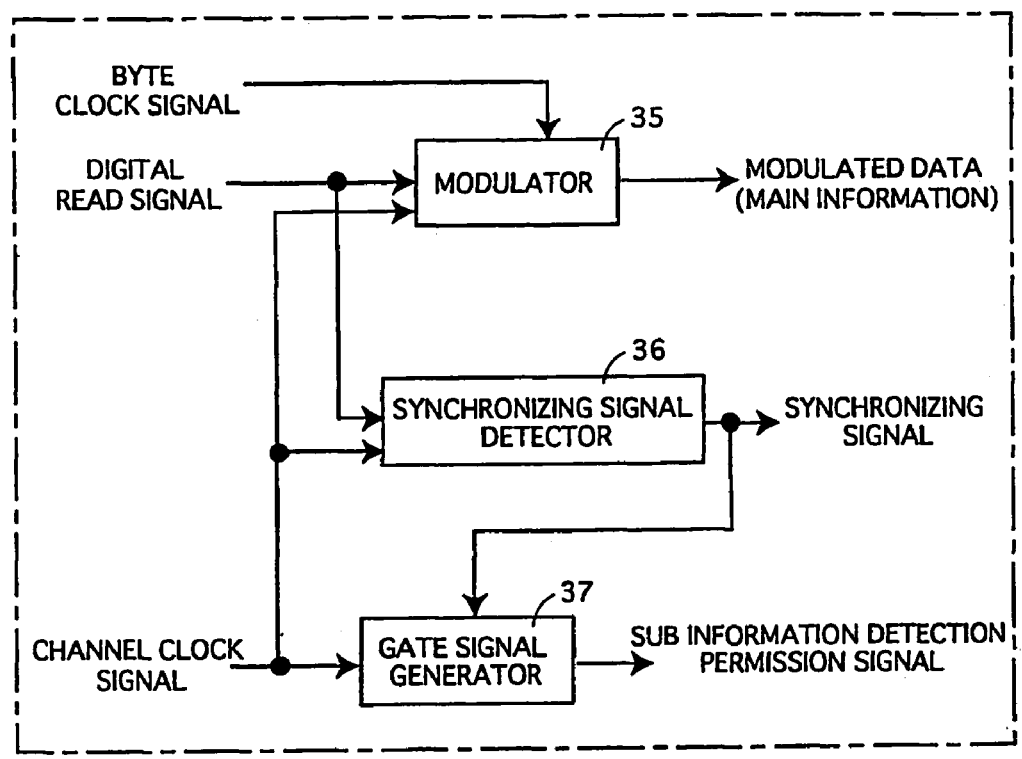
FIG. 30 shows the internal construction of the reproduction signal processing circuit.

The internal construction of the reproduction signal processing circuit 24 will now be described. FIG. 30 shows the internal construction of the reproduction signal processing circuit 24. As shown in FIG. 30, the reproduction signal processing circuit 24 is composed of a modulator 35, a synchronizing signal detector 36, and a gate signal generator 37.

The modulator 35 is a modulation circuit that corresponds to a modulator in the optical disc recording apparatus. The modulator 35 samples the read signal in synchronization with the channel clock signal from the clock generator 23. Also, the modulator 35 converts each set of 16 channel bits into a set of 8 bits as recording data in synchronization with the byte clock signal from the clock generator 23, and outputs the recording data as the data field.

The synchronizing signal detector 36 detects a synchronization field from the read signal, generates a synchronizing signal, and outputs the generated synchronizing signal to the clock generator 23 and random number generator 25.

The gate signal generator 37 outputs a sub information detection permission signal to the sub information detector 27.

Figure 31:
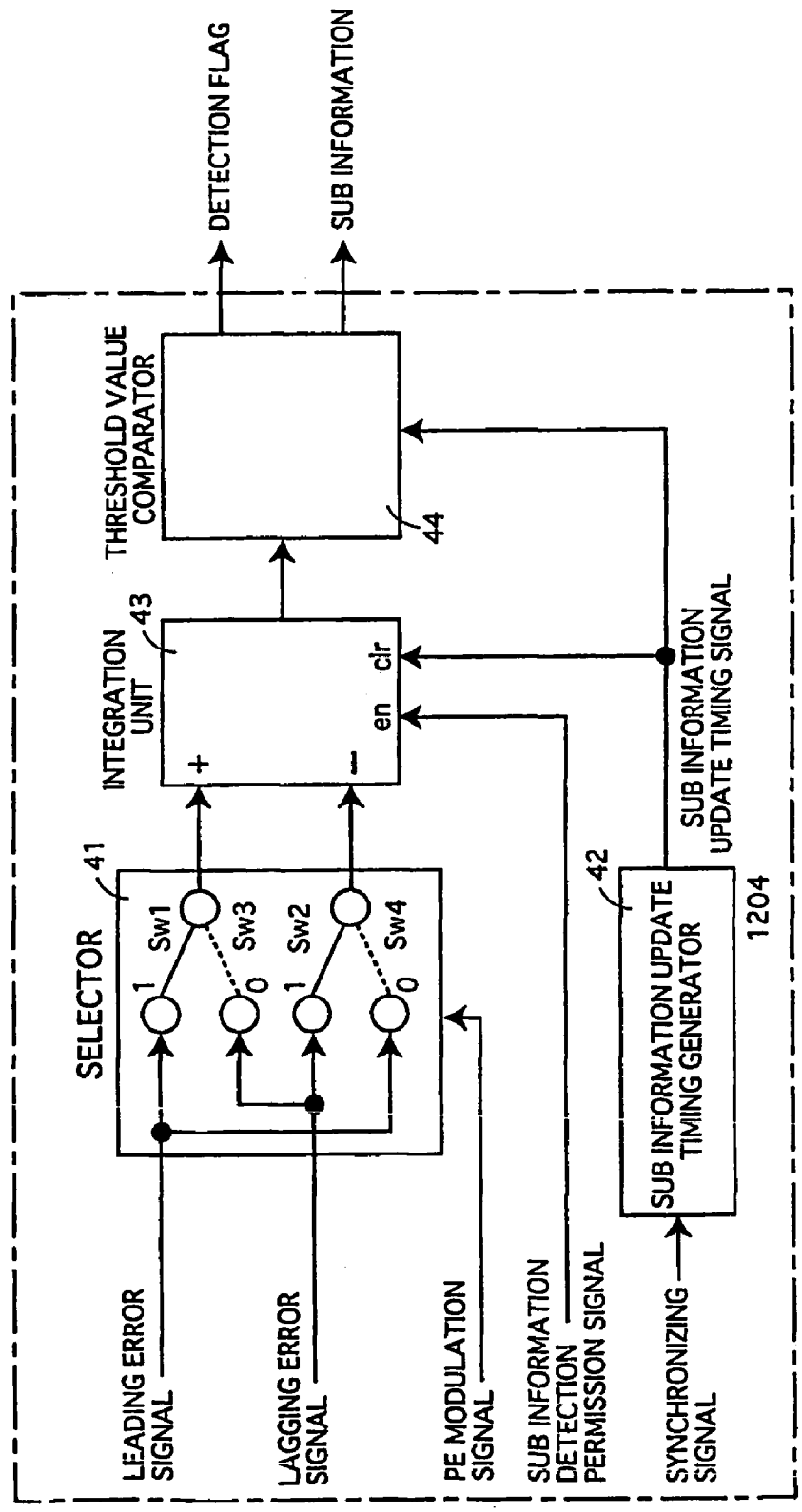
FIG. 31 is a circuit diagram showing a detailed construction of the sub information detector.

The internal construction of the sub information detector 27 will now be described. FIG. 31 is a circuit diagram showing a detailed construction of the sub information detector 27. The sub information detector 27 includes a selector 41, a sub information update timing generator 42, an integration unit 43, and a threshold value comparator 44.

The selector 41 is composed of a pair of 2-input 1-output switches. When the PE modulation signal output from the PE modulator 26 is "1" (in the High section), the selector 41 controls the pair of 2-input 1-output switches as indicated by the solid lines sw1 and sw2 in FIG. 31 so that the leading and lagging error signals from the clock generator 23 are connected to the positive and negative input terminals of the integration unit 43, respectively. When the PE modulation signal is "0" (in the Low section), the selector 41 controls the pair of 2-input 1-output switches as indicated by the solid lines sw3 and sw4 in FIG. 31 so that the leading and lagging error signals from the clock generator 23 are connected to the negative and positive input terminals of the integration unit 43, respectively.

Figure 32:
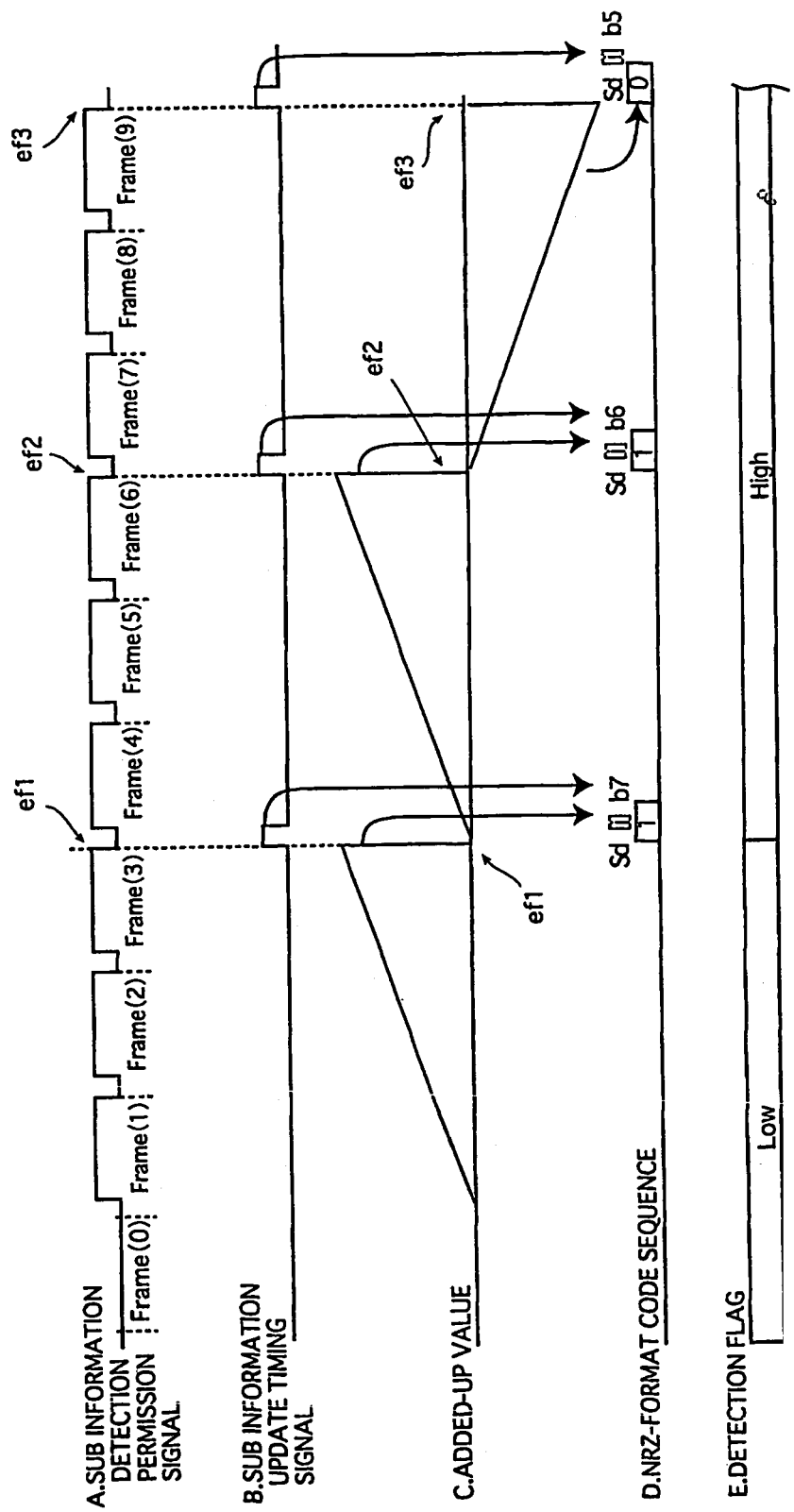
FIG. 32 is a timing chart showing the operation of the reproduction apparatus for 9 frames.

The sub information update timing generator 42 generates, based on the received synchronizing signal, a sub information update timing signal indicating the timing for updating the sub information. In the sub information update timing signal, a pulse appears once every three frames among the frames excluding the first and last frames of each sector. FIG. 32 is a timing chart showing the operation of the reproduction apparatus for 9 frames. The row A in FIG. 32 indicates the sub information detection permission signal shown in FIG. 26. The row B indicates the sub information update timing signal. As shown in FIG. 32, the High section appears in the sub information update timing signal with the timing ef1, ef2, and ef3, where the frames [1] through [3] have been read with the timing ef1, the frames [4] through [6] have been read with the timing ef2, and the frames [7] through [9] have been read with the timing ef3, otherwise, the sub information update timing signal is in the Low section.

The integration unit 43 is an analog integration unit having a positive input terminal and a negative input terminal and being a differential input and a bipolar output. The integration unit 43 adds up the size of each pulse existing in the leading and lagging error signals when there is the positive correlation between the PE modulation signal and the leading/lagging error signals. The integration unit 43 adds up the size of each pulse existing in the leading and lagging error signals as negative values when there is the negative correlation between the PE modulation signal and the leading/lagging error signals. The integration unit 43 then outputs to the threshold value comparator 44 an analog signal having a level that corresponds to an added-up value. The adding-up of the pulse size values is not performed and the value added up so far is kept while the sub information detection permission signal is in the Low section. The added-up value is cleared to zero when the sub information update timing signal output from the sub information update timing generator 42 changes to the High section. The row C in FIG. 32 shows how the integration unit 43 adds up the values. As shown in the row C, values are added up during respective periods when frames [1] to [3] and frames [4] to [6] are read out, and are added up as negative values during a period when frames [7] to [9] are read out. The added-up value is reset at ef1, ef2, and ef3 which are the timing with which the sub information update timing signal changes to the High section.

The threshold value comparator 44 is a comparator that compares a voltage level indicated by the analog signal from the integration unit 43 with a positive threshold value and a negative threshold value when the sub information update timing signal is input from the sub information update timing generator 42, and judges to which of the following the voltage level belongs: (a) greater than the positive threshold value, (b) smaller than the negative threshold value, and (c) not greater than the positive threshold value and not smaller than the negative threshold value. The threshold value comparator 44 outputs NRZ-format codes "1" and "0" when the analog signal voltage level is (a) and (b), respectively. In both cases, the threshold value comparator 44 sets the detection flag to "H" (High). The threshold value comparator 44 sets the detection flag to "L" (Low) when the analog signal voltage level is (c). The rows D and E in FIG. 32 show the NRZ-format codes and the detection flag that are output and set by the threshold value comparator 44, respectively. The NRZ-format codes "1", "1", and "0" in the row D, which are determined according to the added-up values shown in the row C, are recognized as sub information sd[i]b7, sd[i]b6, and sd[i]b5, respectively. As understood from the above description, the detection flag indicates whether or not the sub information bits have been detected. The detection flag shown in the row E in FIG. 32 is set to "High" during periods corresponding to the frames [1] through [9], indicating that the sub information bits have been detected during these periods.

As described above, the fourth embodiment allows a conventional optical disc reproduction apparatus to reproduce data on the optical disc described in the first and second embodiments by allowing the conventional reproduction apparatus to perform a process of adding up the pulse size of the leading/lagging error signals. This enables a reproduction apparatus for the optical disc described in the first and second embodiments to become widespread.

In the fourth embodiment, the sizes of the pulses contained in the leading/lagging error signals are added up, and the added-value is compared with threshold values to detect the sub information bits. However, this process may be replaced with the statistics process described in the first embodiment. That is to say, when there is the positive correlation between the PE modulation signal and the leading/lagging error signals, a counter value is incremented. On the other hand, when there is the negative correlation between the PE modulation signal and the leading/lagging error signals, another counter value for negative values is incremented. The counter values are then compared with threshold values.

FIFTH EMBODIMENT

The fifth embodiment of the present invention relates to an improvement in an error correction by using ECC blocks.

Details of Sectors for Error Correction

Figure 33:
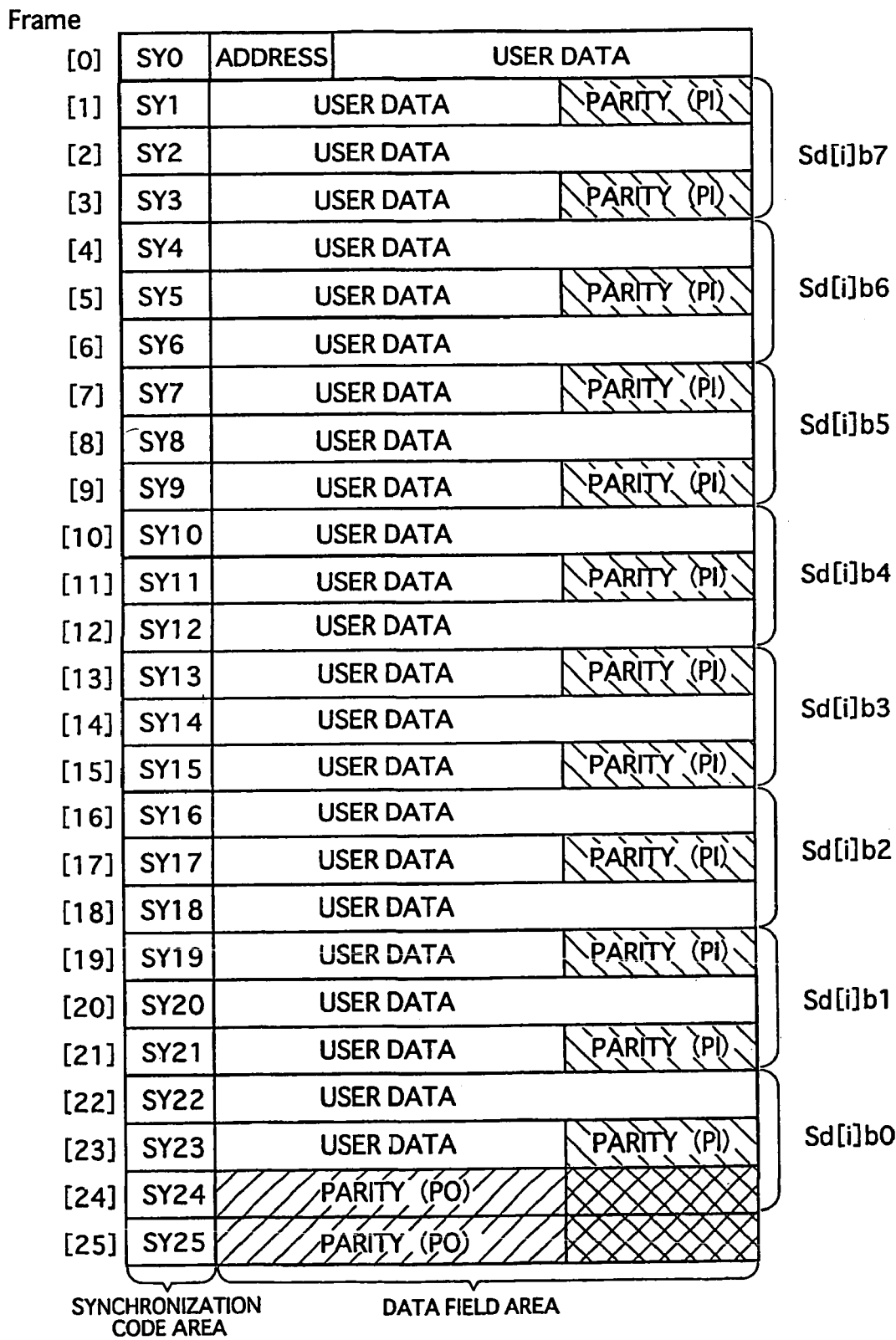
FIG. 33 shows details of the frame construction shown in FIG. 9.

FIG. 33 shows details of the frame construction shown in FIG. 9. As shown in FIG. 33, frame [0] stores an address and user data in the data field area. Frames [24] and [25] store an outer code parity PO. Odd-number frames [1], [3], [5], . . . [23] store user data and an internal code parity PI. FIG. 34 shows the frames differently arranged from FIG. 33. The outer code parities PO and internal code parities PI in FIG. 34 form a reversed L shape.

Figure 35:
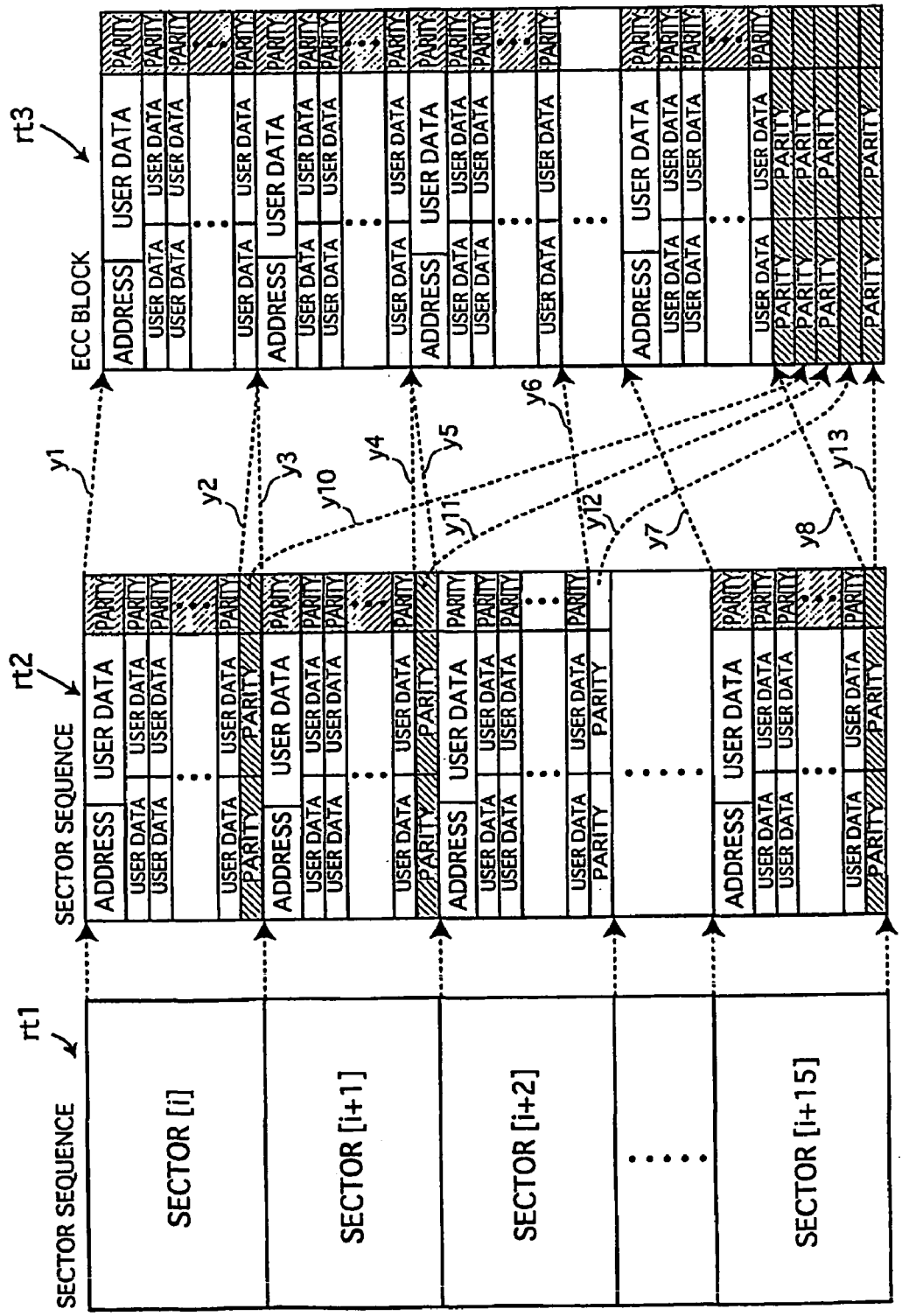
FIG. 35 shows how a matrix by a block product code method is obtained from 16 sectors.

FIG. 35 shows how a matrix by a block product code method is obtained from 16 sectors.

Figure 36:
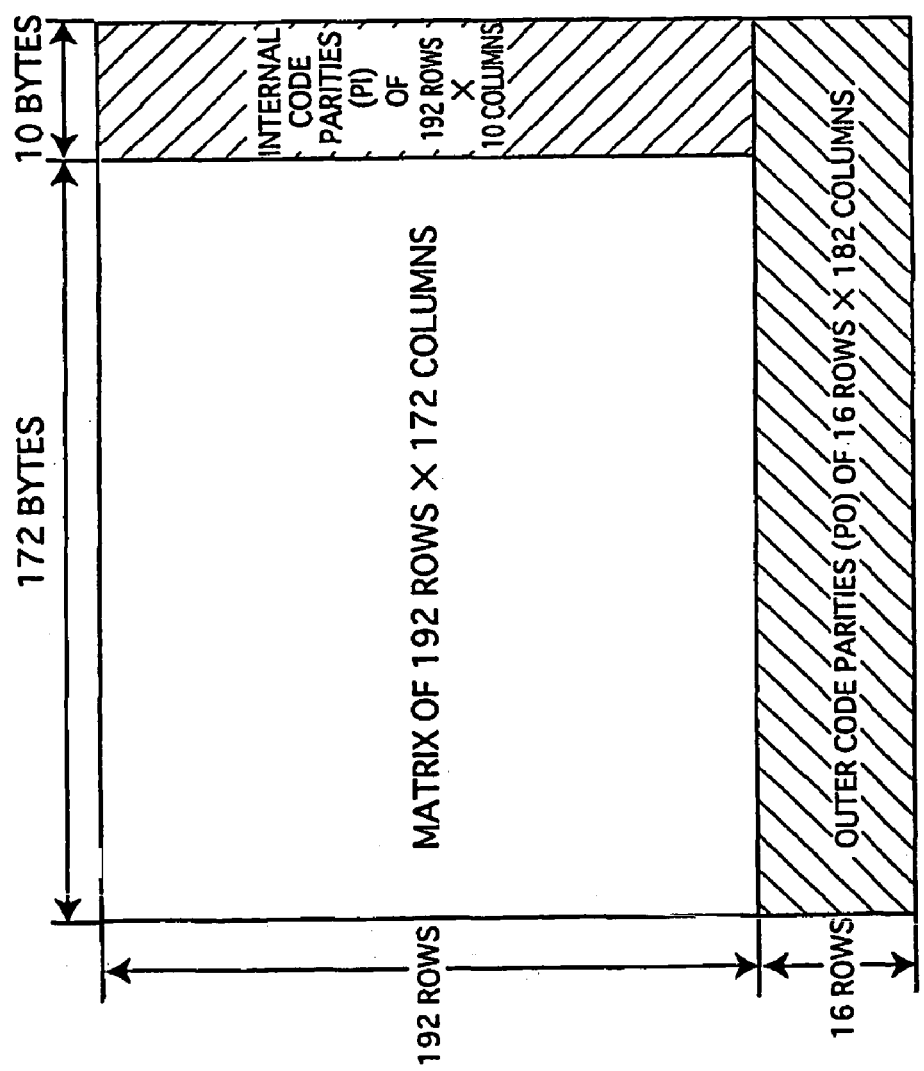
FIG. 36 shows a matrix of error correction blocks by the block product code method obtained by the rearrangement shown in FIG. 35.
Figure 37:
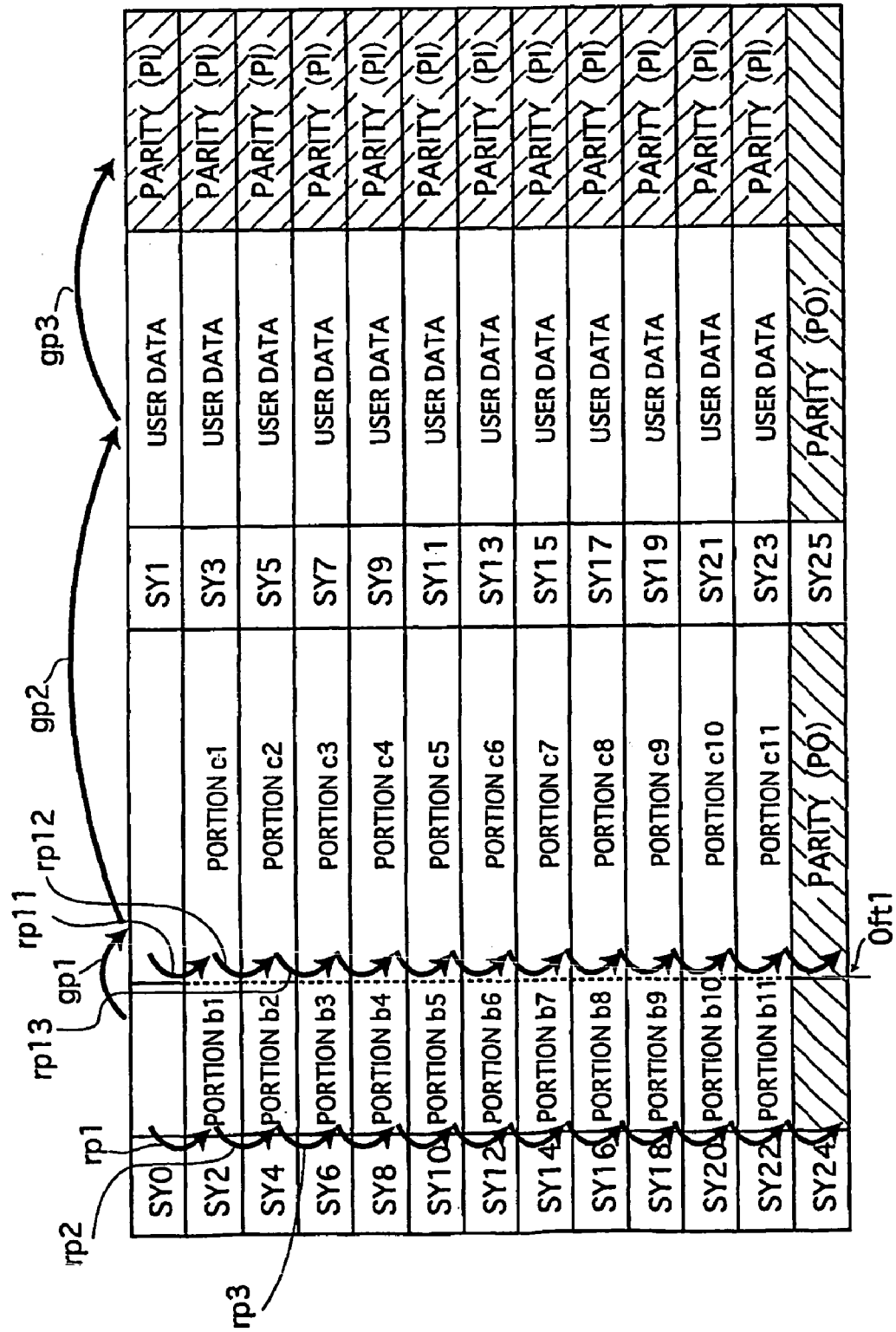
FIG. 37 shows the procedure for error correction in the row direction.

The first column rt1 in FIG. 35 shows vertically arranged sectors [i] through [i+15] that are shown in FIG. 8. The second column rt2 in FIG. 35 shows the frames contained in the sectors [i] through [i+15]. The third column rt3 in FIG. 35 shows a matrix by a block product code method. It is understood from FIG. 35 that that the frames [0] through [23] of each sector are rearranged vertically as indicated by the arrows y1 through y8. It is also understood that the frames [24] and [25] of each sector are rearranged vertically as indicated by the arrows y10 through y13. In this way, 16-row outer code parities PO and 192-row internal code parities PI are formed by rearranging the frames [24] and [25] of each of the 16 sectors. In this way, a matrix by a block product code method is obtained in the optical disc reproduction apparatus. FIG. 36 shows a matrix of error correction blocks by the block product code method obtained by the rearrangement shown in FIG. 35. In FIG. 36, pieces of 1-byte data are arranged to form a matrix that includes a column of internal code parities PI and a row of outer code parities PO. This is an error correction code (ECC) block defined in the DVD-ROM standard.

In the block product code method using the ECC block, the error correction is performed in the directions of row and column.

In the error correction in the direction of row, the error correction is performed on the address and user data portion c0 in frame [0], and the user data and internal code parity PI in frame [1], as indicated by the arrows gp1, gp2, and gp3. The error correction is then performed on the user data and internal code parity PI of each frame in the order of [2], [3], [4], . . . [23] and the outer code parities PO of frames [24] and [25]. In the error correction in the direction of column, the error correction is first performed on the address and user data portions b1 through b11 in even-number frames [2], [4], [6], . . . [22] and an outer code parity PO portion of frame [24] as indicated by the arrows rp1, rp2, rp3, . . . , where each of the user data portions b1 through b11 ranges from immediately after the synchronization code to off set oft1. The error correction is then performed on user data portions c0 through c11 in even-number frames [0], [2], [4], . . . [22] and an outer code parity PO portion of frame [24] as indicated by the arrows rp11, rp12, rp13, . . . , where each of the user data portions c0 through c11 ranges from the offset oft1 to the frame end. The error correction is further performed on the user data in odd-number frames [1], [3], [5], . . . [23] and an outer code parity P of frame [25], and further performed on the internal code parities PI of the odd-number frames.

In the above-described error correction process, the error correction for the first row (the address, user data portion c0, user data and internal code parity PI in frame [1]) and the first column (the address, user data portions b1 through b11, and outer code parity PO portion of frame [24]) should be noted since both include the address. If one of the user data portions processed together with the address is erroneously recognized, the time required for the error correction increases. That means it takes a long time until the address is recognized. This decreases the speed of reproduction. This erroneous recognition increases the probability of occurrence of error, and a limit of error correction containing the address may be neared or exceeded by this. This also increases the probability of an occurrence of erroneous recognition of the address.

Taking the above matter into consideration, the fifth embodiment restricts the range of leading/lagging edges, that is, a sub information superposition area, as compared with the first embodiment.

Restriction on Range of Leading/Lagging Edges

Figure 38:
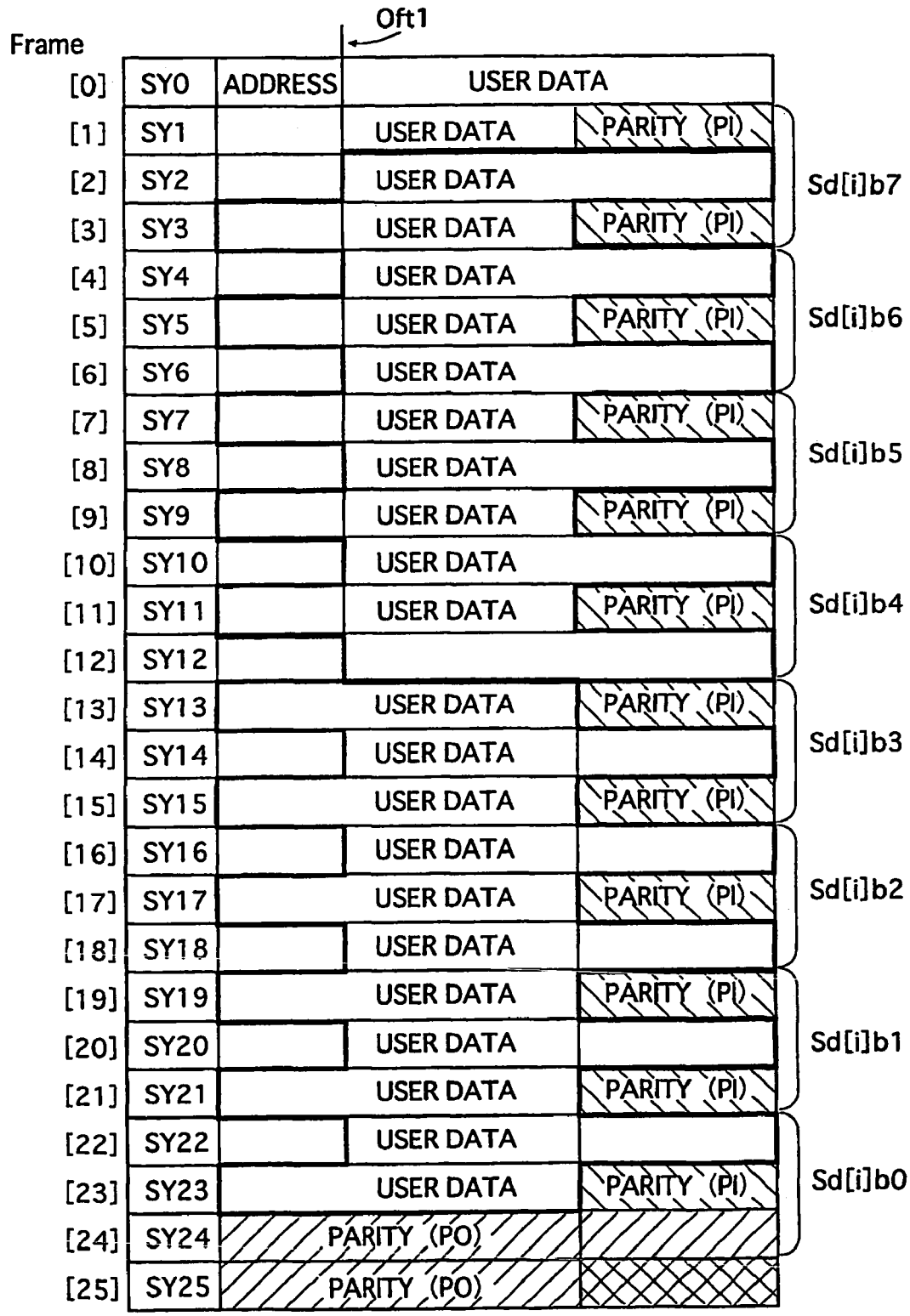
FIG. 38 shows the area in which leading/lagging edges are generated, where the section shown in FIG. 38 is equal to that shown in FIG. 33.

FIG. 38 shows the area on which the sub information is superposed, where the section shown in FIG. 38 is equal to that shown in FIG. 33. In FIG. 38, an area encircled by a thick line is the area on which the sub information is superposed. As understood from FIG. 38, frame [24] is not included in the area, as well as frame [25]. Frame [1] is also excluded from the area. With regard to the odd-number frames [3], [5], [7], . . . [23] containing the internal code parity PI, a portion ranging from immediately after the synchronization code to immediately before the internal code parity PI is included in the super position area. With regard to the even-number frames [2], [4], [6], . . . [22], a portion ranging from oft1 to the frame end is included in the superposition area. The internal and outer code parities are not included in the superposition area. This is because an occurrence of an erroneous recognition to the internal or outer code parity should be avoided since it has an ill effect on the error correction process.

Figure 39:
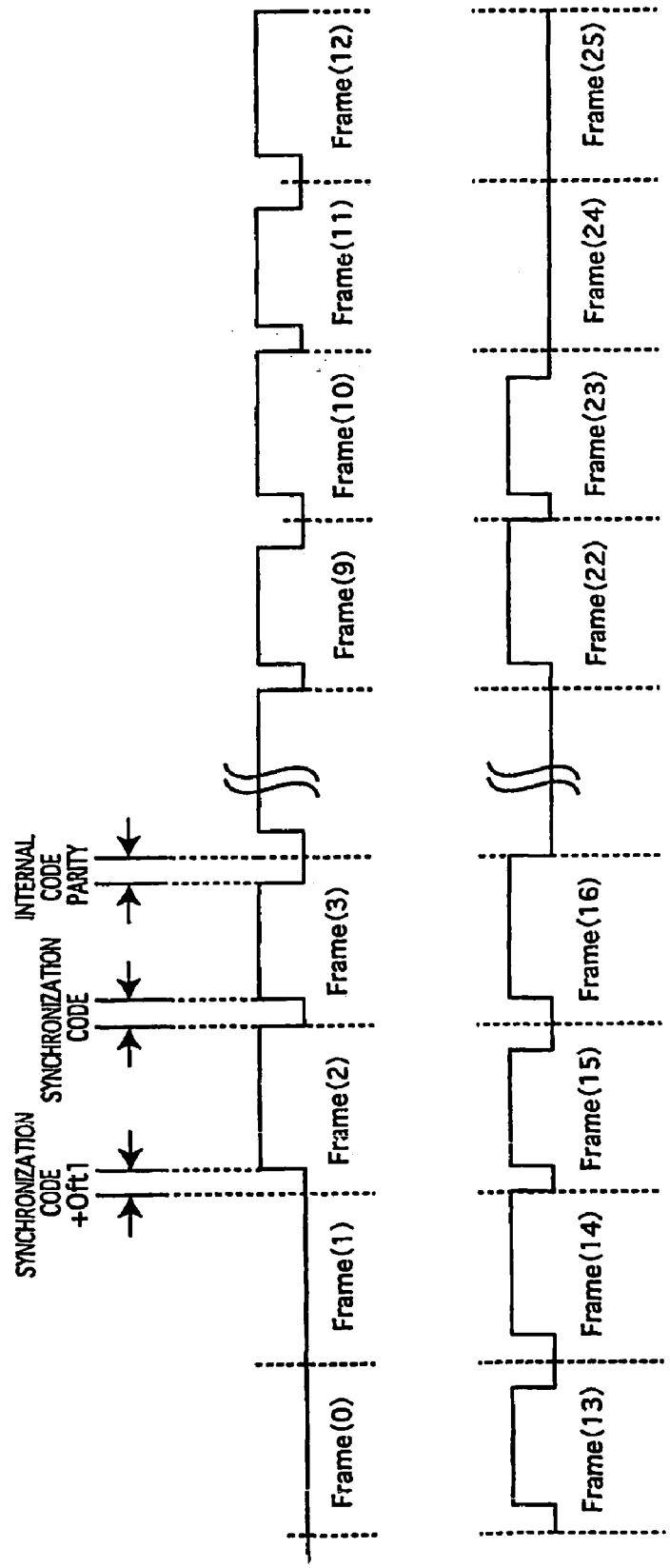
FIG. 39 shows an example of the phase modulation permission signal in the fifth embodiment of the present invention.

How the recording apparatus records the sectors with the restricted superposition area will now be described. As explained in the fourth embodiment, whether to permit the phase displacement for each frame is indicated by the phase modulation permission signal. As a result, the fifth embodiment allows the timing generator 2 to restrict the superposition area by using the phase modulation permission signal. FIG. 39 shows an example of the phase modulation permission signal in the fifth embodiment. As shown in FIG. 39, sections of the phase modulation permission signal corresponding to frames [0], [1], [24], and [25] are always Low. Also, sections of the phase modulation permission signal corresponding to the synchronization code and the internal code parity PI of odd-number frames [3], [5], [7], . . . [23] are Low. Further, sections of the phase modulation permission signal corresponding to the section ranging from immediately after the synchronization code to the offset oft1 of even-number frames [2], [4], [6], . . . [22] are Low.

Figure 40:
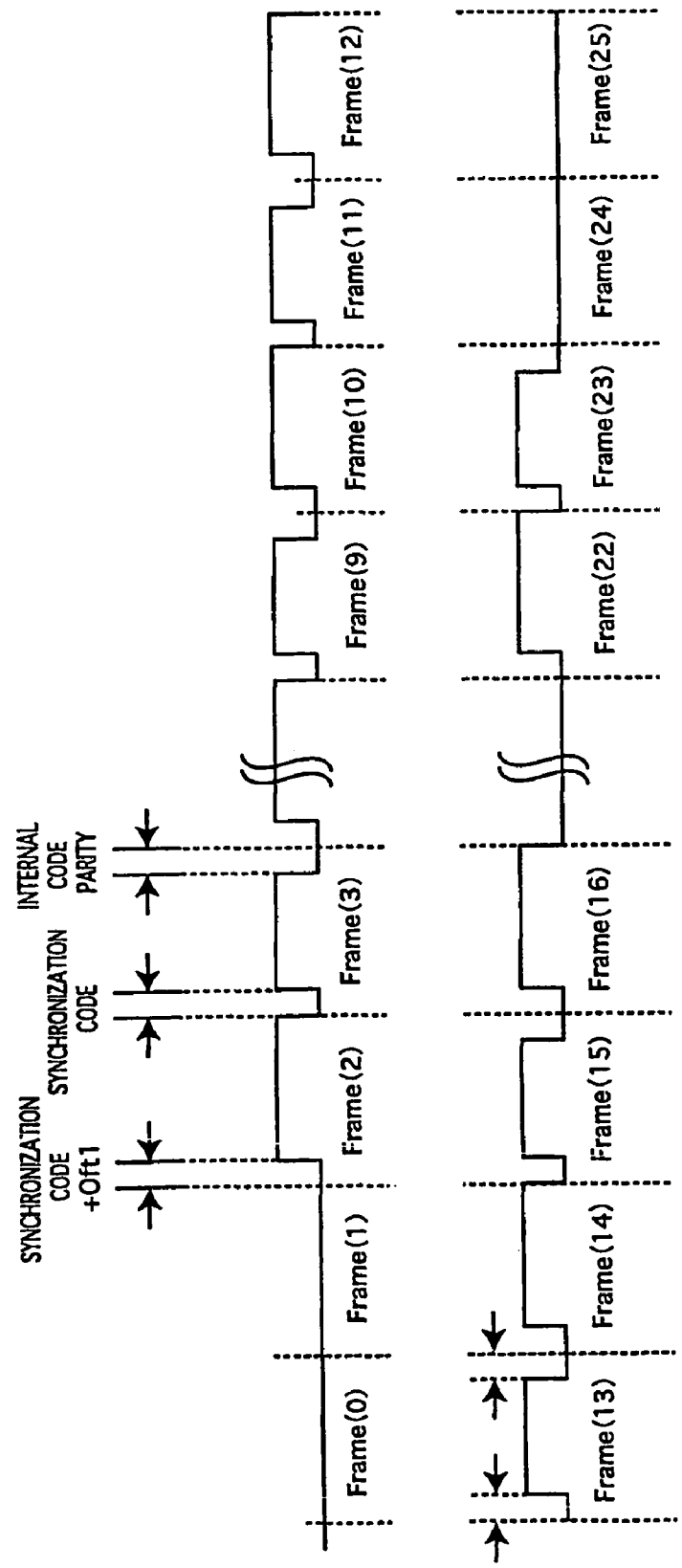
FIG. 40 shows an example of the sub information detection permission signal in the fifth embodiment.

How the reproduction apparatus reproduces the sectors with the restricted superposition area will now be described. As explained in the fourth embodiment, whether to permit the sub information detection for each frame is indicated by the sub information detection permission signal. As a result, the fifth embodiment allows the reproduction signal processing circuit 24 to perform the above-described restriction on the superposition area. FIG. 40 shows an example of the sub information detection permission signal in the fifth embodiment. As shown in FIG. 40, sections of the sub information detection permission signal corresponding to frames [0], [1], [24], and [25] are always Low. Also, sections of the sub information detection permission signal corresponding to the synchronization code and the internal code parity PI of odd-number frames [3], [5], [7], . . . [23] are Low. Further, sections of the sub information detection permission signal corresponding to the section ranging from immediately after the synchronization code to the offset oft1 of even-number frames [2], [4], [6], . . . [22] are Low.

As described above, the fifth embodiment provides a smooth and high-speed error correction process by restricting the sub information superposition area. As a variation of the fifth embodiment, only the internal and outer code parities PI and PO may be excluded from the superposition area, and the sub information may be superposed on the section ranging from immediately after the synchronization code to the offset oft1. When information such as an ID Error Detection (IED), Copyright-Management (CPR-MA) and Error Detection Code (EDC) is included in the sectors, and the accuracy in reading these types of information should be secured, the edges corresponding to these types of information should not be displaced.

SIXTH EMBODIMENT

The sixth embodiment of the present invention proposes that detection area specification information and sub information existence information are recorded on an optical disc, where the detection area specification information specifies areas on the optical disc that should be checked for the sub information, and the sub information existence information indicates whether the sub information is assigned to sectors, for each sector.

Figures 41A, 41B:
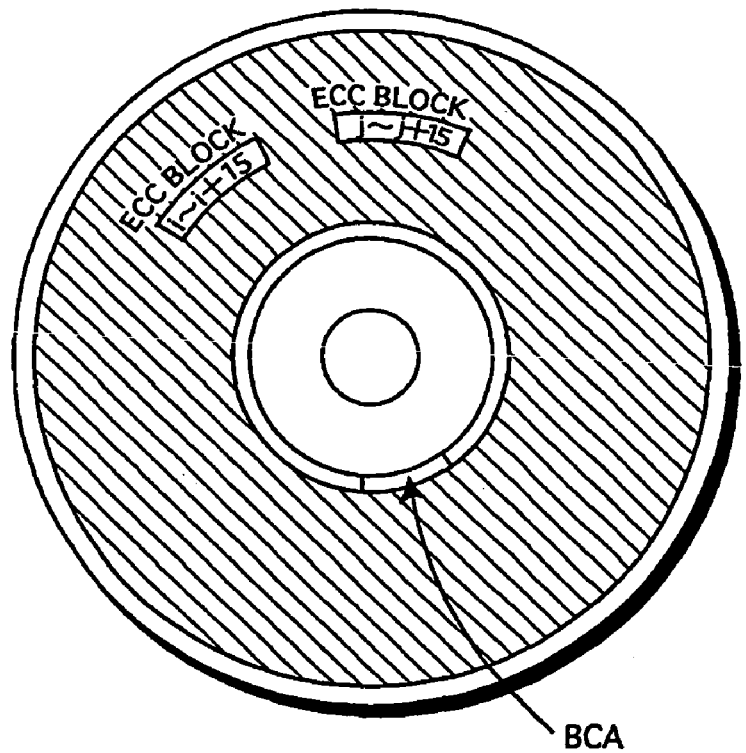
FIG. 41A shows examples of the detection area specification information and the sub information existence information.
FIG. 41B shows how the detection area specification information and the sub information existence information shown in FIG. 41A are recorded on the optical disc.

Detection Area Specification Information and Sub Information Existence Information FIG. 41A shows examples of the detection area specification information and the sub information existence information. As shown in FIG. 41A, the detection area specification information indicates the start addresses and end addresses of the areas that should be checked for the sub information ("start address: i", "end address: i+15", "start address: j", "end address: j+15"). The information "Yes" in the sub information existence information indicates that the sub information is superposed on an ECC block composed of the sectors ranging from the addresses "i" to "i+15". The information "No" in the sub information existence information indicates that the sub information is not superposed on an ECC block composed of the sectors ranging from the addresses "i" to "i+15".

The sector addresses written on the detection area specification information to indicate the sectors on which the sub information is superposed enable the reproduction apparatus to recognize the sectors that should be checked for the sub information. On the other hand, the sector addresses written on the detection area specification information to indicate the addresses of the sectors on which the sub information is not superposed provide a strict requirement to the check for the sub information. That is to say, in the sixth embodiment, the validity of the sub information is not confirmed just by the fact that the sub information is detected from the sectors having the addresses written on the detection area specification information for which the sub information existence information is "Yes", but is confirmed after the following fact is also confirmed: the sub information is not detected from the sectors having the addresses written on the detection area specification information for which the sub information existence information is "No".

FIG. 41B shows how the detection area specification information and the sub information existence information shown in FIG. 41A are recorded on the optical disc. In the sixth embodiment, the detection area specification information and the sub information existence information are recorded on the BCA (Burst Cutting Area) of the optical disc. The BCA is formed by partly removing the reflection layer on the optical disc in stripes. The BCA cannot be read without authorization. The detection area specification information and the sub information existence information are recorded on the BCA after they are encrypted by using information which is unique to the optical disc.

The reason why the detection area specification information and the sub information existence information are recorded on the BCA is that it is difficult for the user to falsify the data recorded on the BCA. However, the area on which the detection area specification information and the sub information existence information are recorded is not limited to the BCA, and the information may be recorded on other areas so long as it is difficult for the user to falsify the data recorded thereon.

Recording Apparatus

Figure 42:
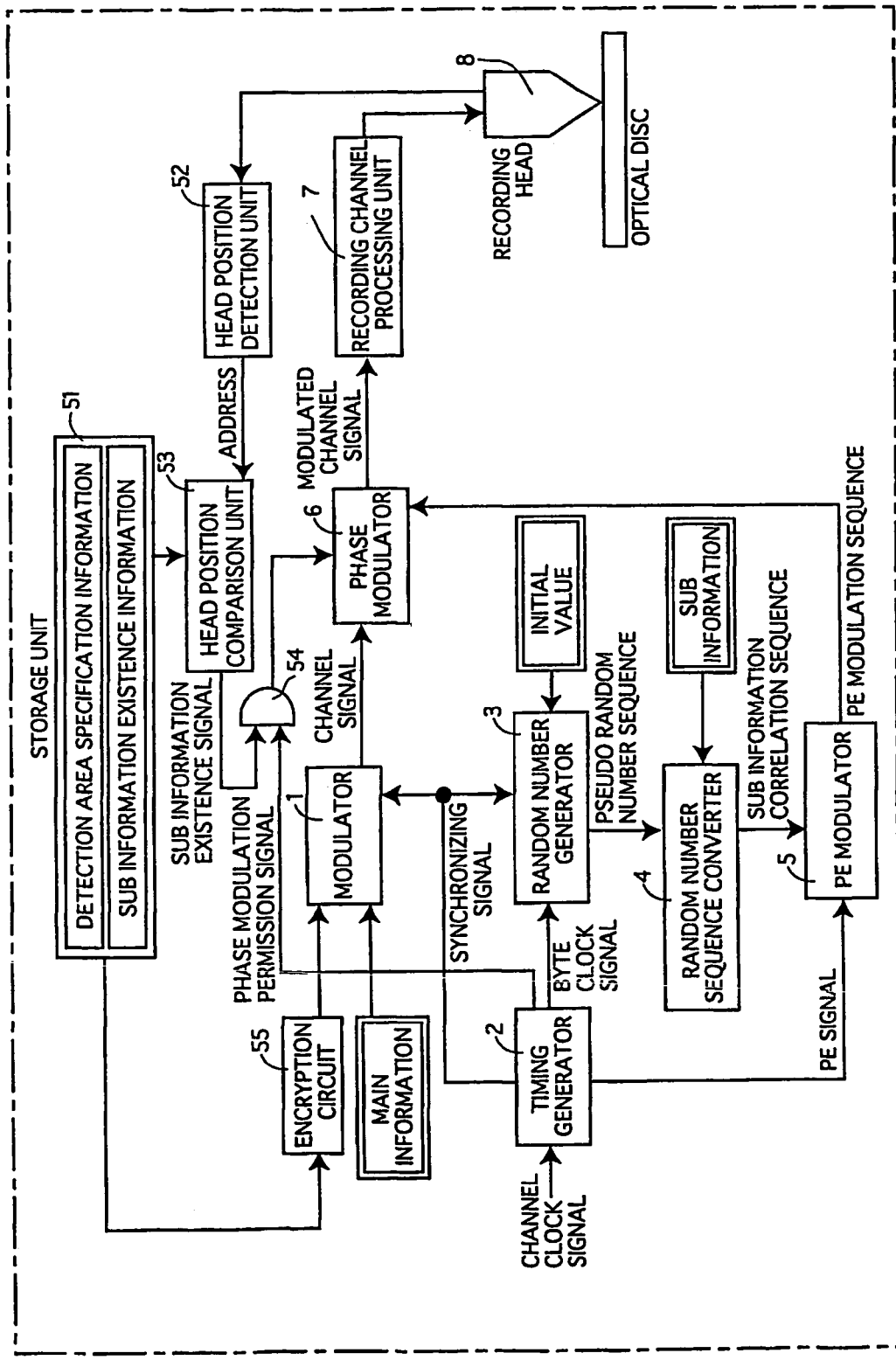
FIG. 42 shows the internal construction of the recording apparatus according to the sixth embodiment of the present invention.
Figure 43:
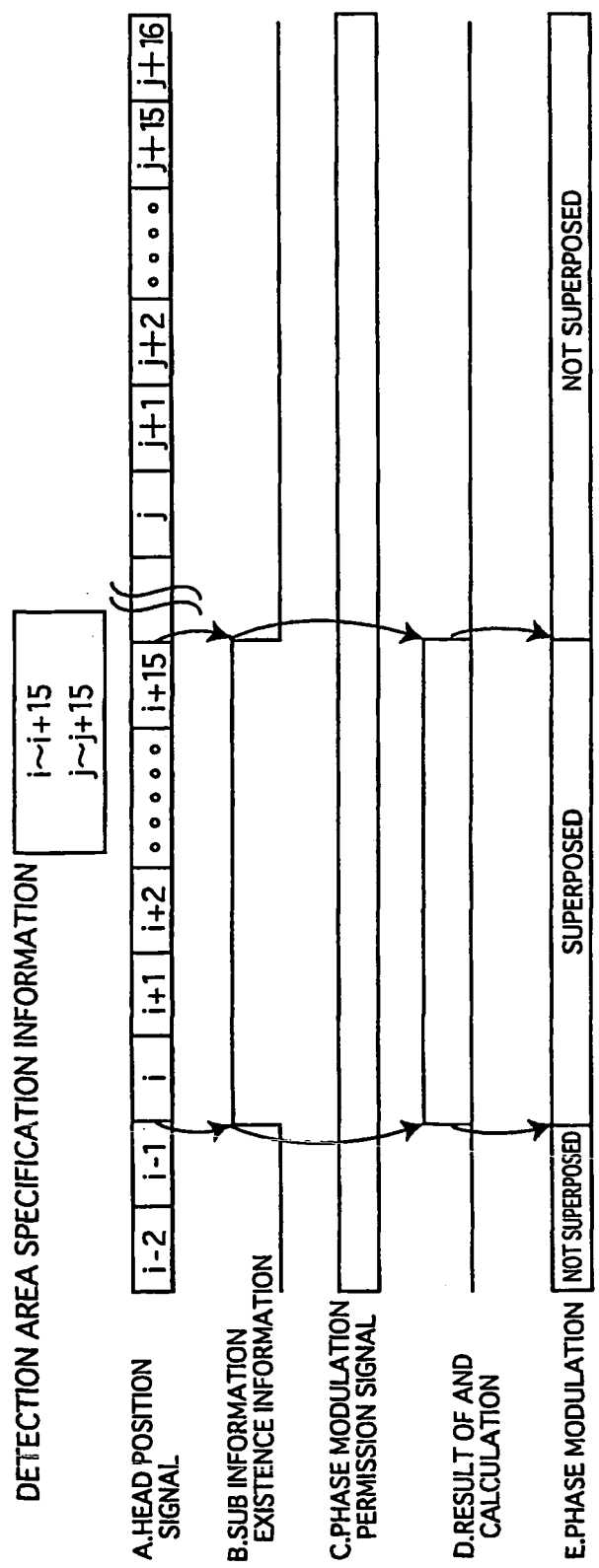
FIG. 43 shows a timing chart for the recording apparatus according to the sixth embodiment.

The recording apparatus according to the sixth embodiment has the construction shown in FIG. 42 so that the recording apparatus can record the detection area specification information and the sub information existence information on an optical disc. FIG. 42 shows the internal structure of the recording apparatus of the sixth embodiment. The structure differs from that shown in FIG. 19 in that the recording apparatus of the sixth embodiment additionally includes a storage unit 51, a head position detection unit 52, a head position comparison unit 53, an AND circuit 54, and an encryption circuit 55. FIG. 43 shows a timing chart for the recording apparatus of the sixth embodiment.

The storage unit 51 stores beforehand a plurality of pairs of the detection area specification information and the sub information existence information that are to be recorded on the optical disc.

The head position detection unit 52 generates a head position signal that contains sector addresses which are read out by the recording head 8, and outputs the generated head position signal to the head position comparison unit 53. The row A in FIG. 43 shows a head position signal. As shown in FIG. 43, the head position signal contains a plurality of sector addresses "i=2", "i−1", "i+1", "i+2", . . . . This makes it possible to recognize the current head position in real time. In the case where a CAPA (Complementary Allocated Pit Address) or LPP (Land-Pre-Pit) is formed on the surface of the optical disc, the current address is superposed on the read signal, and can be detected from the read signal.

The head position comparison unit 53 compares the addresses contained in the head position signal with the detection area specification information and the sub information existence information stored in the storage unit 51, and outputs a sub information existence signal that indicates the comparison results. The row B in FIG. 43 shows an example of the sub information existence signal. As shown in FIG. 43, the head position signal contains addresses indicated by the detection area specification information. The High section in the sub information existence signal corresponds to the sector addresses ranging from "i" to "i+15" that indicate a section in which the sub information existence information is superposed.

The AND circuit 54 performs a logical AND operation between (a) the phase modulation permission signal generated by the timing generator 2 and (b) the sub information existence signal generated by the head position comparison unit 53. It should be noted here that as described in the fifth embodiment, the phase modulation permission signal indicates for each frame in a sector whether or not superposition of the sub information is permitted. The sub information existence information indicates the sectors on which the sub information is superposed, where the sectors are also indicated as detection areas by the detection area specification information. Accordingly, the logical AND operation allows a phase modulation to be performed on only the High section of the sub information existence signal based on the phase modulation permission signal. The row D in FIG. 43 shows the results of the logical AND operation. The row E in FIG. 43 shows whether the sub information has been superposed. As shown in FIG. 43, the sub information is superposed while the sub information existence signal is in the High section that corresponds to the addresses "i" through "i+15".

The encryption circuit 55 encrypts a plurality of pairs of the detection area specification information and the sub information existence information, using an identifier unique to the optical disc, and outputs the encrypted pairs to the modulator 1. The encrypted pairs are recorded on the BCA.

Up to now, the internal structure of the recording apparatus has been described. From now on, the internal structure of the reproduction apparatus will be described.

Reproduction Apparatus

Figure 44:
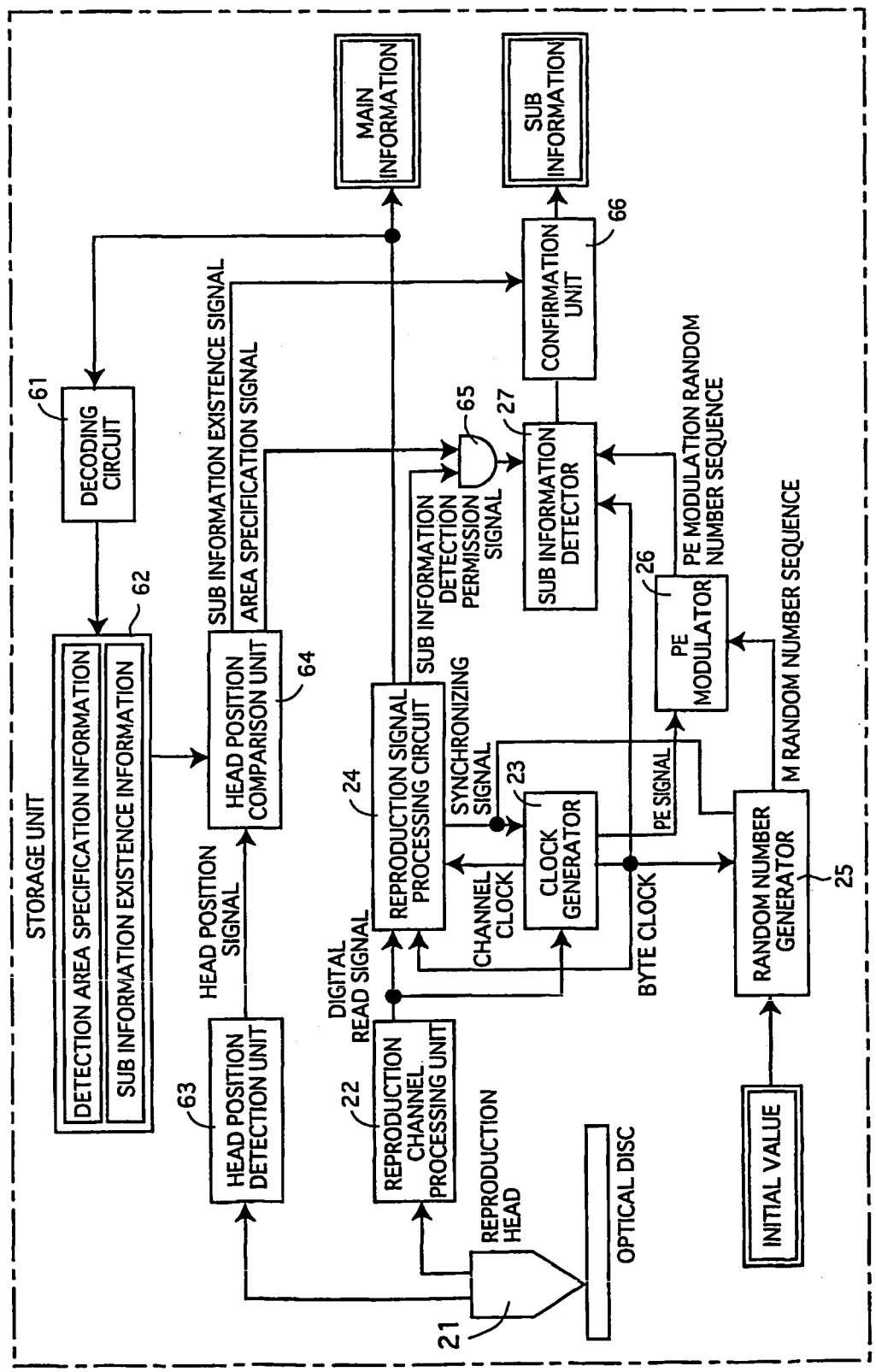
FIG. 44 shows the internal structure of the reproduction apparatus according to the sixth embodiment.
Figure 45:
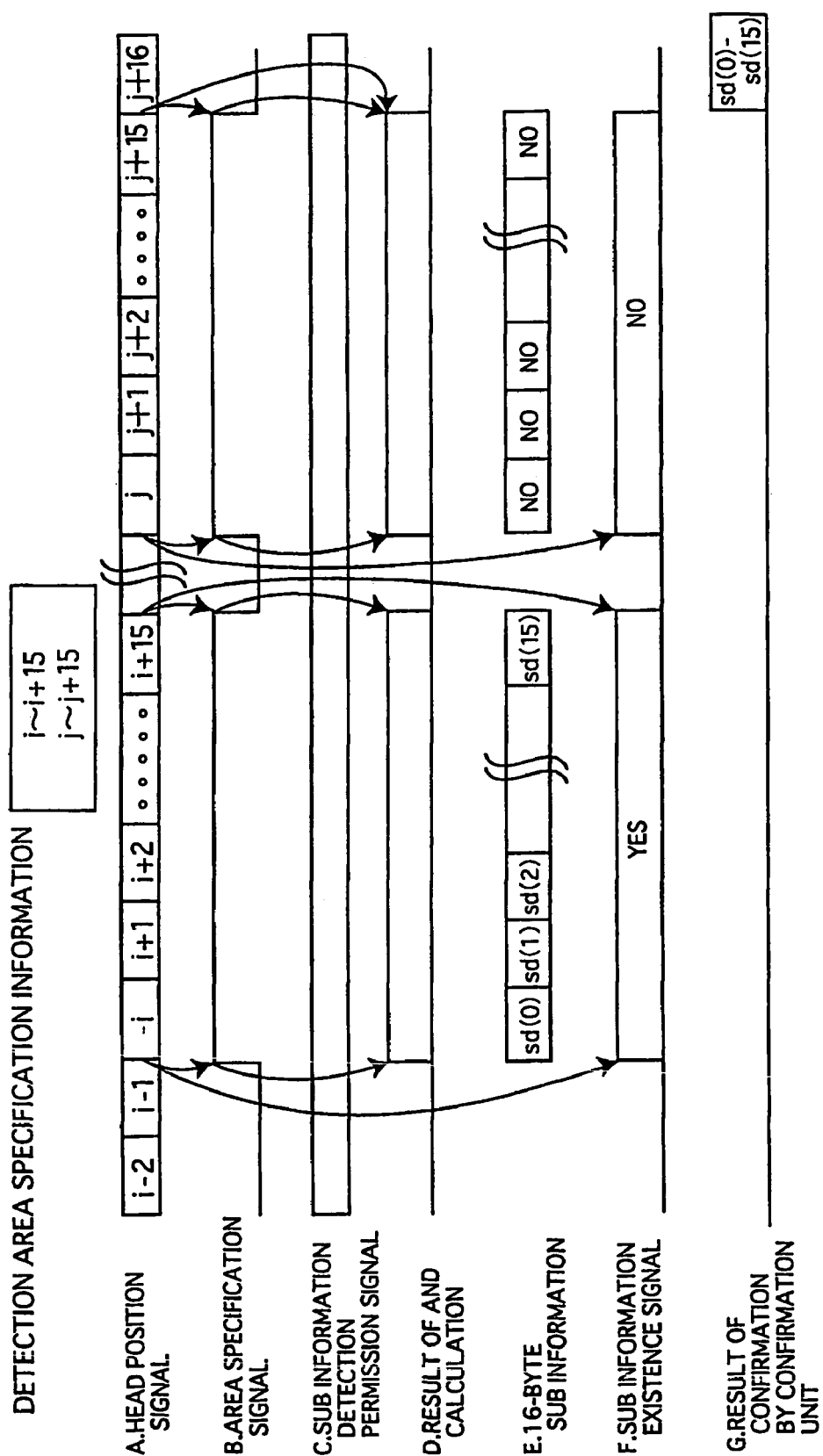
FIG. 45 shows a timing chart for the reproduction apparatus.

FIG. 44 shows the internal structure of the reproduction apparatus according to the sixth embodiment. The internal structure differs from that shown in FIG. 25 in that the reproduction apparatus of the sixth embodiment additionally has a decoding circuit 61, a storage unit 62, a head position detection unit 63, a head position comparison unit 64, an AND circuit 65, and a confirmation unit 66. FIG. 45 shows a timing chart for the reproduction apparatus of the sixth embodiment.

The decoding circuit 61 uses the identifier which is unique to the optical disc to decode the plurality of pairs of the detection area specification information and the sub information existence information that are read from the BCA, and stores the decoded information in the storage unit 62.

The storage unit 62 stores the plurality of pairs of the detection area specification information and the sub information existence information that are decoded by the decoding circuit 61. It should be noted here that in the sixth embodiment, the storage unit 62 stores the plurality of pairs of the detection area specification information and the sub information existence information that are read from the optical disc. However, the storage unit 62 may store the detection area specification information and the sub information existence information that are previously set when the reproduction apparatus is produced. Storing the detection area specification information and the sub information existence information in the reproduction apparatus makes it possible to ensure the confidentiality of the detection area specification information and the sub information existence information. It is also possible to regularly update the detection area specification information and the sub information existence information previously stored in the storage unit 62, by using the detection area specification information and the sub information existence information that are read out from the optical disc.

The head position detection unit 63 has the same construction as the head position detection unit 53, and outputs a head position signal to the head position comparison unit 64, where the head position signal indicates a head position of the current reproduction in units of sectors.

The head position comparison unit 64 compares the head position signal output from the head position detection unit 63 with a plurality of pieces of detection area specification information and a plurality of pieces of sub information existence information stored in the storage unit 62, and outputs an area specification signal and a sub information existence signal that show the comparison results. The area specification signal is High only when the addresses belonging to a range indicated by the detection area specification information appear in the head position signal. The row B in FIG. 45 shows the area specification signal. The signal is in the High sections that correspond to the addresses "i" through "i+15" and the addresses "j" through "j+15". The sub information existence signal indicates a period during which the addresses belonging to a range indicated as "yes" (the sub information is superposed) or "no" (the sub information is not superposed) appear in the head position signal. The row F in FIG. 45 shows the sub information existence signal. In the row F, the sub information existence signal indicates that a section corresponding to the addresses "i" through "i+15" is "yes" (the sub information is superposed), and a section corresponding to the addresses "j" through "j+15" is "no" (the sub information is not superposed).

The AND circuit 65 performs a logical AND operation between (a) the sub information detection permission signal and (b) the area specification signal generated by the head position comparison unit 64. It should be noted here that, as described in the fifth embodiment, the sub information detection permission signal indicates for each frame in a sector whether or not detection of the sub information is necessary. The area specification signal indicates the sectors that are indicated as detection areas in the detection area specification information. Accordingly, the logical AND operation allows the sub information to be detected based on the sub information detection permission information, only for a period during which the area specification signal is in the High section. The row D in FIG. 45 shows the results of the logical AND operation. The row E in FIG. 45 shows whether or not the sub information has actually been superposed. As shown in FIG. 45, the sub information is superposed in a section that corresponds to the addresses "i" through "i+15", but not in a section that corresponds to the addresses "j" through "j+15".

The confirmation unit 66 checks to confirm that the sub information detected by the sub information detector 27 exists for a period during which the sub information existence signal indicates "yes", and checks to confirm and that the sub information detected by the sub information detector 27 does not exist for a period during which the sub information existence signal indicates "no". The row G in FIG. 45 shows the check results by the confirmation unit 66. The confirmation unit 66 confirms that the detected sub information is authorized since the sub information is detected during a period corresponding to the address "i" through "i+15" and the sub information existence signal indicates "yes" for the section. The confirmation unit 66 also confirms that the detected sub information is authorized since the sub information is not detected during a period corresponding to the address "j" through "j+15" and the sub information existence signal indicates "no" for the section. As a result, it is firmly confirmed that the sub information detected by the sub information detector 27 is authorized since the authority of the detected sub information has been confirmed in terms of both a period during which the sub information is superposed and a period during which the sub information is not superposed.

As described above, according to the sixth embodiment, even if the sub information is embedded in all the ECC blocks by an unauthorized act of imitating an original optical disc, the original optical disc can be distinguished from the imitation optical disc.

SEVENTH EMBODIMENT

While the detection area specification information is written in units of sectors in the sixth embodiment, the detection area specification information is written in units of frames in the seventh embodiment of the present invention. In this case, a problem is how to detect the currently reproduced frame. In the case of readable/writable optical discs, this problem is solved. That is to say, by detecting wobble elements, the currently reproduced frame can be detected. The wobble elements are such elements that appear in the read signal when the recording grooves are formed on the surface of an optical disc by the wobble processing. It is possible to detect the position of the currently reproduced frame by counting the cycles of the wobble element.

If it is possible to detect the position of the currently reproduced frame, the following detection with a higher accuracy can be performed. That is to say, a frame number written in the detection area specification information is recorded beforehand, and it is judged whether or not the sub information is superposed on a frame of the frame number.

EIGHTH EMBODIMENT

In the first to seventh embodiments, the displacement amount $\Delta t$ is determined as a constant for the leading/lagging edges in all the recording marks. In the eighth embodiment, the displacement amount $\Delta t$ is changed depending on the length of the recording mark.

Setting Displacement Amount $\Delta t$

Figure 46A:
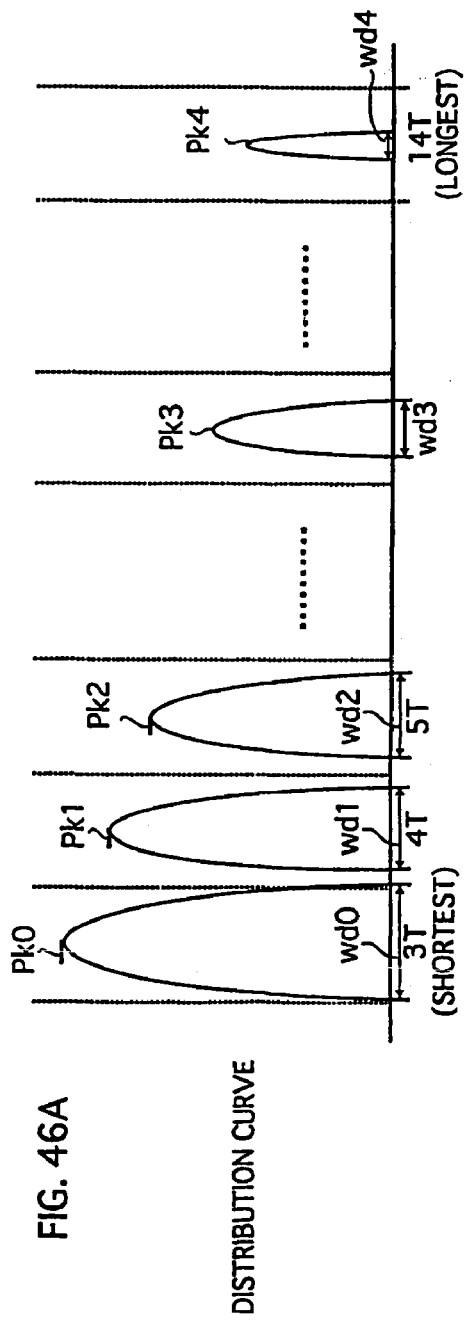
FIG. 46A shows a correspondence between recording mark lengths 3T, 4T, 5T, . . . 14T and distribution curves of the jitters occurring to the recording marks with the lengths.

As described in the first embodiment, each data field is recorded on an optical disc after it is subjected to the 8/16 modulation. As a result, each recording mark or space between recording marks has a length ranging from 2T to 14T, where T is one cycle of the clock pulse. FIG. 46A shows a correspondence between recording mark lengths and distribution curves of the jitters occurring to the recording marks with the lengths. It is understood from FIG. 46A that the distribution curve for the recording mark with the shortest length 3T has the highest peak value pk0, and that as the length becomes longer (4T, 5T, . . . 14T), the peak value becomes lower (pk1, pk2, . . . pk4). It is also understood that the distribution curve for the recording mark with length 3T is the widest, having width wd0, and that as the length becomes longer (4T, 5T, . . . 14T), the width becomes narrower (wd1, wd2, . . . wd4). When the recording mark is made shorter in order to achieve a higher density, the shape of the recording mark may become distorted and the recording mark becomes vulnerable to the interference between codes caused with an adjacent recording mark. The drawbacks of short recording marks are represented by the width of the distribution curve.

Figure 46B:
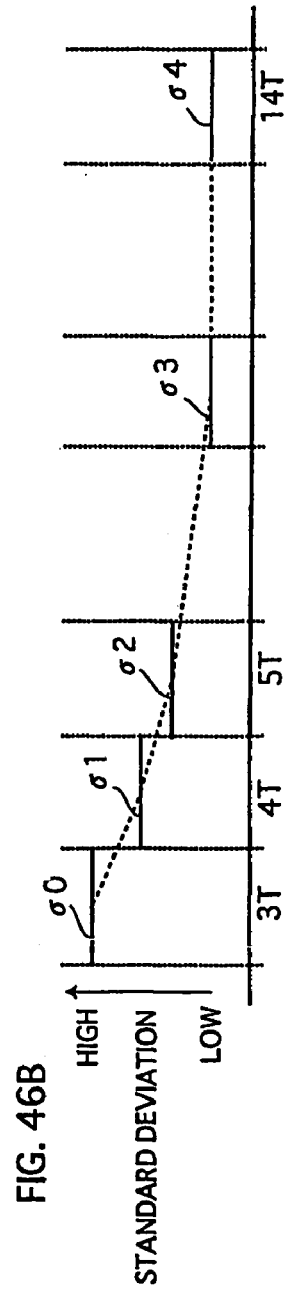
FIG. 46B shows the standard deviation for each of the distribution curves.

FIG. 46B shows the standard deviation for each of the distribution curves shown in FIG. 46A, where the standard deviation indicates the variations of jitters. As shown in FIG. 46B, the highest standard deviation is $\sigma 0$ that corresponds to the recording mark with length 3T, and that as the length becomes longer (4T, 5T, . . . 14T), the standard deviation becomes lower ($\sigma 1$, $\sigma 2$, . . . $\sigma 4$).

Figure 46C:
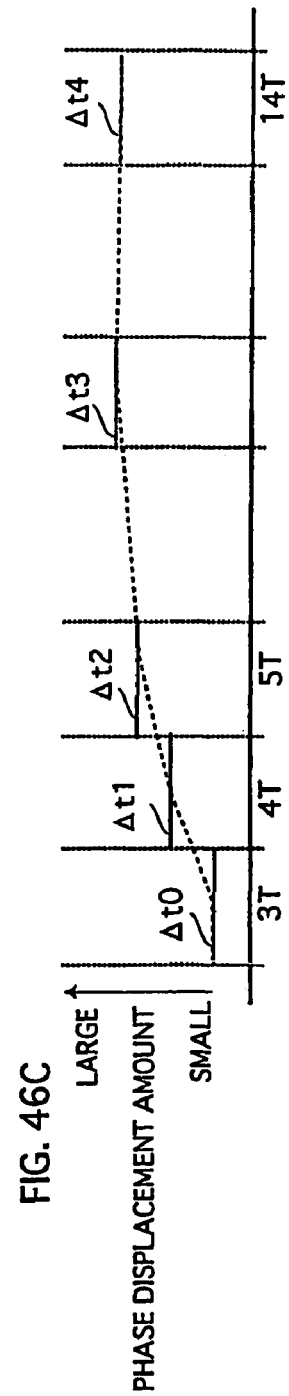
FIG. 46C shows a correspondence between recording mark lengths and displacement amounts Δt, each of which is obtained by applying the standard deviation of each length to Formula 5, and is unique to the corresponding recording mark length.

FIG. 46C shows appropriate values of the displacement amount $\Delta t$ for each length of the recording mark, where the appropriate values are obtained by performing a calculation using Formula 5 shown in the second embodiment (refer to FIG. 15B). FIG. 46C shows a correspondence between recording mark lengths and displacement amounts $\Delta t$, each of which is obtained by applying the standard deviation of each length to Formula 5, and is unique to the corresponding recording mark length. As understood from FIG. 46C, as the length becomes longer (4T, 5T, . . . 14T), the displacement amounts $\Delta t$ becomes larger ($\Delta$ t1, $\Delta$ t2, . . . $\Delta$ t4). As described above, the optical disc of the eighth embodiment is characterized in that as the recording mark length becomes longer, the displacement amounts $\Delta t$ becomes larger. However, performing the above process on each recording mark would put a heavy load on the recording apparatus.

Figure 47A:
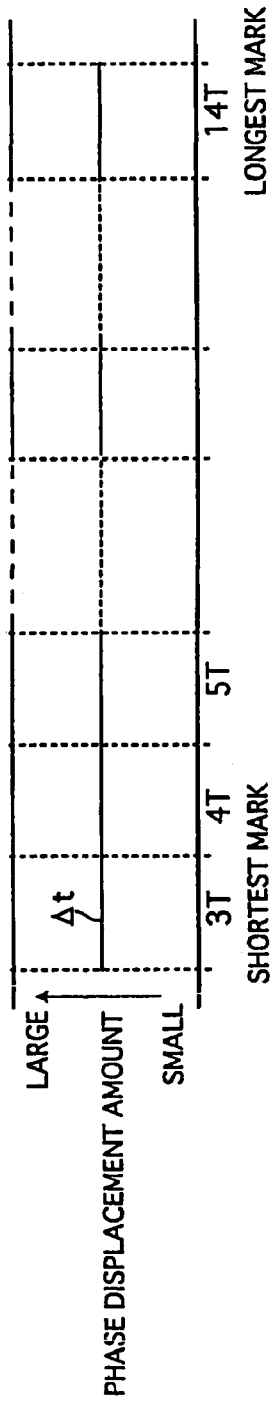
FIG. 47A shows the case where a constant displacement amount Δt is applied to each of the varying recording mark lengths.

FIG. 47A shows the case where a constant displacement amount $\Delta t$ is applied to each of the varying recording mark lengths, as is the case with the first to seventh embodiments.

Figure 47B:
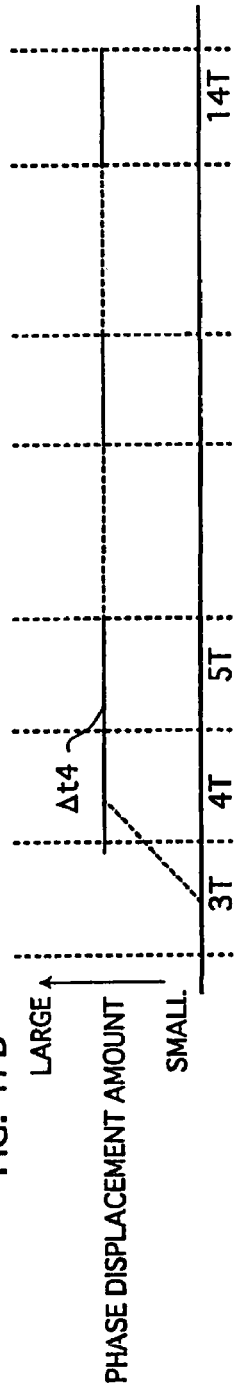
FIG. 47B shows the case where the length 4T is set as a threshold value, and a displacement amount Δt0 is applied to the recording marks with lengths shorter than 4T and a constant displacement amount Δt4 is applied to the recording marks with lengths not shorter than 4T.
Figure 47C:
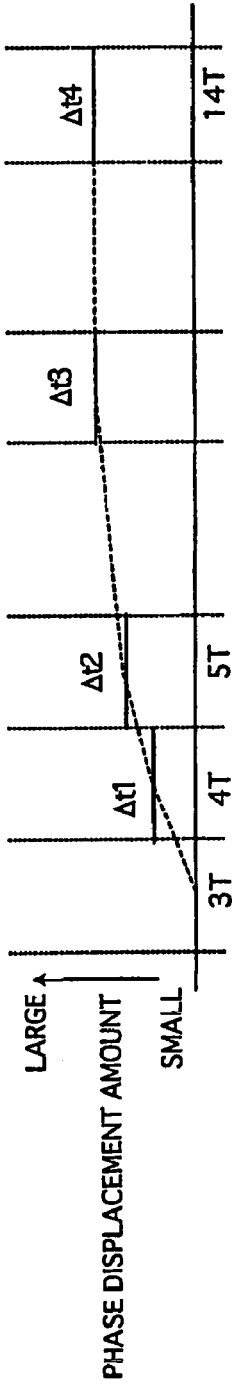
FIG. 47C shows other variations for applying the displacement amount Δt to the recording marks.

FIG. 47B shows the case where the length 4T is set as a threshold value, and displacement amount $\Delta t0$ is applied to the recording marks with lengths shorter than 4T and a constant displacement amount $\Delta$ t4 is applied to the recording marks with lengths not shorter than 4T. Such an arrangement can restrict the load on the recording apparatus. Another variation for restricting the load is shown in FIG. 47C. FIG. 47C takes advantages of FIGS. 46C and 47B, and shows the case where length 4T is set as a threshold value, and displacement amount $\Delta t0$ is applied to the recording marks with lengths shorter than 4T and for the recording marks with lengths not shorter than 4T, and as the length of the recording marks become longer (4T, 5T, . . . 14T), the displacement amounts $\Delta t$ becomes larger ($\Delta t1$, $\Delta t2$, . . . $\Delta t4$).

In these examples, the threshold value 4T is used only as an example. A value higher or lower than 4T may be used as the threshold value.

Recording Apparatus

Figure 48:
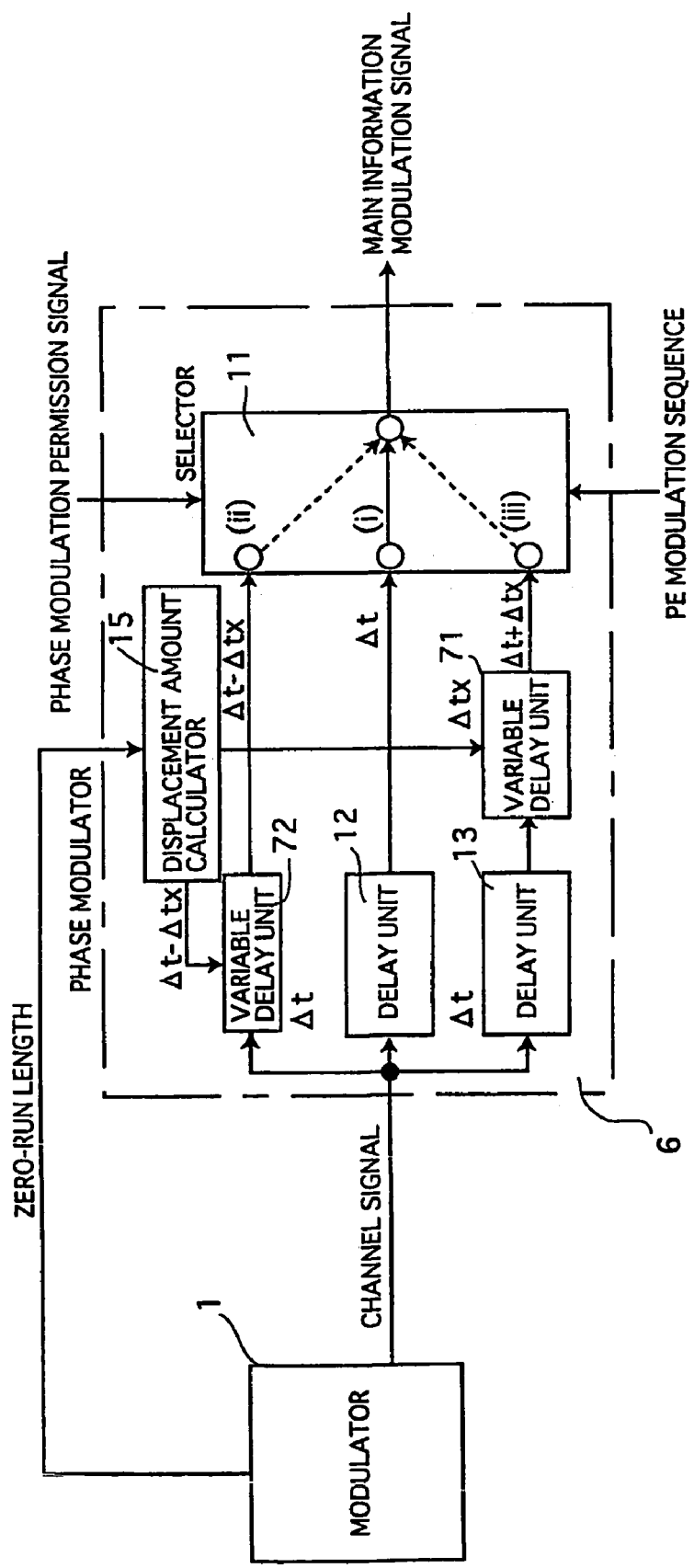
FIG. 48 is a block diagram showing the internal structure of the phase modulator 6 for setting the displacement amount Δt as shown in FIG. 46C.

A recording apparatus according to the eighth embodiment for recording such recording marks on an optical disc will now be described. FIG. 48 is a block diagram showing the internal structure of the phase modulator 6 for setting the displacement amount Δt as shown in FIG. 46C. In FIG. 48, a variable delay unit 71 has replaced the delay 14, and a displacement amount calculator 15 and a variable delay unit 72 have newly been added.

The displacement amount calculator 15 receives a zero-run length of channel codes from the modulator 1, calculates a displacement amount Δtx by using the zero-run length, and outputs the displacement amount Δtx to the variable delay unit 71 and a displacement amount Δt−Δtx to the variable delay unit 72.

The variable delay unit 71 further delays the phase of a channel signal, which has already been delayed by the delay unit 13 by the displacement amount Δt, by the displacement amount Δtx, and outputs the further delayed channel signal to the selector 11.

The variable delay unit 72 delays the phase of a channel signal output from the modulator 1 by the displacement amount Δt−Δtx, and outputs the delayed channel signal to the selector 11.

The selector 11 in the eighth embodiment selects a channel signal input from the modulator 1 (i) that is then delayed by the delay unit 12 by the displacement amount Δt when the phase modulation permission signal output from the timing generator 2 is in the Low section, (ii) that is then delayed by the variable delay unit 72 by the displacement amount Δt−Δtx when the phase modulation permission signal is in the High section and the PE modulation signal is in the High section, or (iii) that is then delayed by the delay unit 13 and the variable delay unit 71 by the displacement amount Δt+Δtx when the phase modulation permission signal is in the High section and the PE modulation signal is in the Low section. With the above processes (i) to (iii), the falling/rising edges in the channel signal are displaced by the displacement amount Δt that varies according to the zero-run length.

Figure 49:
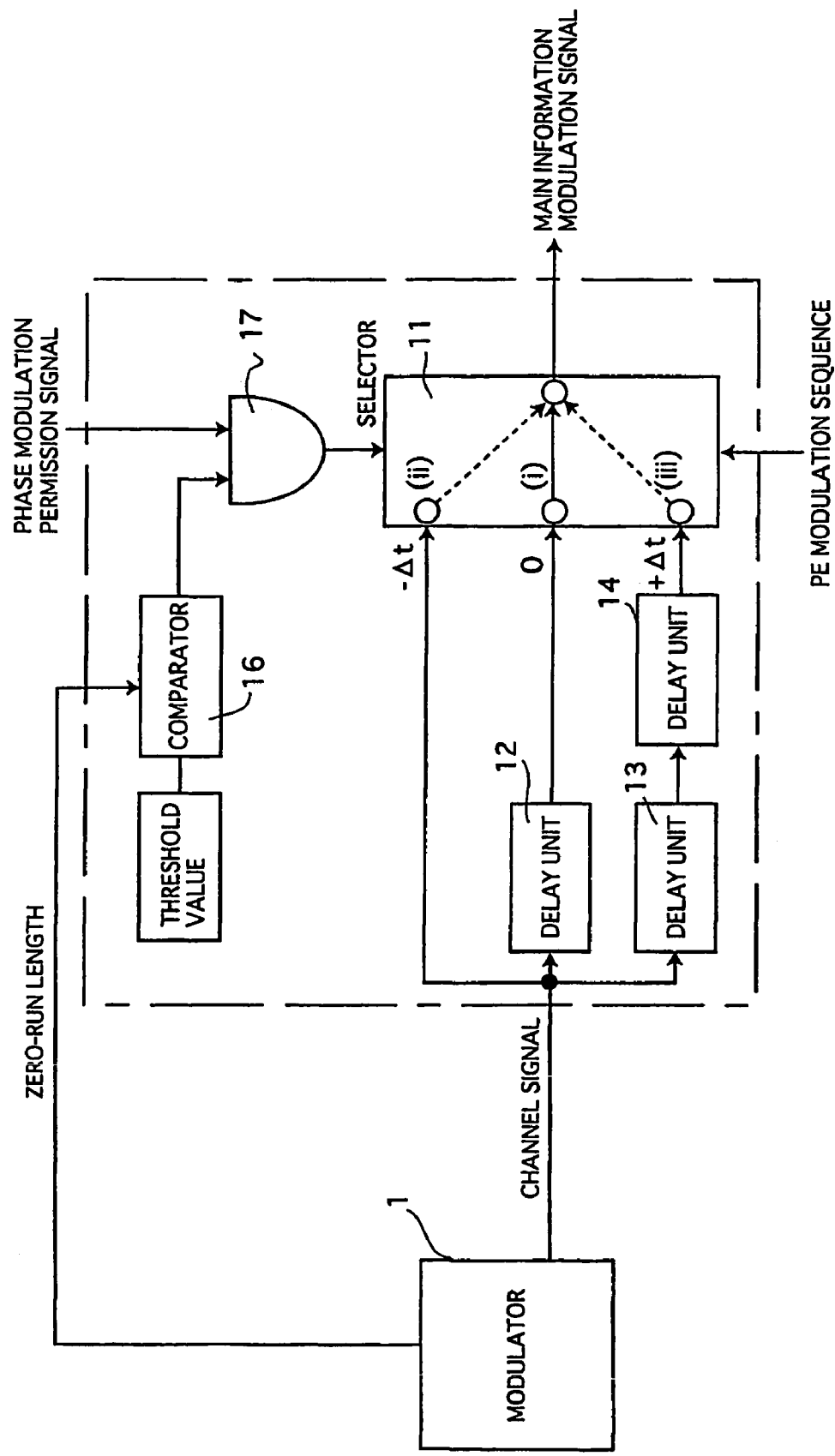
FIG. 49 shows the internal structure of the phase modulator 6 in the case where the displacement amount Δt is set as shown in FIG. 47B.

FIG. 49 shows the internal structure of the phase modulator 6 in the case where the displacement amount Δt is set as shown in FIG. 47B. As shown in FIG. 49, the phase modulator 6 additionally has a comparator 16 and an AND circuit 17. In the third embodiment, the phase modulation is performed when the phase modulation permission signal is in the High section. In the eighth embodiment, the phase modulation is performed when the zero-run length of the channel codes to be subjected to the phase modulation exceeds a threshold value (in this example, the threshold value is 3T), in addition to satisfying the above condition in the third embodiment.

The comparator 16 in the eighth embodiment receives from the modulator 1 a zero-run length of the channel codes to be subjected to the phase modulation, compares the zero-run length with the threshold value, and outputs the High section when the zero-run length exceeds the threshold value and outputs the Low section when the zero-run length is less than the threshold value. The AND circuit 17 performs a logical AND operation on the output from the comparator 16 and the phase modulation permission signal, and outputs the result to the selector 11. With this arrangement, the phase modulation is not performed when the zero-run length is less than the threshold value.

Reproduction Apparatus

A reproduction apparatus according to the eighth embodiment will now be described. In the recording marks on which the sub information is superposed according to the procedure of the eighth embodiment, the edges have smaller or no displacement amount Δt when the recording marks are short. Nevertheless, phase-leading errors or phase-lagging errors appear in accordance with the PE modulation bit sequence. As a result, the result of adding up the jitter sizes is a positive or negative certain value. It is expected that when a recording mark only has edges that are not displaced because the sub information is not superposed on the recording mark, the distribution curve for the jitters detected from this recording mark shows a normal distribution. In this case, the average adding-up result is 0.

With the above-described arrangements, the sub information is detected stably either when the edge displacement amount Δt is changed according to the length of recording marks or when edges of short recording marks are not displaced.

Note that the reproduction signal processing circuit may detect the length of each recording mark, and the sub information detection permission signal may be output to prohibit the adding up of the jitter sizes contained in short recording marks. With this arrangement, the short recording marks are omitted from the process of detecting the sub information.

As described above, the eighth embodiment enables the data field and the sub information to be read efficiently without receiving the effect of jitters contained in short recording marks.

In the first to eighth embodiments, each piece of sub information has 32 bytes. However, this is only an example. The data length of the sub information may be longer or shorter than 32 bytes.

The encryption key represented by the sub information may be either a secret key defined in DES or a public key. The 8-byte encryption key represented by the sub information is only provided as a typical example of secret data. The data represented by the sub information may be any secret data. Such secret data includes, for example, a) authority management information used for checking the authority to reproduce a digital content, (b) check-out permission information that indicates the limited number of check-outs/check-ins, (c) copy control information that indicates a copy permission attribute such as "copy available", "copy not available", and "copy available only once", and (d) billing control information concerning the billing control for the use of an optical disc.

INDUSTRIAL APPLICABILITY

The present invention enables drastic measures to be taken for against pirated discs, and will be used with high possibility by the video/audio industry or video/audio equipment manufacturing industry that has a strong sense of crisis against floods of pirated editions.

The invention claimed is:

1. An optical disc comprising:
a sector including a plurality of frames which are classified into a first type and a second type, wherein:
the first-type frames include a plurality of recording marks whose edges are at standard positions, and the second-type frames include a plurality of recording marks whose edges are displaced from standard positions;

the displaced edges in the second-type frames are classified into leading edges that exist before standard positions, and lagging edges that exist after standard positions, the leading edges and the lagging edges being arranged in accordance with a predetermined rule;

the length of each recording mark indicates the number of successive first channel bit values in main information recorded on said sector;

an arrangement of the leading edges and the lagging edges indicates a first bit value of sub information that is superposed on the main information;

the leading edges and the lagging edges cause jitters; and an edge displacement amount $\Delta t$ is determined from $\sigma' \geq \sqrt{\sigma^2 + \Delta t^2}$, where $\sigma$ denotes a standard deviation of base jitters that occur naturally, and $\sigma'$ denotes a permissible jitter amount for said optical disc.

2. The optical disc of claim 1, wherein when the arrangement is reversed to replace the leading edges with the lagging edges and replace the lagging edges with the leading edges, the reversed arrangement indicates a second bit value of the sub information.

3. The optical disc of claim 1, wherein:

each recording mark corresponds to a sequence of a plurality of first bit value areas storing first channel bit values of the main information, and a plurality of second bit value areas storing second channel bit values of the main information, each of the plurality of second bit value areas corresponding to an edge of the recording mark and having the same unit length as each first bit value area;

the unit length corresponds to one cycle of a clock pulse used for optically reading the main information; and each of the standard positions corresponds to phase zero of the clock pulse at a second bit value area.

4. The optical disc of claim 1, wherein:

each unit of s channel bit values in the main information corresponds to a value constituting an M random number sequence that has been phase-modulated, where s is an integer not lower than 2; and the predetermined rule is that each leading edge represents a different second channel bit value in each unit of s channel bit values that corresponds to a first value constituting the M random number sequence, and each lagging edge represents a different second channel bit value in each unit of s channel bit values that corresponds to a second value constituting the M random number sequence.

5. The optical disc of claim 4, wherein:

each piece of the main information includes a synchronization code and a data field; and the phase-modulated M random number sequence is initialized immediately after every synchronization code.

6. The optical disc of claim 4, wherein:

each piece of the main information includes a synchronization code and a data field; and the phase-modulated M random number sequence is initialized at a position a predetermined offset away from the end of every synchronization code.

7. The optical disc of claim 6, wherein the predetermined offset is equal to the length of Han address.

8. The optical disc of claim 1, wherein:

each unit of s channel bit values in the main information corresponds to a value constituting an M random number sequence that has been phase-modulated, where s is an integer not lower than 2; and the predetermined rule is that each lagging edge represents a different second channel bit value in each unit of s channel bit values that corresponds to a first value constituting the M random number sequence, and each leading edge represents a different second channel bit value in each unit of s channel bit values that corresponds to a second value constituting the M random number sequence.

9. The optical disc of claim 1, wherein:

each piece of the main information includes a synchronization code and a data field;

each leading/lagging edge indicates a second channel bit value constituting data fields of the main information; and each edge at a standard position indicates a second channel bit value constituting synchronization codes of the main information.

10. The optical disc of claim 1, wherein:

each piece of the main information includes a user data field and an internal code parity;

each leading/lagging edge indicates a second channel bit value constituting user data fields of the main information; and each edge at a standard position indicates a second channel bit value constituting internal code parities of the main information.

11. The optical disc of claim 1, wherein:

the second-type frames record pieces of main information that do not contain addresses; and the first-type frames record pieces of main information that contain addresses.

12. An optical disc comprising:

a sector including a plurality of frames which are classified into a first type and a second type, wherein:

the first-type frames include a plurality of recording marks whose edges are at standard positions, and the second-type frames include a plurality of recording marks whose edges are displaced from standard positions;

the displaced edges in the second-type frames are classified into leading edges that exist before standard positions, and lagging edges that exist after standard positions, the leading edges and the lagging edges being arranged in accordance with a predetermined rule;

the length of each recording mark indicates the number of successive first channel bit values in main information recorded on said sector;

an arrangement of the leading edges and the lagging edges indicates a first bit value of sub information that is superposed on the main information;

each of the second-type frames is at a position one or more frames away from a frame that records a piece of main information containing an address; and each of the first-type frames is at a position immediately before or after a frame that records an address;

the frame that records a piece of main information containing an address is the first frame of a sector; and a frame immediately before the frame recording the address is the last frame of another sector that is immediately before the sector.

13. The optical disc of claim 1, wherein:

the second-type frames record pieces of main information containing user data fields; and the first-type frames record pieces of main information containing outer code parities.

14. The optical disc of claim 1, wherein a bit value of sub information is superposed on a piece of main information recorded on u successive frames, where u is an integer not lower than 2.

15. An optical disc comprising:
a sector including a plurality of frames which are classified into a first type and a second type; wherein:
the first-type frames include a plurality of recording marks whose edges are at standard positions and the second-type frames include a plurality of recording marks whose edges are displaced from standard positions;
the displaced edges in the second-type frames are classified into leading edges that exist before standard positions, and lagging edges that exist after standard positions, the leading edges and the lagging edges being arranged in accordance with a predetermined rule;
the length of each recording mark indicates the number of successive first channel bit values in main information recorded on said sector;
an arrangement of the leading edges and the lagging edges indicates a first bit value of sub information that is superposed on the main information;
a first pair of area specification information and sub information existence information are recorded on said optical, disc the area specification information of the first pair indicating a position of said sector on which the main information with the sub information superposed thereon is recorded, and the sub information existence information in the first pair indicating that the sub information is superposed in said sector; and
a second pair of area specification information and sub information existence information are recorded on said optical disc, the area specification information in the second pair indicating a position of another sector on which main information without sub information superposed thereon is recorded, and the sub information existence information in the second pair indicating that the sub information is not superposed in the other sector.

16. The optical disc of claim 1, wherein:
recording marks having leading/lagging edges are each longer than a predetermined threshold value; and
edges of recording marks shorter than the predetermined threshold value are at standard positions.

17. An optical disc comprising:
a sector including a plurality of frames which are classified into a first type and a second type, wherein:
the first-type frames include a plurality of recording marks whose edges are at standard positions, and the second-type frames include a plurality of recording marks whose edges are displaced from standard positions;
the displaced edges in the second-type frames are classified into leading edges that exist before standard positions, and lagging edges that exist after standard positions, the leading edges and the lagging edges being arranged in accordance with a predetermined rule;
the length of each recording mark indicates the number of successive first channel bit values in main information recorded on said sector;
an arrangement of the leading edges and the lagging edges indicates a first bit value of sub information that is superposed on the main information;
shorter recording marks have smaller edge displacement amounts $\Delta t$; and
longer recording marks have larger edge displacement amounts $\Delta t$.

* * * * *

UNITED STATES PATENT AND TRADEMARK OFFICE
CERTIFICATE OF CORRECTION

PATENT NO. : 7,092,342 B2  Page 1 of 1
APPLICATION NO. : 10/381419
DATED : August 15, 2006
INVENTOR(S) : Takahiro Nagai et al.

It is certified that error appears in the above-identified patent and that said Letters Patent is hereby corrected as shown below:

Claim 7
In column 33, line 63, please replace "Han" with --an-- after "of" and before "address".

Claim 15
In column 35, line 7, please replace "type;" with --type,-- after "second" and before "wherein".
In column 35, line 9, please add --,-- after "positions" and before "and".
In column 35, line 26, please remove "," after "optical" and add --,-- after "disc".

Signed and Sealed this

Twelfth Day of December, 2006

JON W. DUDAS
*Director of the United States Patent and Trademark Office*